US012759786B2

(12) United States Patent
Furer

(10) Patent No.: US 12,759,786 B2
(45) Date of Patent: Oct. 13, 2026

(54) COLLAPSIBLE CONTAINER

(71) Applicant: Ilya Furer, Albrightsville, PA (US)

(72) Inventor: Ilya Furer, Albrightsville, PA (US)

( * ) Notice: Subject to any disclaimer, the term of this patent is extended or adjusted under 35 U.S.C. 154(b) by 49 days.

(21) Appl. No.: 18/863,370

(22) PCT Filed: May 10, 2023

(86) PCT No.: PCT/US2023/021658
§ 371 (c)(1),
(2) Date: Nov. 6, 2024

(87) PCT Pub. No.: WO2023/220122
PCT Pub. Date: Nov. 16, 2023

(65) Prior Publication Data

US 2025/0296768 A1 Sep. 25, 2025

Related U.S. Application Data

(60) Provisional application No. 63/340,175, filed on May 10, 2022.

(51) Int. Cl.

| | |
|---|---|
| ***B65D 88/52*** | (2006.01) |
| ***E05C 1/04*** | (2006.01) |
| ***E05C 3/08*** | (2006.01) |

(52) U.S. Cl.
CPC .............. *B65D 88/526* (2013.01); *E05C 1/04* (2013.01); *E05C 3/08* (2013.01)

(58) Field of Classification Search
CPC ....... B65D 88/526; B65D 88/524; E05C 1/04; E05C 3/08
See application file for complete search history.

(56) References Cited

U.S. PATENT DOCUMENTS

| | | | | |
|---|---|---|---|---|
| 3,403,806 A * | 10/1968 | Pohl | ..................... | B65D 88/522 220/6 |
| 3,570,698 A | 3/1971 | Dougherty | | |
| 3,799,384 A | 3/1974 | Hurkamp | | |
| 4,099,640 A | 7/1978 | Nessfield et al. | | |
| 4,214,669 A | 7/1980 | Mcquiston | | |
| 4,388,995 A | 6/1983 | Ahn | | |
| 4,506,798 A | 3/1985 | Goutille | | |
| 4,577,772 A | 3/1986 | Bigliardi | | |
| 4,848,618 A | 7/1989 | Yuan et al. | | |
| 5,190,179 A | 3/1993 | Richter et al. | | |
| 7,240,799 B2 | 7/2007 | Zhang | | |
| 7,296,704 B2 | 11/2007 | Ferrini | | |
| 7,823,739 B2 | 11/2010 | Sadkin et al. | | |

(Continued)

OTHER PUBLICATIONS

International Search Report for International Application No. PCT/US2023/021658 International Filing date May 10, 2023; Report Mail Date Aug. 1, 2023; 4 pages.

(Continued)

*Primary Examiner* — Shawn M Braden
(74) *Attorney, Agent, or Firm* — CANTOR COLBURN LLP

(57) ABSTRACT

A collapsible container including a roof; a base; a collapsible wall between the roof and the base; a linkage connecting the roof to the collapsible wall to collapse the collapsible wall and raise the collapsible wall to an erect position; and a foldable wall, wherein the roof includes a constant-force device to act on the foldable wall.

20 Claims, 63 Drawing Sheets

(56) References Cited

U.S. PATENT DOCUMENTS

| | | | | |
|---|---|---|---|---|
| 7,931,164 | B2 | 4/2011 | Krohn | |
| 7,984,819 | B1 | 7/2011 | Davis | |
| 8,573,433 | B2 | 11/2013 | Kochanowski | |
| 9,022,242 | B2 | 5/2015 | Meijers et al. | |
| 10,059,508 | B2 | 8/2018 | Flint et al. | |
| 10,364,095 | B2 | 7/2019 | Utz | |
| 10,882,689 | B2 * | 1/2021 | Kendall | B65D 88/52 |
| 11,952,206 | B2 * | 4/2024 | Kendall | B65D 90/008 |
| 2008/0029510 | A1 | 2/2008 | Fisk | |
| 2008/0135545 | A1 | 6/2008 | Sadkin et al. | |
| 2012/0006816 | A1 | 1/2012 | Turnquist | |
| 2012/0061390 | A1 | 3/2012 | Giesbers | |
| 2013/0180981 | A1 * | 7/2013 | Meijers | B65D 88/522<br>493/162 |
| 2014/0144920 | A1 | 5/2014 | Meijers et al. | |
| 2014/0263297 | A1 | 9/2014 | Churbuck et al. | |
| 2014/0263379 | A1 | 9/2014 | Brennan, Jr. | |
| 2020/0115152 | A1 | 4/2020 | Kim et al. | |
| 2021/0198032 | A1 * | 7/2021 | Kyte | B65D 88/524 |

OTHER PUBLICATIONS

Written Opinion for International Application No. PCT/US2023/021658 International Filing date May 10, 2023; Report Mail Date Aug. 1, 2023; 6 pages.

* cited by examiner

COLLAPSIBLE CONTAINER

CROSS-REFERENCE TO RELATED APPLICATIONS

This application is a National Stage application of PCT/US2023/021658, filed May 10, 2023, which claims priority to and the benefit of U.S. Provisional Application No. 63/340,175, filed on May 10, 2022, the entire content of which are incorporated herein by reference.

FIELD

The disclosure relates to a collapsible container. The disclosure relates to improved components for the collapsible container, and methods of collapsing the container, and methods of erecting the container.

BACKGROUND

Shipping containers are essential elements of managing the international supply chain of goods shipped worldwide in international commerce. It is estimated that over seventeen million shipping containers are currently in use around the globe. There are many scenarios in which companies managing the supply chain equipped with countless shipping containers need to be able to efficiently and effectively manage empty shipping containers once the products are removed or unloaded from the shipping container.

New shipping containers can cost two to three thousand dollars or more to produce which makes them too expensive to use disposably. In the worst-case scenario, shipping containers are disposed of in a landfill, or otherwise discarded, left to rust in the sun, or stored on a storage lot. In more effective instances, empty shipping containers are sent back to the port of origin to allow for faster reloading. In one or more instances empty shipping containers may be auctioned off or resold through resellers. In other instances, empty shipping containers are repurposed and made into housing. Existing approaches to manage empty shipping containers may not be suitably efficient or effective.

Accordingly, there is a need for improved collapsible shipping containers, components, and related methods. The present disclosure addresses this unmet need.

SUMMARY

The disclosure provides collapsible container (hereinafter, abbreviated "container") and components thereof. In an aspect, the disclosure relates to a container which can be collapsed into a stackable configuration. In an aspect, the containers can be stackable, interlocking, or a combination thereof. The disclosure relates to components for the containers. In an aspect, the container is a shipping container.

In an aspect, a collapsible container includes a roof; a base; a collapsible wall between the roof and the base; a linkage connecting the roof to the collapsible wall to collapse the collapsible wall and raise the collapsible wall to an erect position; and a foldable wall, wherein the roof includes a constant-force device to act on the foldable wall.

The foldable wall can be connected to the roof and inwardly foldable towards the roof.

The container can further include a base lock for locking the collapsible wall to the base, wherein the base lock can include a lever to lock the collapsible wall to the base or unlock the collapsible wall from the base, and wherein the lever can be storable within the base.

The container can further include a roof lock for locking the roof to the collapsible wall, wherein the roof lock can include a lever to lock the roof to the collapsible wall or unlock the roof from the collapsible wall, and wherein the roof lock can be storable within the collapsible wall.

The linkage can include an automatic choke.

Movement of the automatic choke can be impeded when the container is in an extended configuration.

The roof can include a stopper that impedes movement of the automatic choke.

In an aspect, movement of the automatic choke is not impeded when the container is in an opening configuration.

The roof can include a slot to which the linkage can be coupled; and the slot can include a widening at an end of the slot.

The container can further include a protrusion connected to the roof and insertable into the collapsible wall when the container is in an erect configuration, and the base when the container is in a collapsed configuration.

The container can further include a hinge connecting the collapsible wall to the base to inwardly collapse the collapsible wall towards the base, and to raise the collapsible wall from the base to an erect position.

The container can further include a hinge connecting the foldable wall to the roof.

The foldable wall can be a bi-fold wall.

The foldable wall can include panels connected by a hinge.

The foldable wall can include a disengageable support column.

The foldable wall can be longer than the collapsible wall.

In an aspect, a method of collapsing the container can include applying a force between the roof and the foldable wall with the constant-force device to inwardly fold the foldable wall; and lifting the roof, causing an end of the linkage connected to the roof to move and inwardly collapse the collapsible wall to collapse the container, wherein the method can further optionally include, before inwardly folding the foldable wall removing a lever of a roof lock from a stowed position, disengaging the roof lock to unlock the roof from the collapsible wall, lowering a base protection panel to expose a base lock, removing a lever of the base lock from a stowed position, disengaging the base lock to unlock the collapsible wall from the base, or a combination thereof, after collapsing the container locking the roof to the base, or a combination thereof.

In an aspect, a method of erecting the container can include lifting the roof, causing an end of the linkage connected to the roof to move and raise the collapsible wall; and unfolding the foldable wall using the constant-force device to erect the container, wherein the method can further optionally include, before lifting the roof locking the roof to the base, after unfolding the foldable wall engaging a roof lock to lock the roof to the collapsible wall, stowing a lever of the roof lock, engaging a base lock to lock the collapsible wall to the base, stowing a lever of the base lock, raising a base protection panel to hide the base lock, or a combination thereof, or a combination thereof.

In an aspect, a collapsible container includes a roof; a base; a collapsible wall between the roof and the base; a linkage connecting the roof to the collapsible wall to collapse the collapsible wall and raise the collapsible wall to an erect position; and a foldable wall, wherein the linkage can include an automatic choke.

The roof can include a stopper that impedes movement of the automatic choke, and a slot to which the linkage can be coupled, the slot including a widening at an end of the slot;

and movement of the automatic choke can be impeded when the container is in an extended configuration. In an aspect, movement of the automatic choke is not impeded when the container is in an opening configuration.

In an aspect, a collapsible container includes a roof; a base; a collapsible wall between the roof and the base; a linkage connecting the roof to the collapsible wall to collapse the collapsible wall and raise the collapsible wall to an erect position; a foldable wall; a base lock for locking the collapsible wall to the base, wherein the base lock can include a lever to lock the collapsible wall to the base or unlock the collapsible wall from the base, and wherein the lever can be storable within the base; a roof lock for locking the roof to the collapsible wall, wherein the roof lock can include a lever to lock the roof to the collapsible wall or unlock the roof from the collapsible wall, and wherein the roof lock can be storable within the collapsible wall; a protrusion connected to the roof and insertable into the collapsible wall when the container is in an erect configuration, and the base when the container is in a collapsed configuration; a first hinge connecting the collapsible wall to the base to inwardly collapse the collapsible wall towards the base, and to raise the collapsible wall from the base to an erect position, and a second hinge connecting the foldable wall to the roof, wherein the roof can include a constant-force device to act on the foldable wall, a slot to which the linkage can be coupled, and a widening at an end the slot, the foldable wall can be connected to the roof and inwardly foldable towards the roof, can be a bi-fold wall, can include panels connected by a third hinge, can include a disengageable support column, and can be longer than the collapsible wall, the linkage can include an automatic choke, movement of the automatic choke can be impeded when the container is in an extended configuration, the roof can include a stopper that impedes movement of the automatic choke, and movement of the automatic choke can be not impeded when the container is in an opening configuration.

The container can include locks, latches, and components, which can be integrated or modular with the container, and which are configured to be modified to improve operation collapsible function of the container. The container is configured to allow a container to have multiple configurations.

In an aspect, the disclosure provides a container in an erect configuration. In an aspect, the disclosure provides a container in an unlocked configuration. In an aspect, the disclosure provides for a container in a collapsed configuration. In an aspect, the disclosure provides containers in a stacked configuration.

The disclosure relates to container components and container and related methods which can be manufactured with appropriate materials and processes, and which can be scaled as needed.

Other objects, features, and advantages of the disclosure will become apparent from the following detailed description taken in conjunction with the accompanying drawings.

BRIEF DESCRIPTION OF THE DRAWINGS

Although the characteristic features of the invention will be particularly pointed out in the claims, the disclosure itself and manners in which it may be made and used may be better understood after a review of the following description, taken in connection with the accompanying drawings, wherein like numeral annotations are provided throughout.

DETAILED DESCRIPTION OF THE INVENTION

Figure 1:
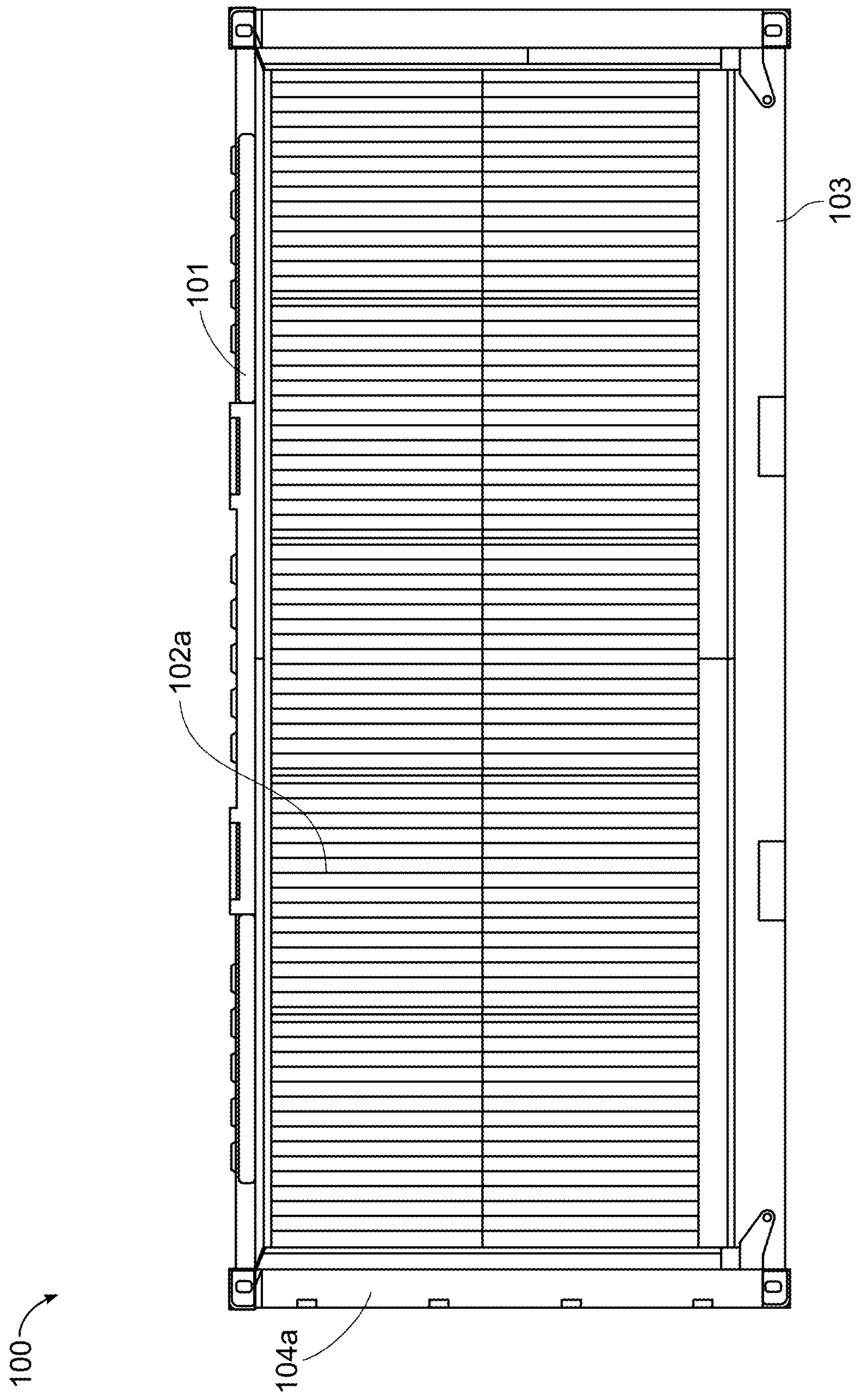
FIG. 1 is a side view of an exemplary aspect of a container.

Reference is made herein to the attached drawings. Like reference numerals may be used in the drawings to indicate like or similar elements of the description. The figures are intended for representative purposes and should not be considered limiting.

The present disclosure can be understood more readily by reference to the following detailed description of the present disclosure and the examples included therein.

Before the present articles, systems, devices, and/or methods are disclosed and described, it is to be understood that they are not limited to specific implementations unless otherwise specified, or to particular approaches unless otherwise specified, as such can, of course, vary. It is also to be understood that the terminology used herein is for the purpose of describing aspects only and is not intended to be limiting. Although any methods and materials similar or equivalent to those described herein can be used in the practice or testing of the present disclosure, example methods and materials are now described.

All publications mentioned herein are incorporated herein by reference to disclose and describe the methods and/or materials in connection with which the publications are cited.

Definitions

It is to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this present disclosure belongs. In this specification and in the claims which follow, reference will be made to a number of terms which shall be defined herein.

As used in the specification and the appended claims, the singular forms "a," "an," and "the" include plural referents unless the context clearly dictates otherwise. Thus, for example, reference to "an opening" can include two or more openings.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including matters of logic with respect to arrangement of steps or operational flow; plain meaning derived from grammatical organization or punctuation; and the number or type of aspects described in the specification.

Disclosed are the components to be used to manufacture the disclosed devices, systems, and articles of the present disclosure as well as the devices themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and Care disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the present disclosure. Thus, if there are a variety of additional steps that can be performed it is understood that each of these additional steps can be performed with any specific aspect or combination of aspects of the methods of the present disclosure.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

The present disclosure includes container, components therefor, and related systems. The container components and related systems include but are not limited to collapsible bi-fold side walls, locks, levers, latches, and other elements. The present disclosure also provides for positioning of the various locks, linkages, stoppers, automatic chokes, hinges, joints, and connection points of the container components and related systems. In an aspect, the container is a shipping container. The container components and related systems can be configured such that a crane or forklift can fold, e.g., collapse, and unfold, e.g., erect, the container.

A container can have a length and a width. As used herein, the length is the longer dimension of the length and width of the container. As used herein, "end walls" refers to walls located at opposite ends along the length of the container. As used herein, a "side walls" refers to walls located at opposite ends along the width of the container. The "side walls" of the container are longer than the "end walls" of the container. For ease of description and consistency herein, the side walls are described as foldable ("foldable wall(s)") and the end walls are described as collapsible ("collapsible wall(s)"), though the side walls can be collapsible and the end walls can be foldable. The foldable wall can be longer than the collapsible wall.

The container can include a container base having four corner members, side walls supported by the base, a roof connected to the side walls and end walls, e.g., a front wall and a rear wall, each having two corner posts pivotally connected to the corner members. The container corner posts can be adapted to be supported only by the corner members when the container is in an erect configuration. In an aspect, the upper end of each of the corner posts of the container, e.g., an end of each of the corner posts adjacent to the roof when in an erect configuration, can be configured to have at least one gripping member receiver which conforms to international standards as to size, configuration and location. The container can thereby be enabled to be such that an erected container can be picked up, e.g., raised, and moved by a standard container handling device including but not limited to a forklift or crane. In an aspect in which the side walls can be collapsible and the end walls can be foldable, the corner posts are part of the side walls rather than being a part of the end walls.

In an aspect, the containers can be collapsed into sets of stackable containers including collapsed and folded containers. The containers include locks, latches, and components, which can be integrated or modular with the containers, having various interconnected hinges, springs, joints, and connection points which are configured to functionally collapse and fold in an operably efficient manner.

In an aspect, a collapsible container includes a roof; a base; a collapsible wall between the roof and the base; a linkage connecting the roof to the collapsible wall to collapse the collapsible wall and raise the collapsible wall to an erect position; and a foldable wall, wherein the roof includes a constant-force device to act on the foldable wall.

In an aspect, a collapsible container includes a roof; a base; a collapsible wall between the roof and the base; a linkage connecting the roof to the collapsible wall to collapse the collapsible wall and raise the collapsible wall to an erect position; and a foldable wall, wherein the linkage can include an automatic choke.

Collapsible Configuration Methods

The container is configured to have multiple configurations. In an aspect, the disclosure provides a container in an erect configuration. In an aspect, the disclosure provides for a container in a collapsed configuration. In an aspect, the disclosure provides containers in a stacked configuration. In an aspect, the disclosure provides a container in an unlocked configuration. As used herein, "unlocked configuration" means a configuration between an erect configuration and a collapsed configuration or vice versa.

Regarding the components and function of the containers, the components can be described in detail as follows. The sequences described approximate the functions of the components. With regard to the functions of the containers, and components thereof, many actions can be performed simultaneously, in order, independently, or in a modified manner including but not limited to skipping one or more steps and returning to the skipped steps at a later time. As it relates to the containers and components, the choice of order of steps and operation can be modified for more efficient and effective time management.

However, regarding the containers and components, the various configurations of folding, collapsing, unfolding, and the like cannot be completely performed unless all steps are eventually completed, irrespective of the exemplary order described. As stated, it should be evident that some steps cannot be completed before others at various stages of the configuration and function. Therefore, the described instructions are divided into main steps and preliminary minor steps. The main primary steps cannot be completed if all the preliminary minor steps are completed. For example, a side wall cannot be raised before all locks have been unlatched; however, which locks are unlatched first is irrelevant.

Figure 2:
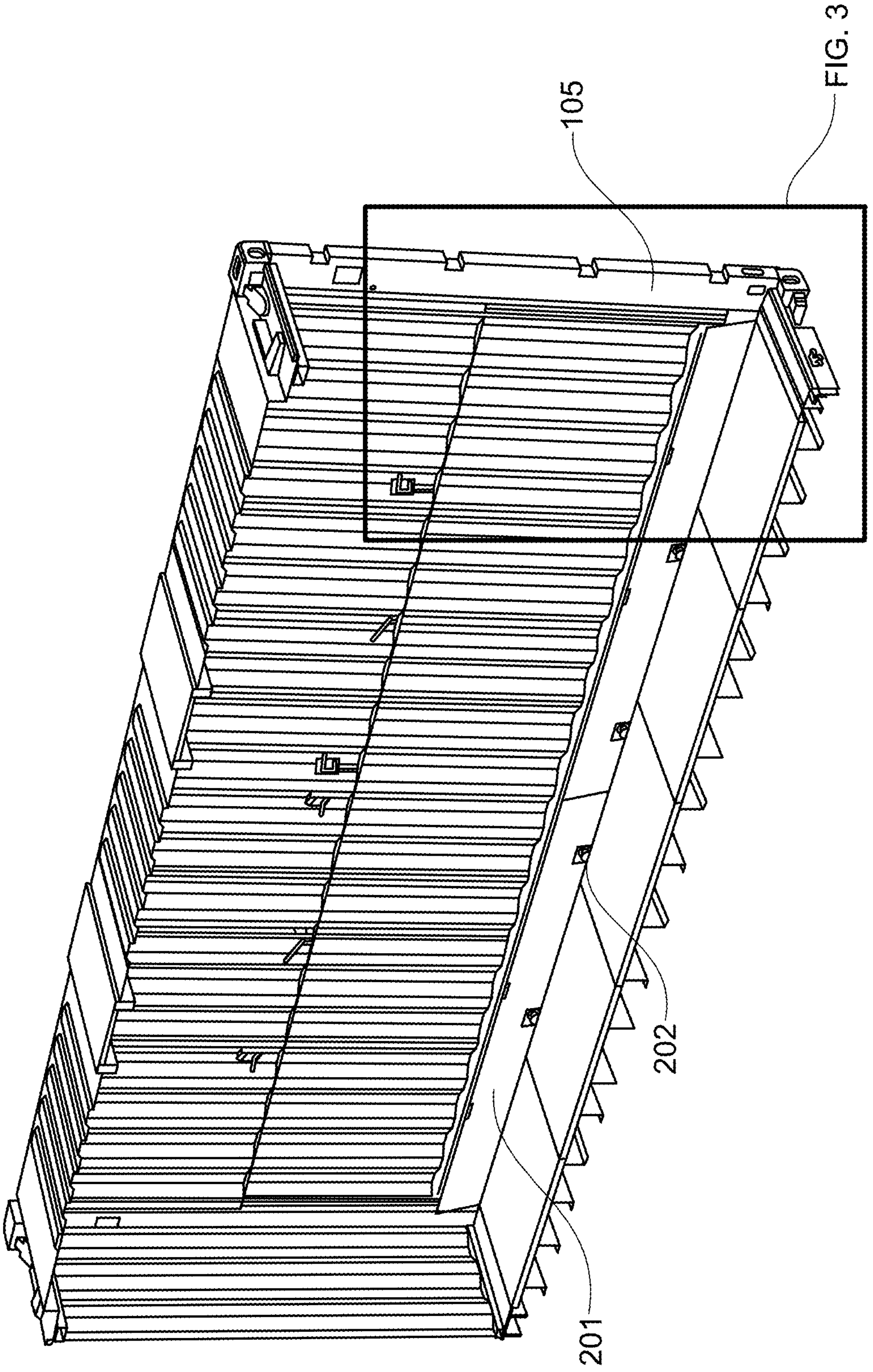
FIG. 2 is a perspective view of an exemplary aspect of a container.

As shown in FIG. 1 and FIG. 2, container 100 includes a roof 101, a side wall 102*a*, a base 103, and an end wall 104*a*. In FIG. 1 and FIG. 2, for simplification and descriptive instructional purposes, one of the side walls (e.g., a left side wall) and one of the end walls (e.g., a back side wall) have been removed from view revealing internal elements, parts, and components. FIG. 2 shows an empty container 100 that an operator could enter and verify that it is in fact empty. This view demonstrates the main actions and steps showing only on one side. It should be understood for demonstrative purposes that identical elements exist on the opposite side that has been removed from view in order to clarify the function. Similarly, while features and functions may be described with reference to one feature (e.g., a side wall or an end wall) such features and functions may apply to multiple corresponding features (e.g., two opposite side walls or two opposite end walls).

Unlocking and Related Processes

Figure 3:
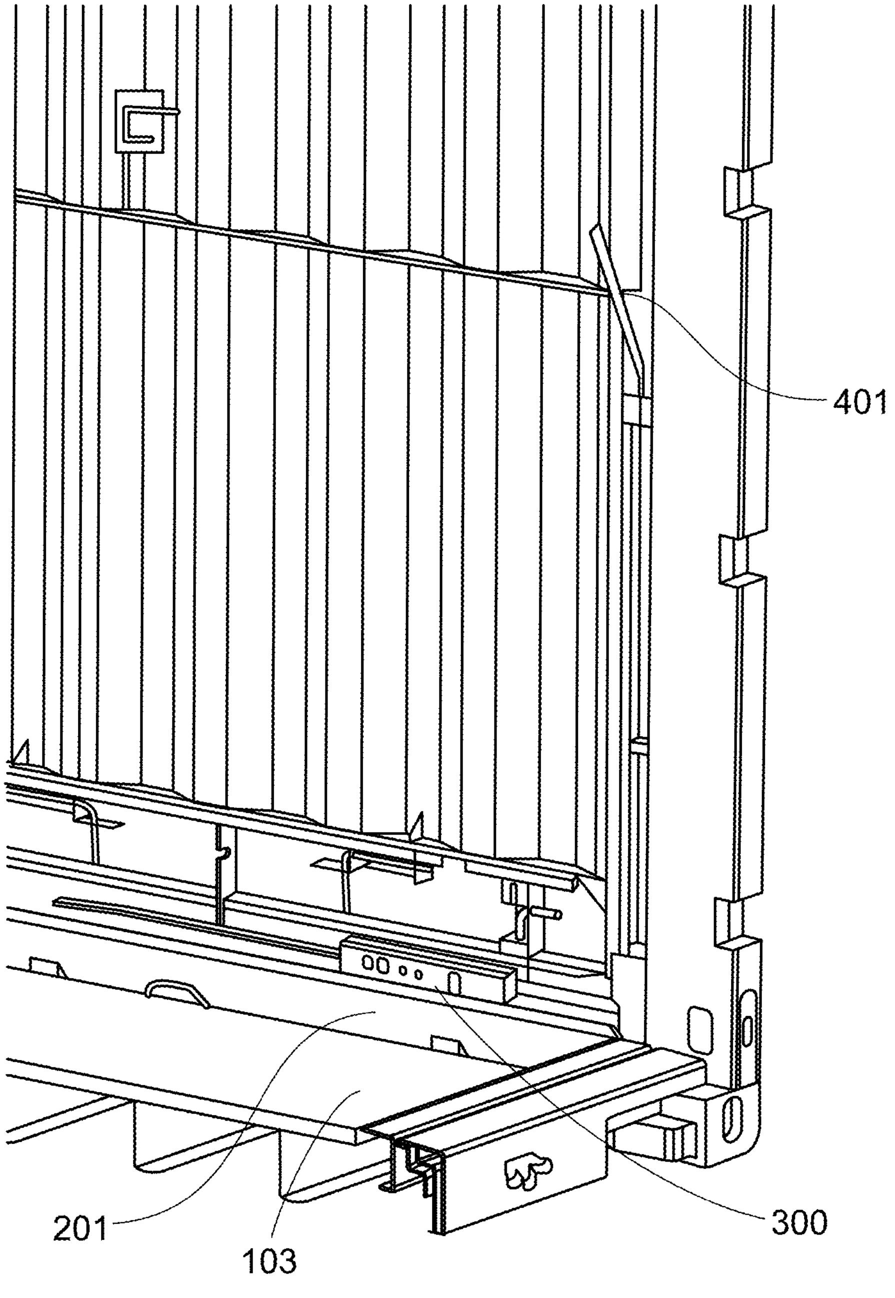
FIG. 3 is an enlarged view of a portion of FIG. 2.

FIG. 3 is an enlarged view of a portion A of FIG. 2 revealing internal elements, parts, and components of container 100. FIG. 2 shows a base protection panel 201 in a closed position, concealing a base lock (not shown in FIG. 3) for locking an end wall to base 103 via a corner post 105 of the end wall, and FIG. 3 shows base protection panel 201 in an open, e.g., lowered, position, revealing and allowing access to base lock 300 for locking corner post 105 to base 103. When opened, e.g., lowered, base protection panel 201 can rest on base 103 of container 100. A lock for base protection panel 201 can prevent base protection panel 201 from opening, e.g., lowering, at an undesirable time and an operator can unlock the lock for base protection panel 201 and open e.g., lower, base protection panel 201. Lever 401 of a roof lock (hereinafter referred to as a "roof lock lever") for locking corner post 105 to the roof, which will be described in further detail with reference to FIG. 4, can be seen in FIG. 3, but not in FIG. 2, in which the roof lock lever is stowed, e.g., stored. An exterior of base protection panel 201 can include a lashing ring 202 to secure a load inside container 100.

The base lock can lock the collapsible wall to the base and can include a lever to lock the collapsible wall to the base or unlock the collapsible wall from the base, and the lever can be storable within the base. The roof lock can lock the roof to the collapsible wall and can include a lever to lock the roof to the collapsible wall or unlock the roof from the collapsible wall, and the roof lock can be storable within the collapsible wall.

Figure 4A:
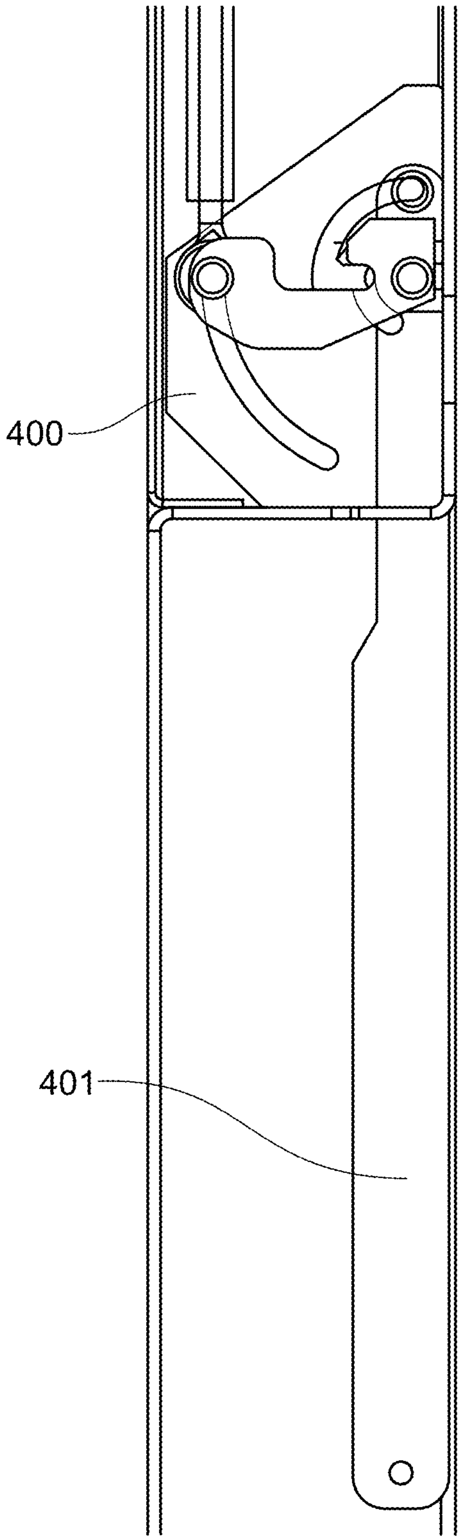
FIG. 4A is a view of an exemplary aspect of a roof lock.
Figure 4B:
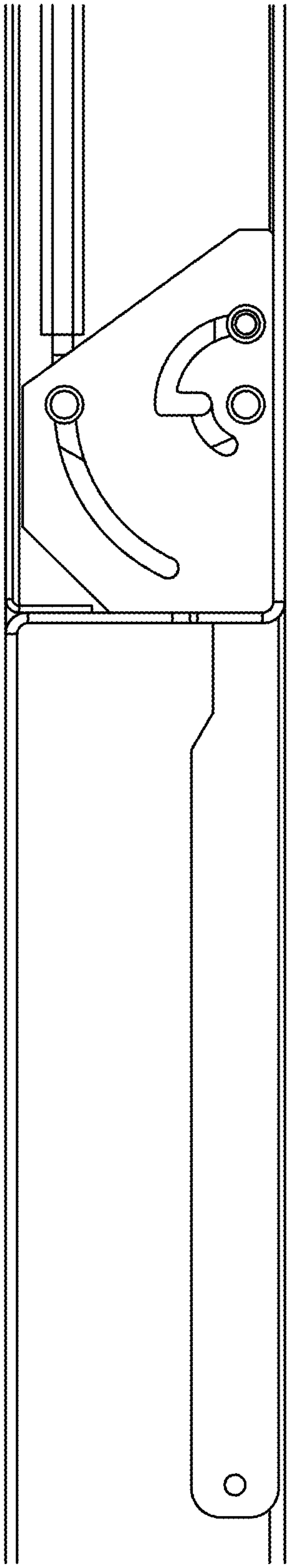
FIG. 4B is a view of an exemplary aspect of a roof lock.
Figure 4C:
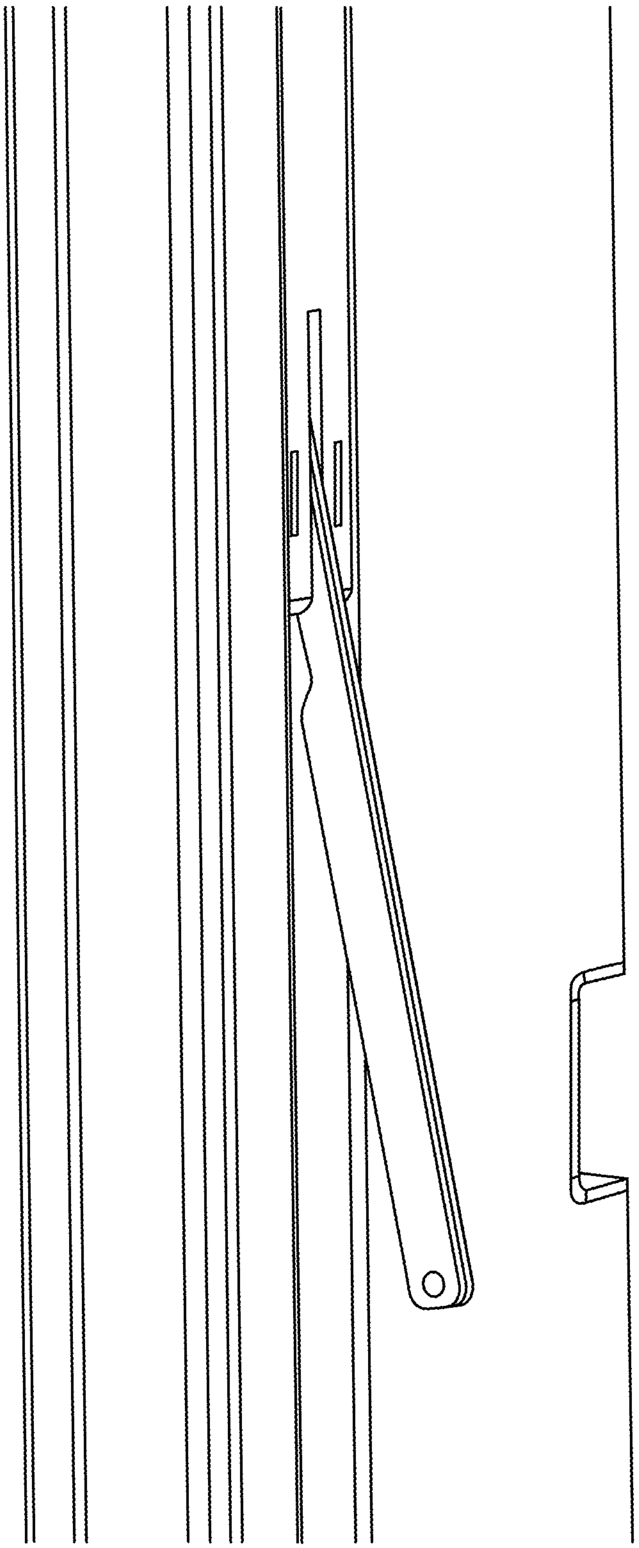
FIG. 4C is a view of an exemplary aspect of a roof lock.
Figure 4D:
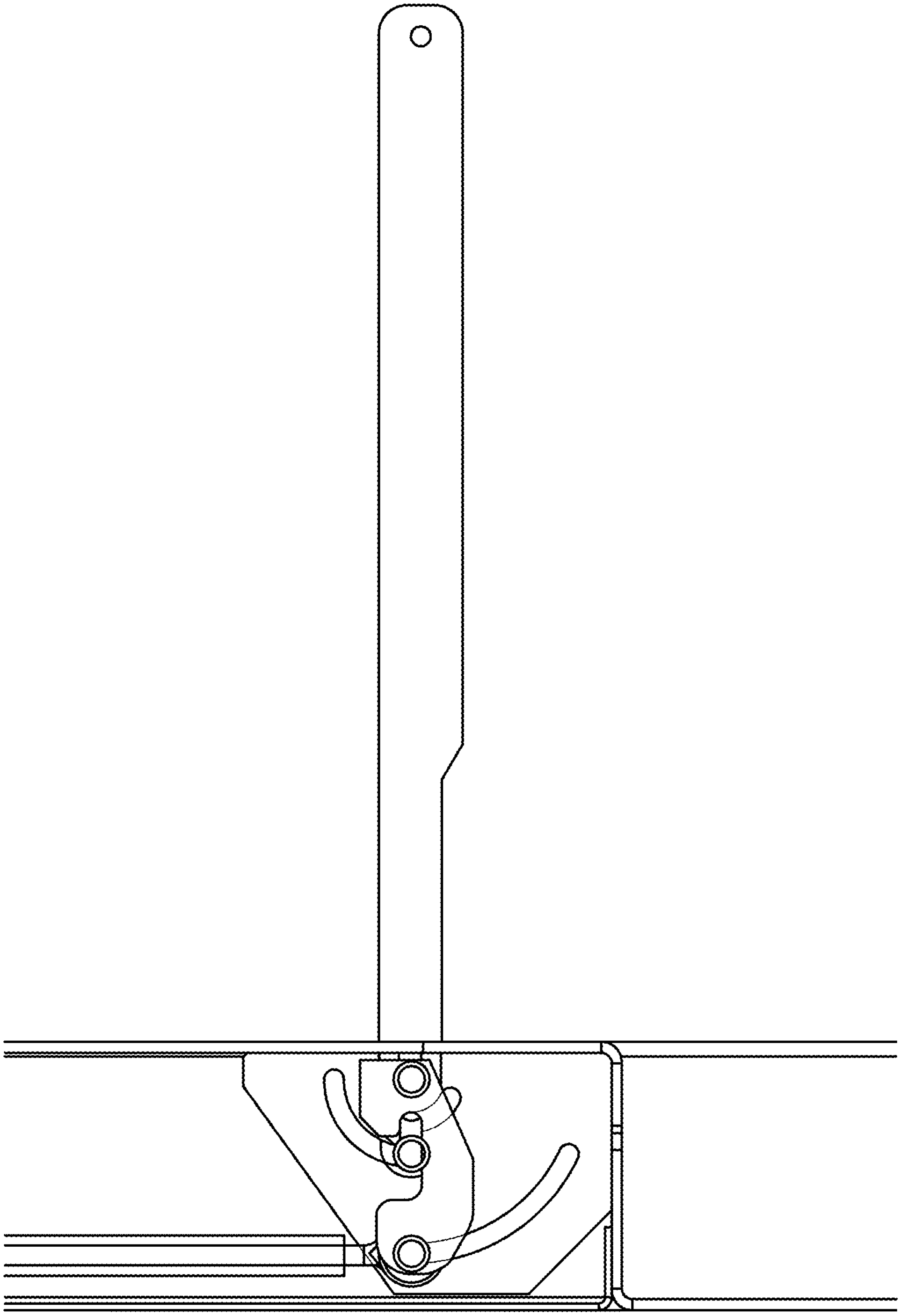
FIG. 4D is a view of an exemplary aspect of a roof lock.
Figure 4E:
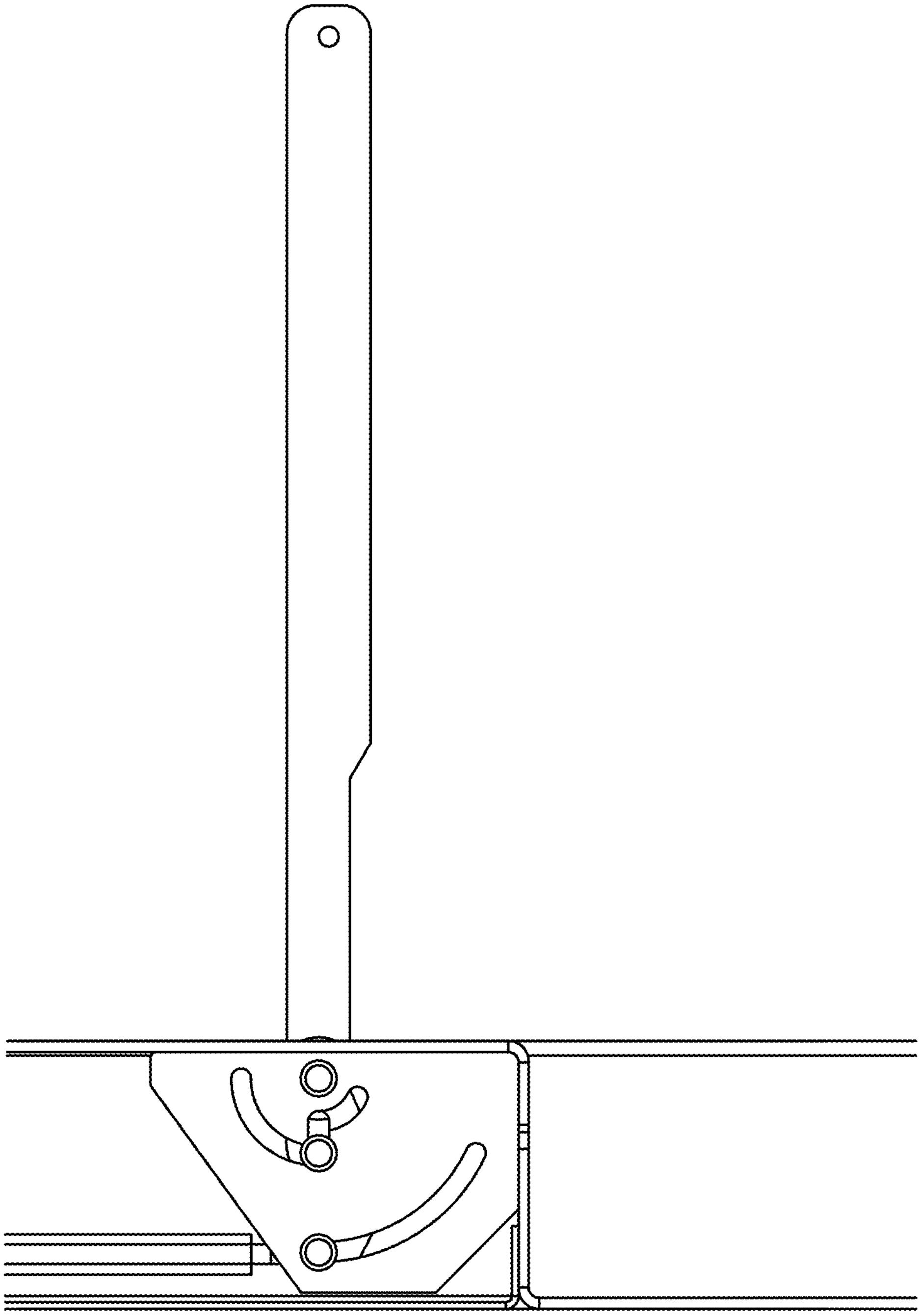
FIG. 4E is a view of an exemplary aspect of a roof lock.
Figure 4F:
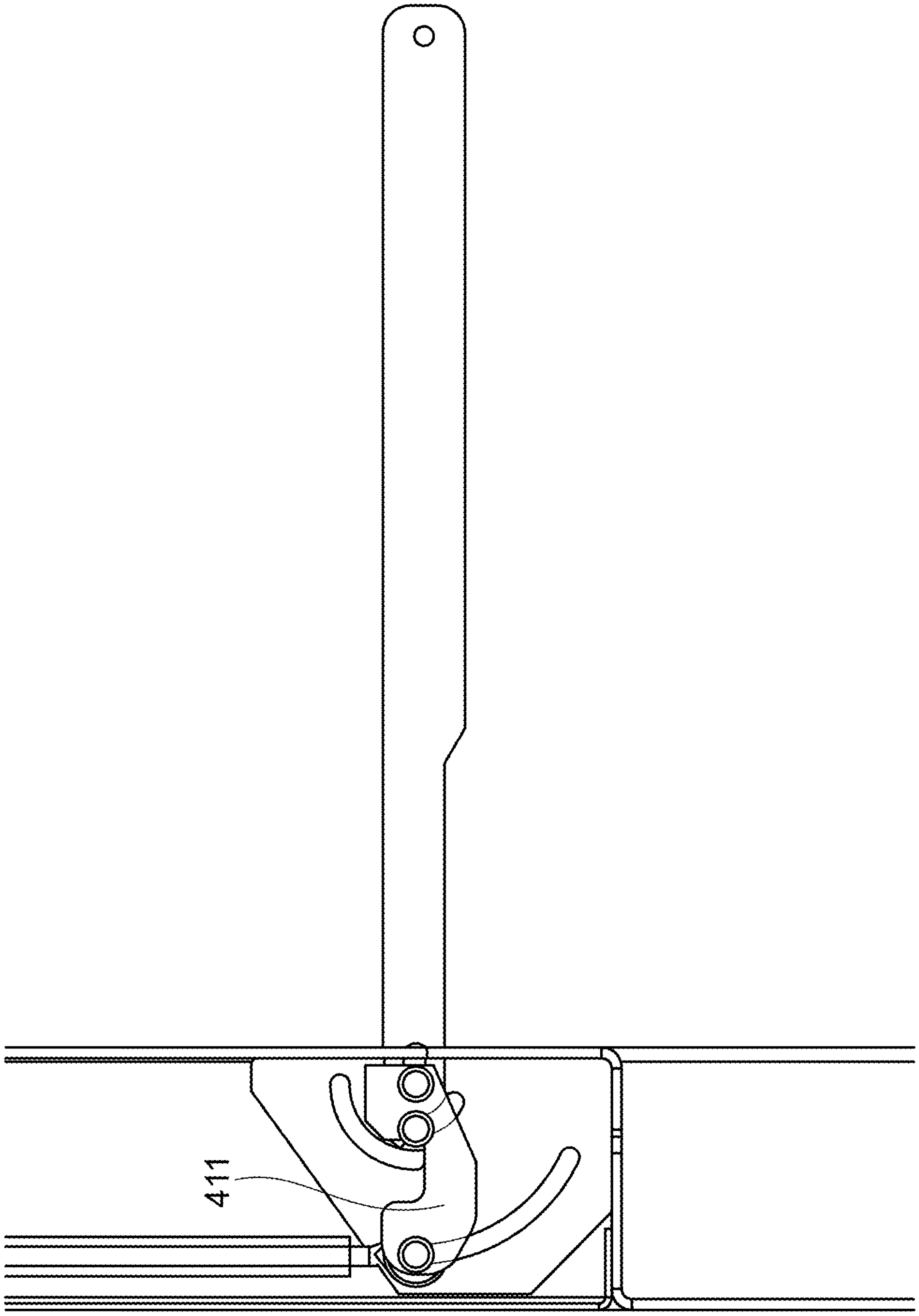
FIG. 4F is a view of an exemplary aspect of a roof lock.
Figure 4G:
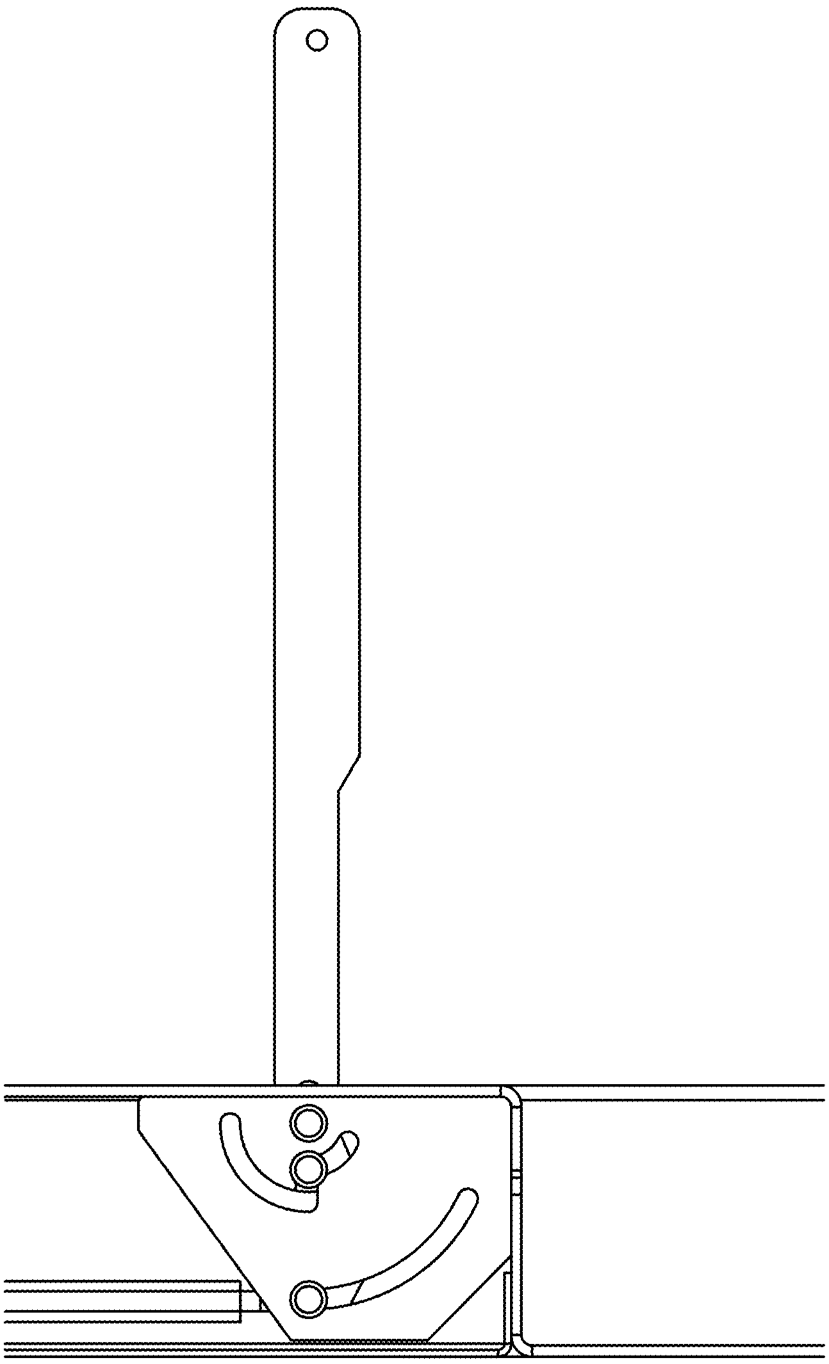
FIG. 4G is a view of an exemplary aspect of a roof lock.
Figure 4H:
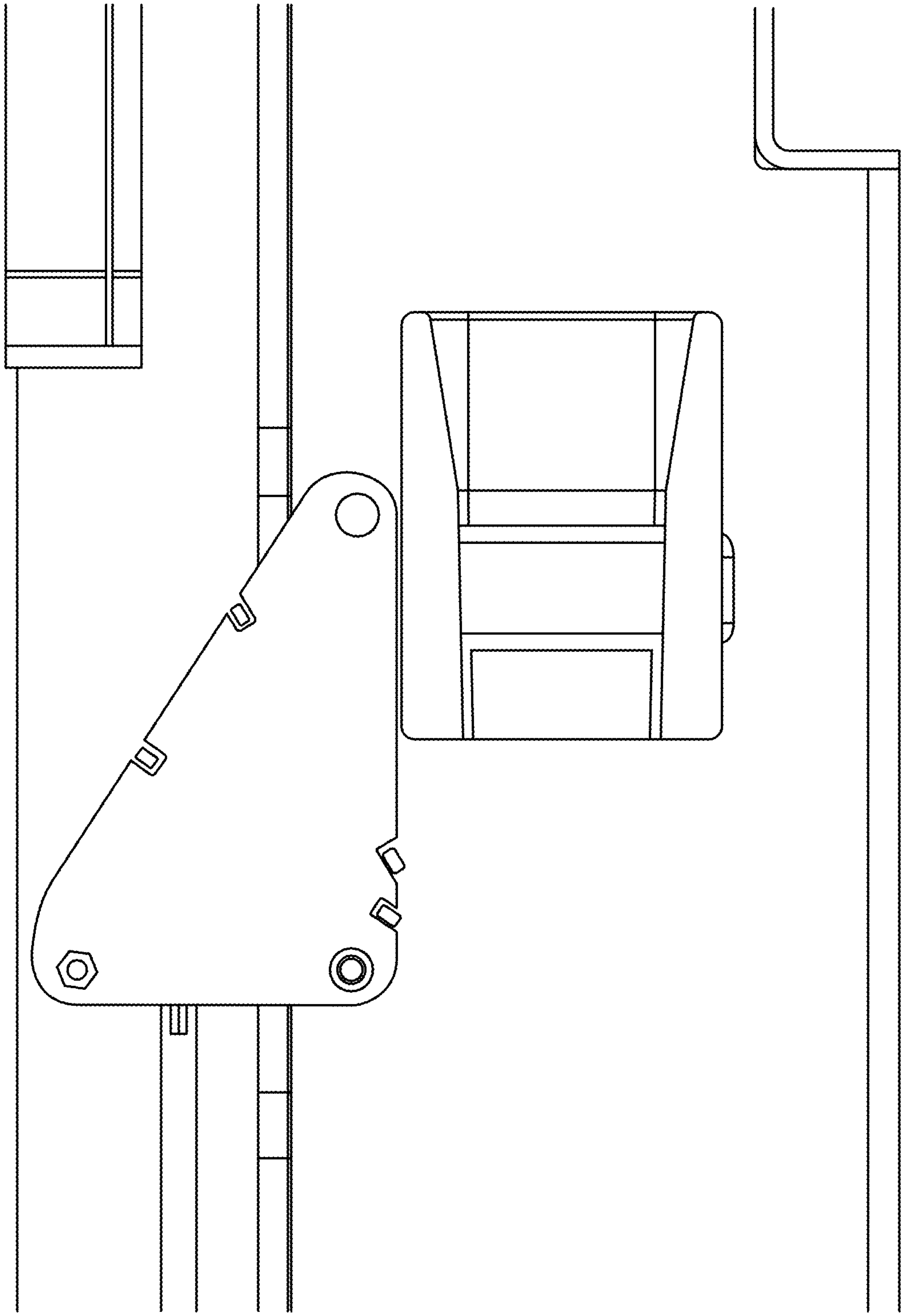
FIG. 4H is a view of an exemplary aspect of a roof lock.
Figure 4I:
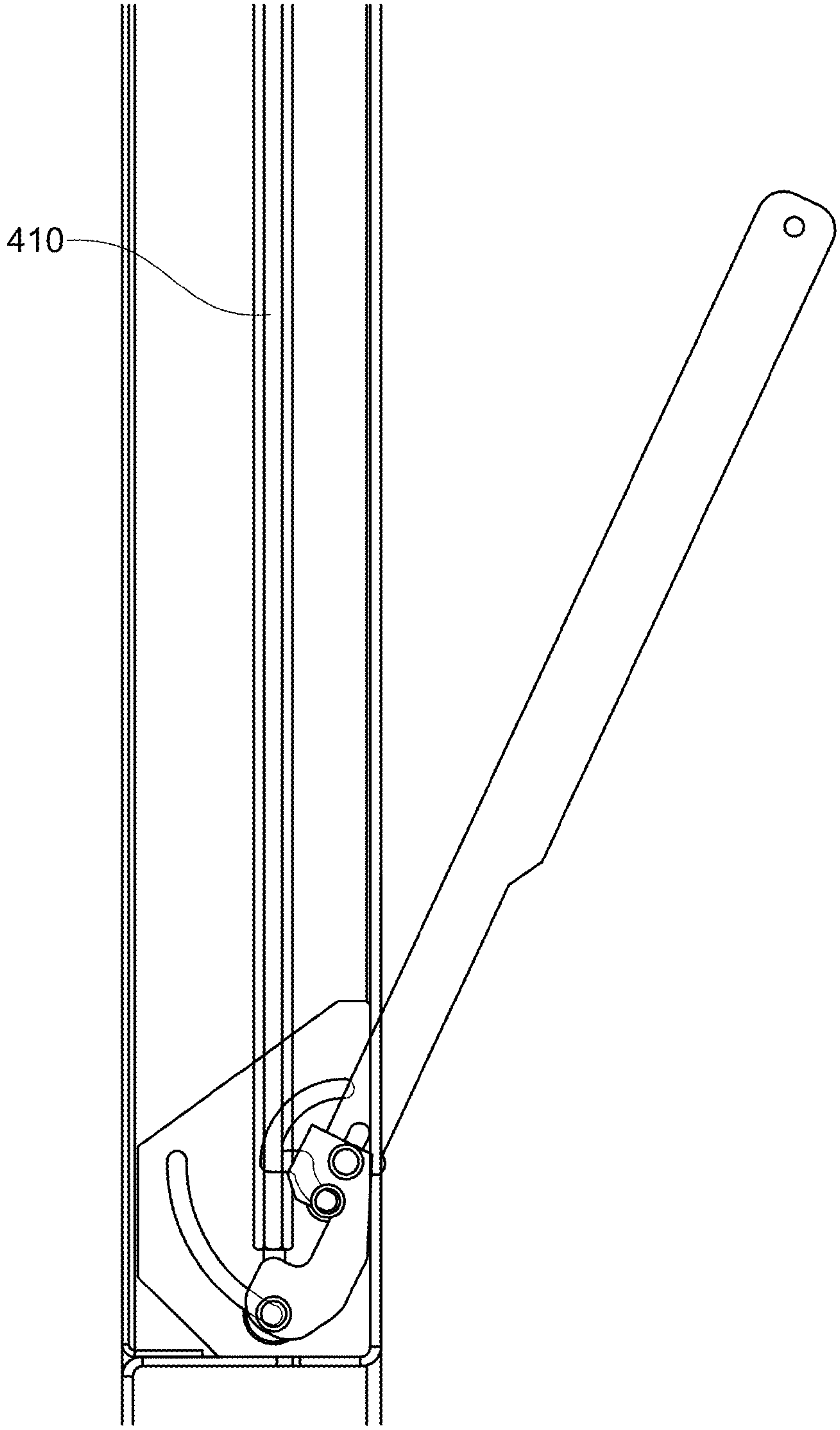
FIG. 4I is a view of an exemplary aspect of a roof lock.
Figure 4J:
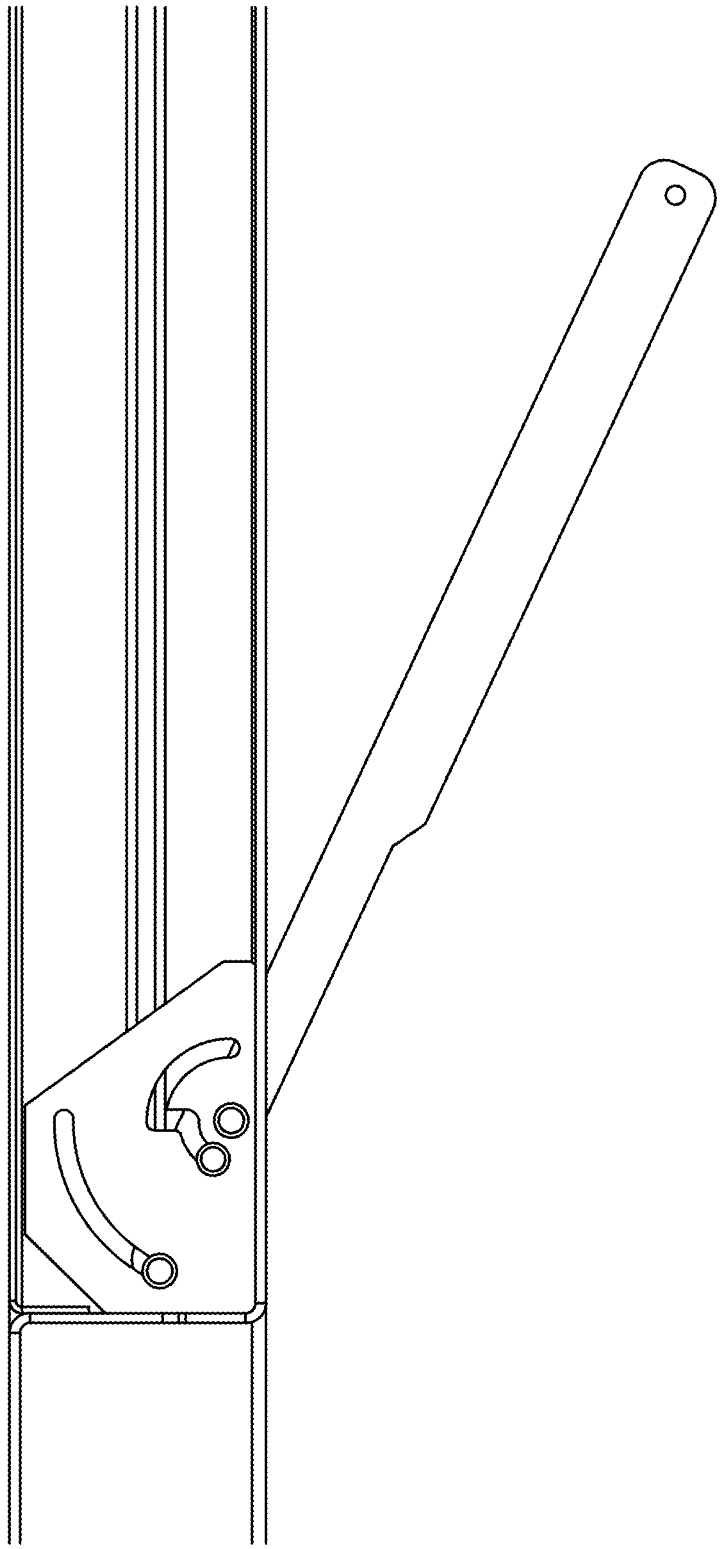
FIG. 4J is a view of an exemplary aspect of a roof lock.
Figure 4K:
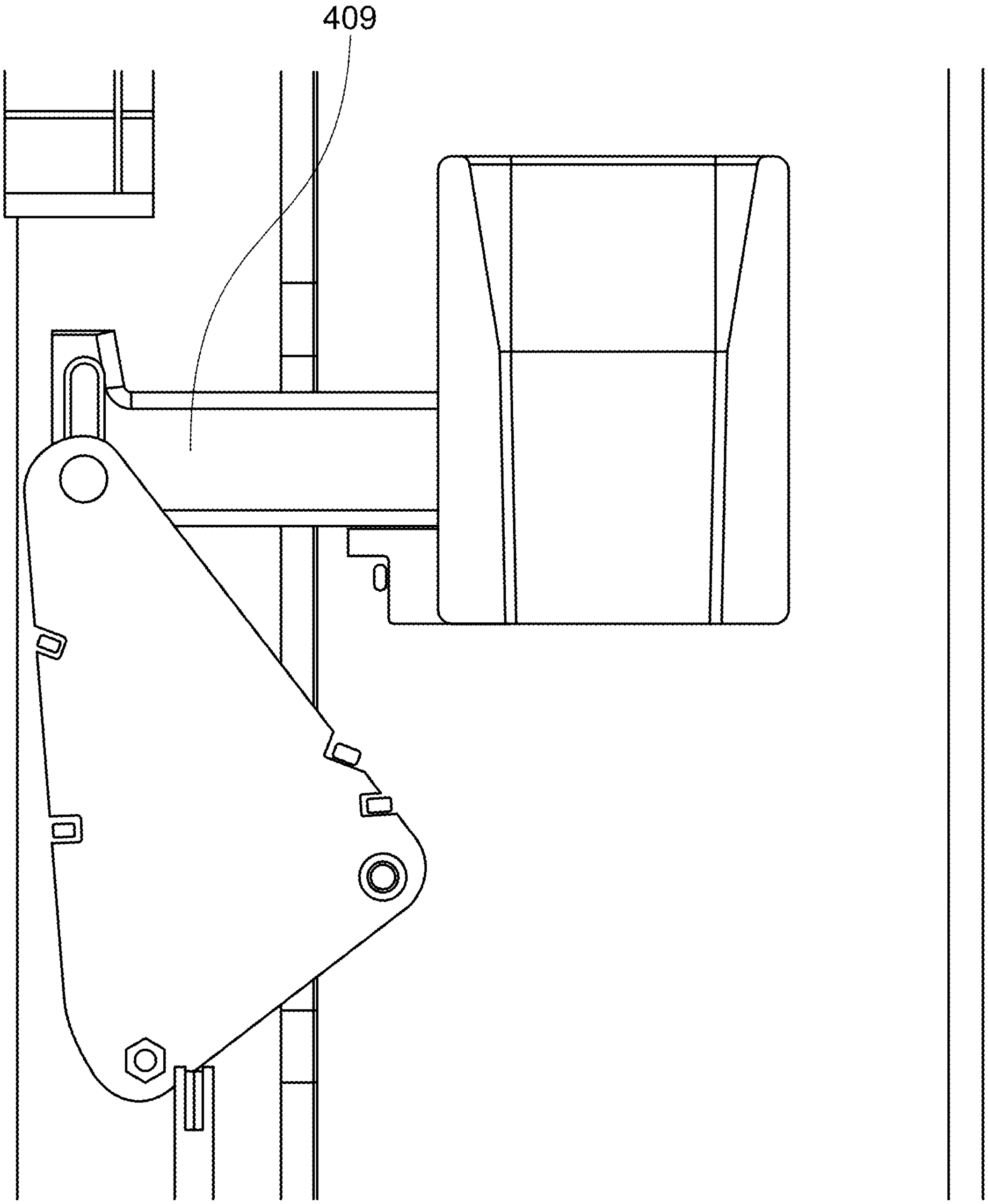
FIG. 4K is a view of an exemplary aspect of a roof lock.

FIG. 4A and FIG. 4B show that prior to operation of the roof lock lever 401, roof lock lever 401 can be stowed, e.g., stored, such that roof lock lever 401 does not protrude into an interior of container 100 when not in use. FIG. 4C, FIG. 4D and FIG. 4E show roof lock lever 401 removed from the stowed, e.g., stored, position, for example, by an operator lifting roof lock lever 401, without resistance. Prior to roof lock lever 401 engaging with a roof latch 409, roof lock lever 401 does not perform an unlocking function. FIG. 4F and FIG. 4G show that to engage roof lock lever 401 with roof latch 409, roof lock lever 401 can be moved, e.g., pulled, in a direction towards an interior of container 100, for example, by an operator. Moving, e.g., pulling, roof lock lever 401 can engage cam 411, which is connected by a rod 410 to roof latch 409, and allow roof lock lever 401 to perform an unlocking or locking function. Before roof lock lever 401 is engaged with cam 411, roof lock lever 401 moves freely without resistance. FIG. 4H shows the status of roof latch 409 of roof lock 400 during removal of roof lock lever 401 from the stowed, e.g., stored, position through engagement of roof lock lever 401 with roof latch 409. After roof lock lever 401 is engaged, lifting roof lock lever 401 in a vertical motion, for example, towards the roof, as shown in FIG. 4I and FIG. 4J, can disengage roof latch 409 from a locking position via rod 410, unlocking roof 101 from corner post 105, as shown in FIG. 4K. To unlock roof lock 400 and roof latch 409, roof lock lever 401 is moved or rotated towards roof 101, which moves, e.g., pulls, rod 410 downward away from roof 101 to disengage roof latch 409 and unlock roof lock 400.

To lock roof lock 400 and roof latch 409, roof lock lever 401 is moved or rotated away from roof 101, which moves, e.g., pushes, rod 410 upward towards roof 101 to engage roof latch 409 and lock roof lock 400. To lock roof latch 409, an operator can move, e.g., pull or push, roof lock lever 401 down (e.g., towards base 103), move (e.g., push) roof lock lever 401 in (e.g., towards side wall 102*a*) to disengage cam 411, and lower roof lock lever 401. Roof lock lever 401 cannot be moved towards the stowed, e.g., stored, position without engaging the roof latch 409, meaning roof lock lever 401 cannot lower be lowered unless the roof lock 400 is locked.

Figure 5A:
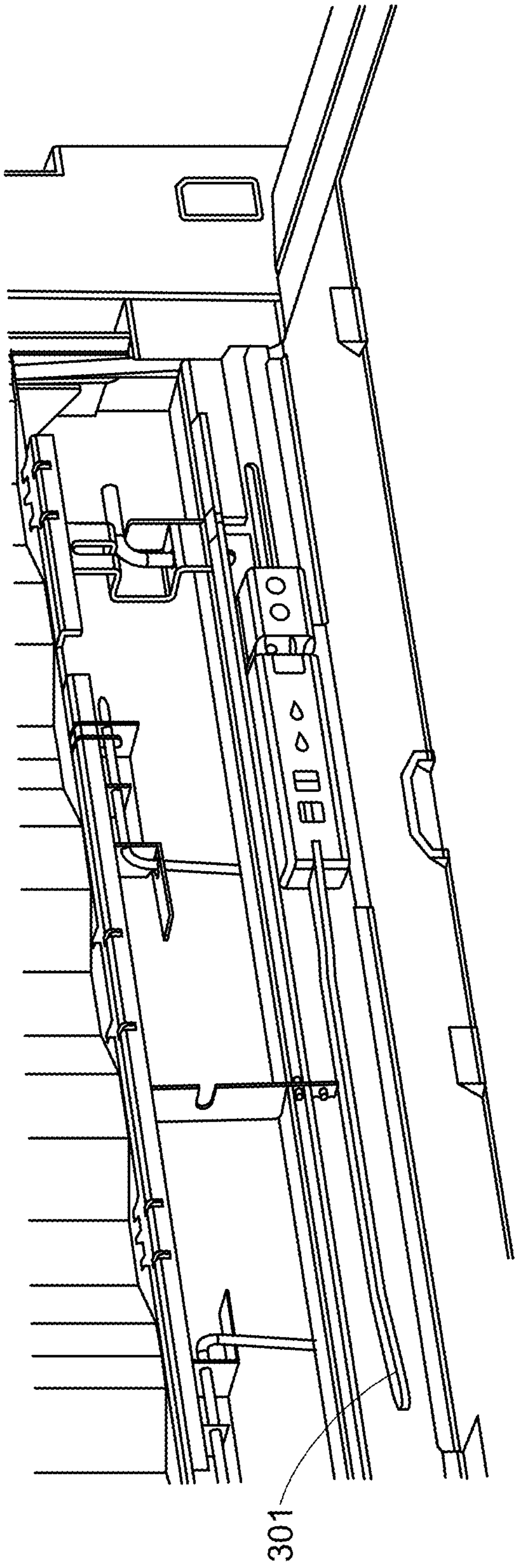
FIG. 5A is a view of an exemplary aspect of a base lock.
Figure 5B:
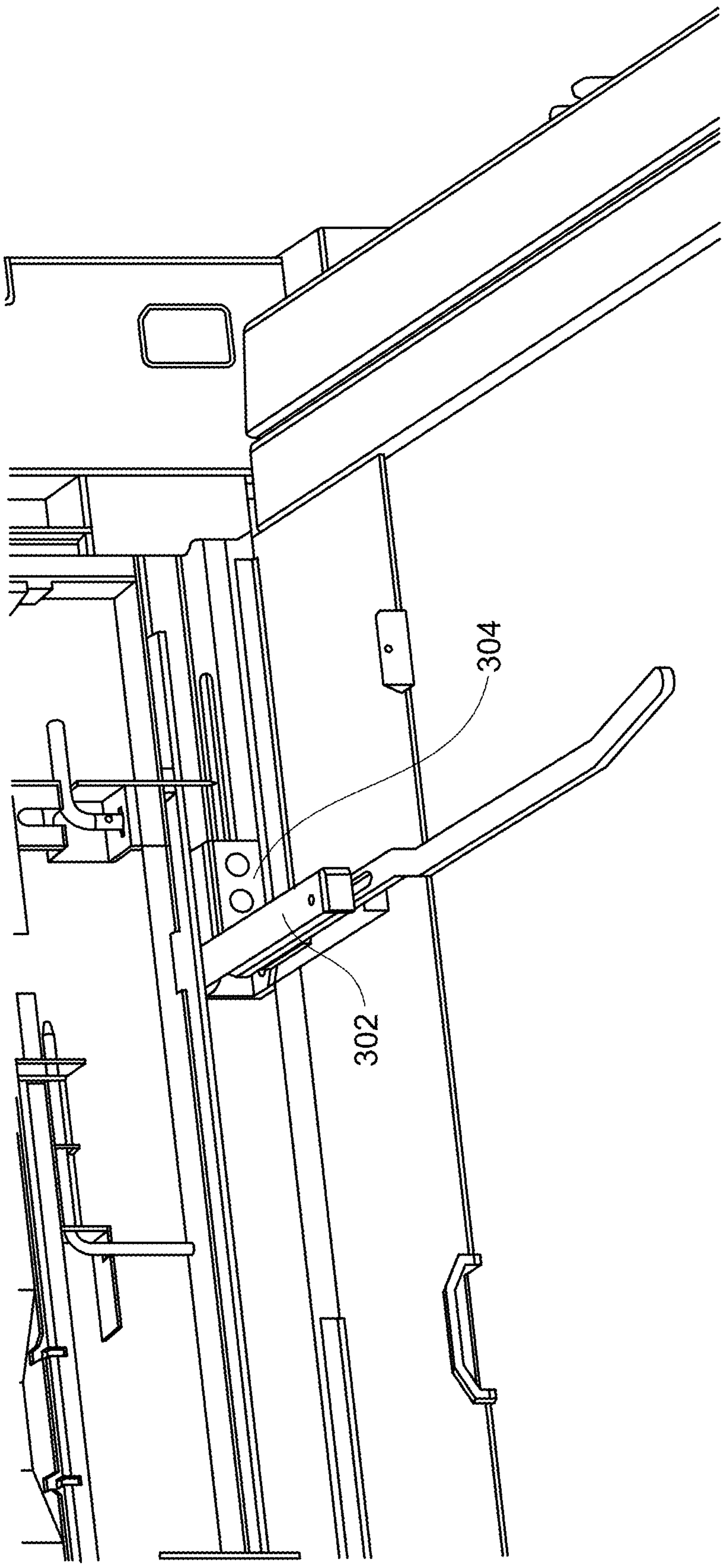
FIG. 5B is a view of an exemplary aspect of a base lock.
Figure 5C:
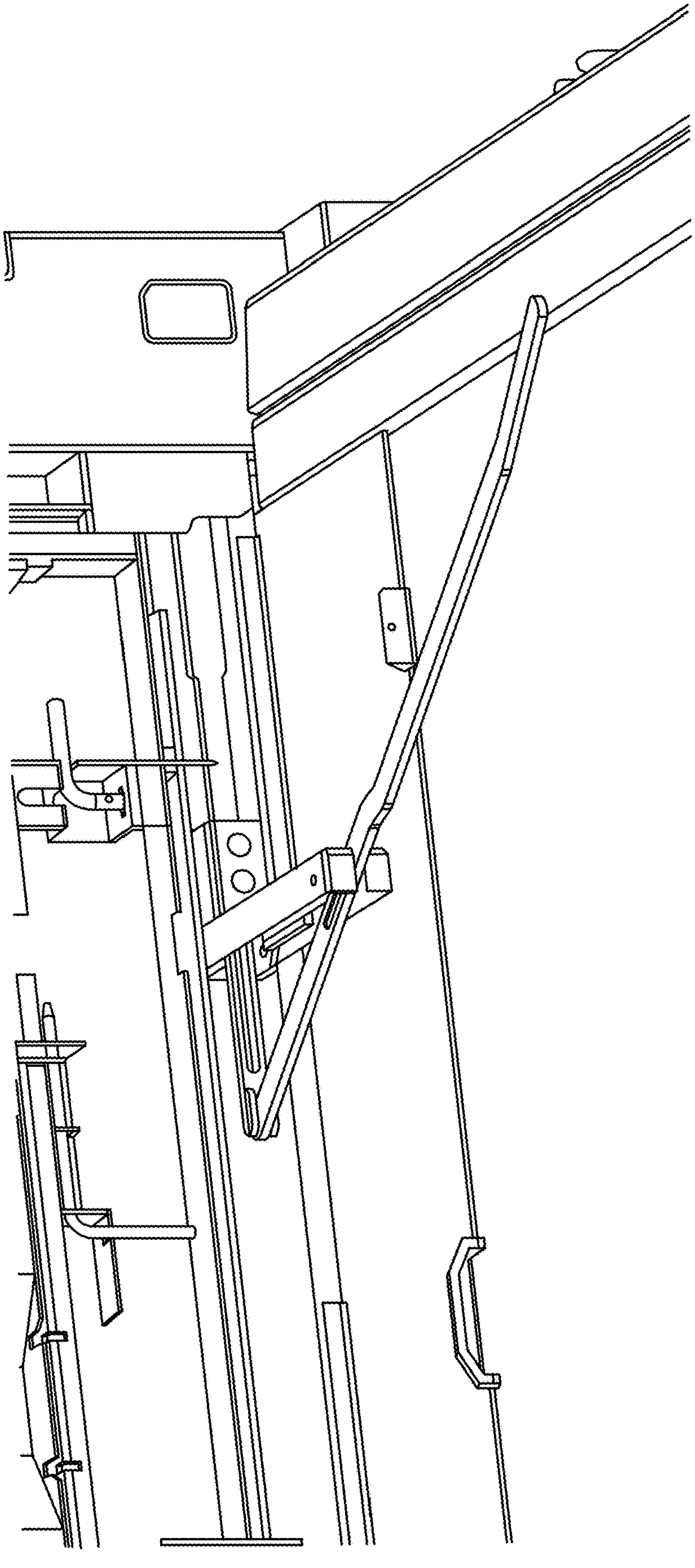
FIG. 5C is a view of an exemplary aspect of a base lock.

FIG. 5A shows that prior to operation, lever 301 of base lock 300 (hereinafter referred to as a "base lock lever") can be stowed, e.g., stored, within base 103 such that base lock lever 301 does not protrude from into an interior of container 100 when not in use. FIG. 5B shows the removing of base lock lever 301 from the stowed, e.g., stored, position in base 103, for example, by moving, e.g., pulling, base lock lever 301 towards a base latch of base lock 300. FIG. 5B also shows unlocking of pivot extender 302 and rotating the pivot extender 302 to a position perpendicular to side wall 102*a* and base part 304 of base lock 300. FIG. 5C shows the moving, e.g., pushing, of base lock lever 301, causing the base latch of base lock 300 to become disengaged from a locking position, unlocking the end wall to base 103 via corner post 105 of an end wall.

Figure 6A:
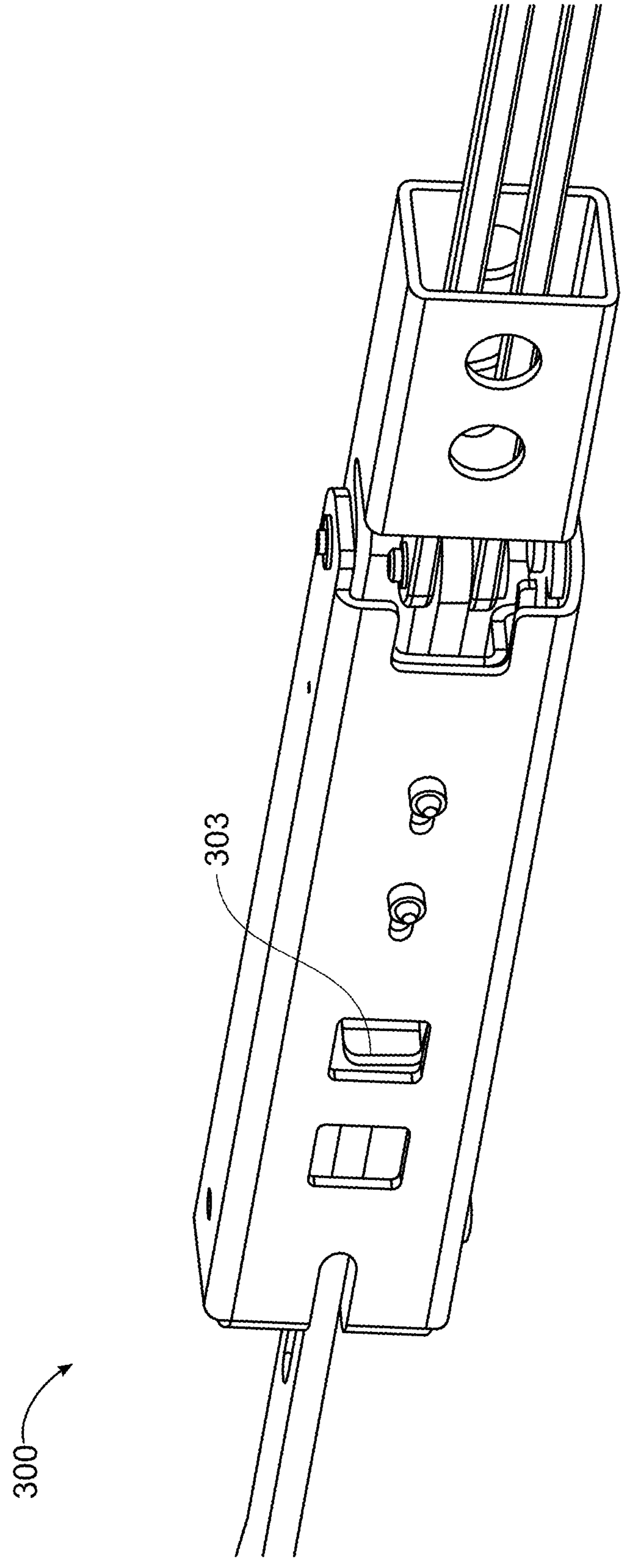
FIG. 6A is a view of an exemplary aspect of a base lock.
Figure 6B:
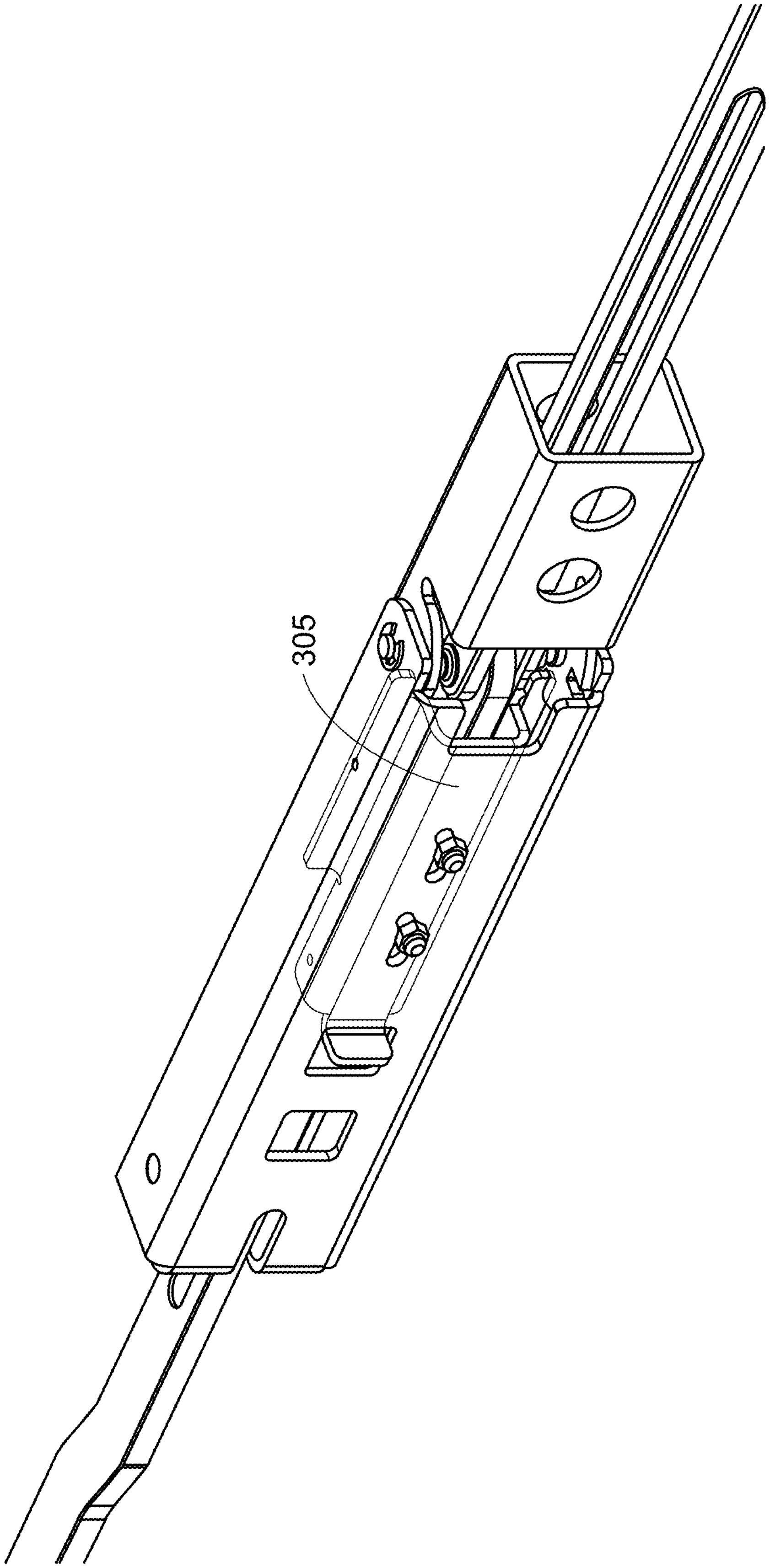
FIG. 6B is a view of an exemplary aspect of a base lock.
Figure 6C:
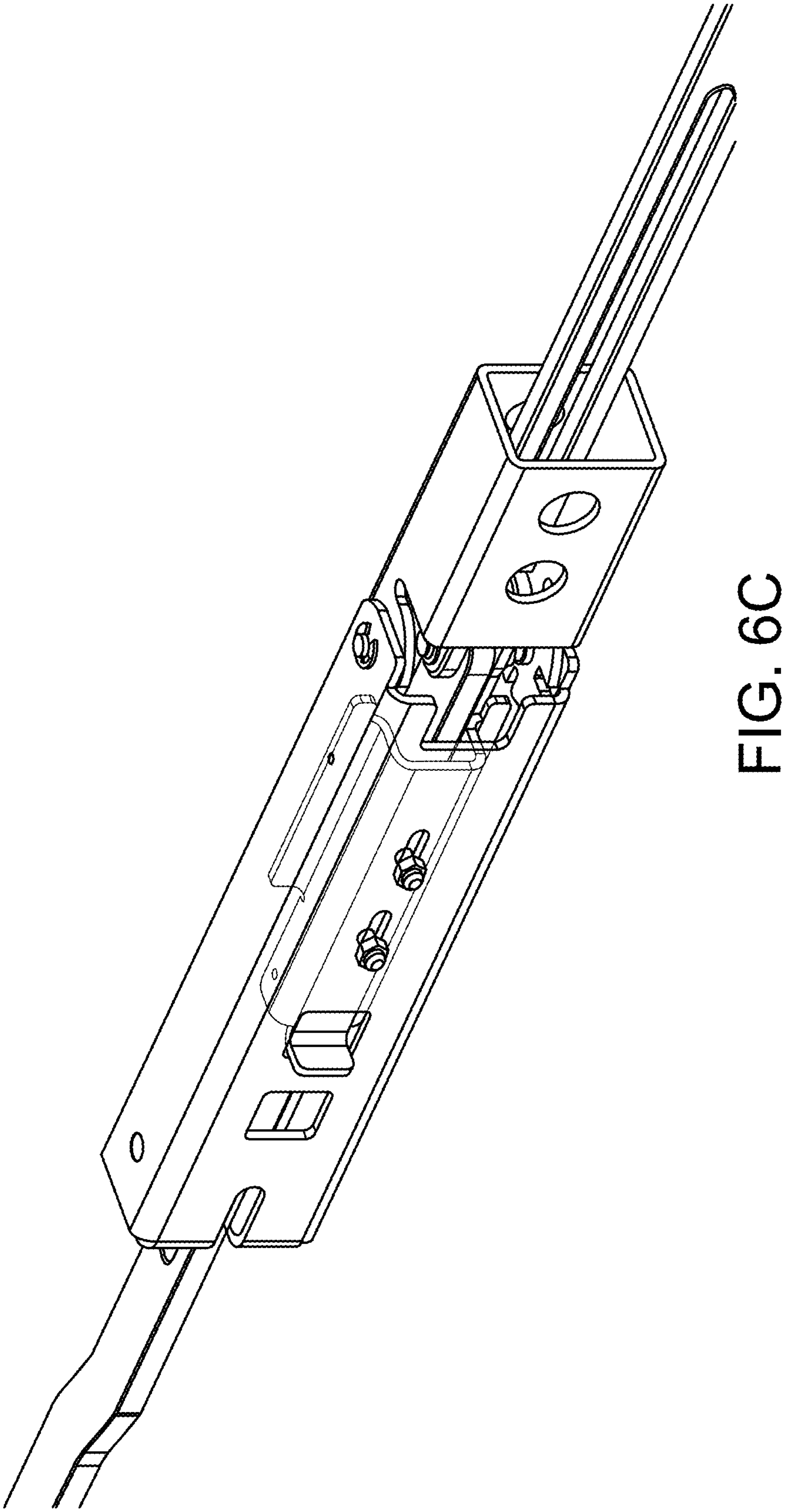
FIG. 6C is a view of an exemplary aspect of a base lock.
Figure 6D:
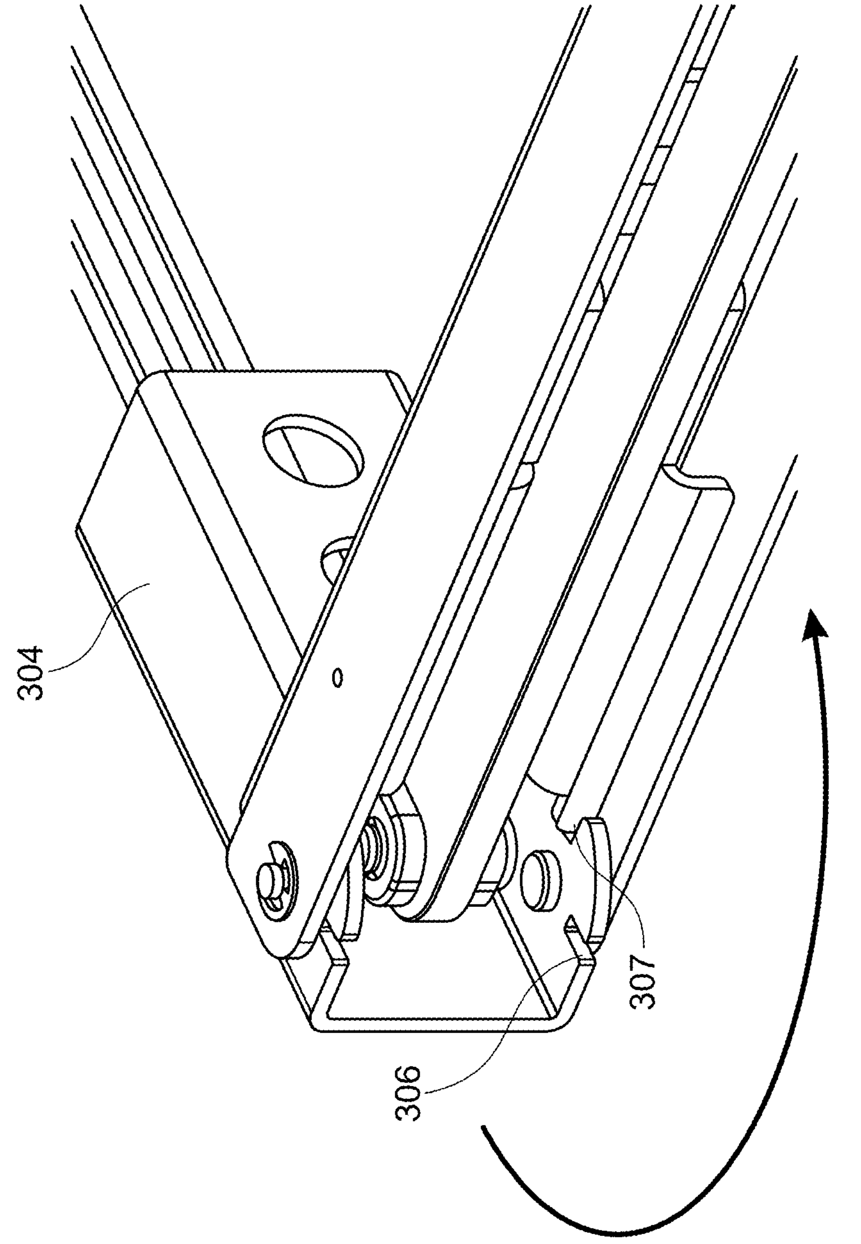
FIG. 6D is a view of an exemplary aspect of a base lock.
Figure 6E:
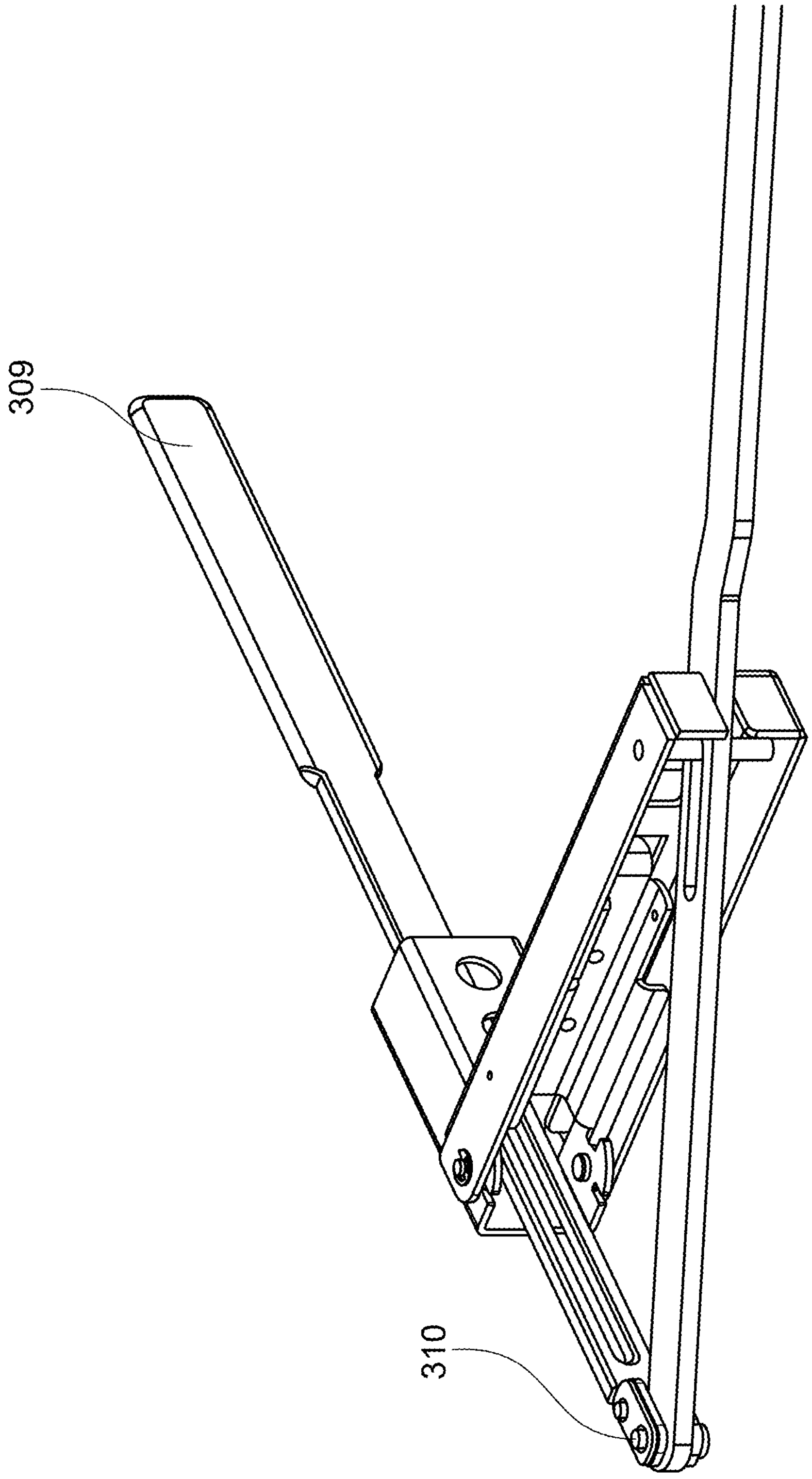
FIG. 6E is a view of an exemplary aspect of a base lock.

FIG. 6A shows unlocking of base lock 300 by moving a tongue 303 of a slider 305 (see FIG. 6B), which is held in a first notch 306 (see FIG. 6D) of base part 304 by a biasing element, such as a spring. Slider 305 is disengaged from first notch 306 (see FIG. 6C) by moving the tongue 303. Slider 305 can then be rotated 90 degrees relative to base part 304, by moving, e.g., pulling on, the tongue, at which point slider 305 is secured in a second notch 307 (see FIG. 6D). As shown in FIG. 6E, base lock lever 301 can then be moved, e.g., pulled, in a direction towards a base latch 309, which causes a pivot pin 310 of base lock lever 301 to move out of base part 304 and away from base latch 309, and moves base latch 309 out of a locking position. If base lock lever 301 is moved, e.g., pushed, in a direction away from base latch 309, base lock lever 301 moves, e.g., pushes, base latch 309 into a locking position (as in FIG. 6D).

Figure 7A:
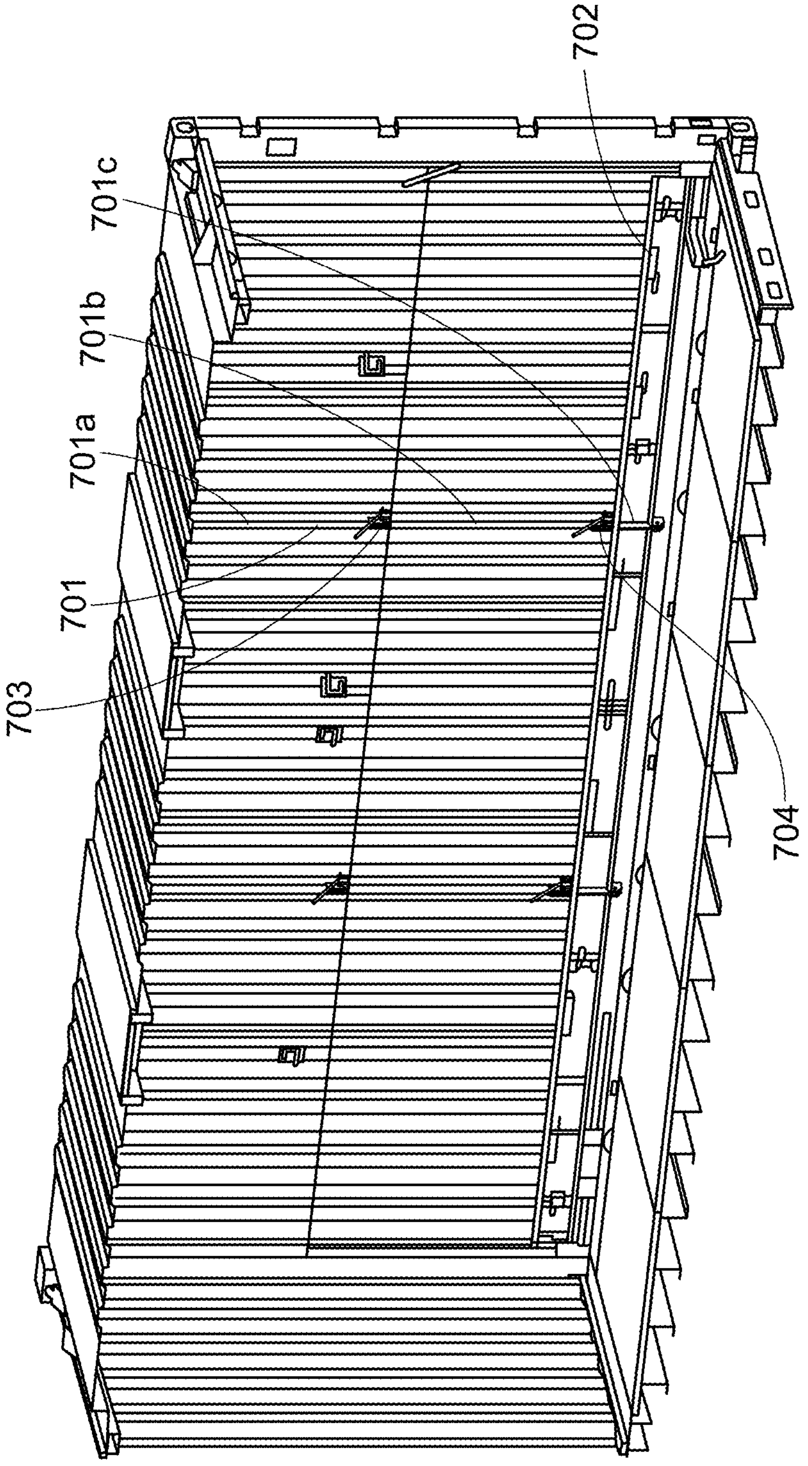
FIG. 7A is a perspective view of an exemplary aspect of a container.

FIG. 7A shows collapsible (support) columns 701 including a first section 701*a*, a second section 701*b*, and a third section 701*c*, side panel locks 702, first column locks 703, and second column locks 704. First section 701*a* can be on a first leaf of the bi-fold side that has one end attached, e.g., coupled, to roof 101, a third section 701*c* can be attached, e.g., coupled, to base 103, and second section 701*b* can be on a second leaf of the bi-fold side, between first section 701*a* and third section 701*c*. When first section 701*a*, second section 701*b*, and third section 701*c* are interconnected, first section 701*a*, second section 701*b*, and third section 701*c* form collapsible column 701 spanning from base 103 to roof 101. In an aspect, disclosed is a wall of a container that can include a column that can be disengaged, e.g., unlocked, to fold the wall and engaged, e.g., locked, to strengthen the wall, container, or a combination thereof, for example, without extra reinforcement. The foldable wall can include a disengageable support column. The foldable wall can be a bi-fold wall. The foldable wall can include a disengageable support column.

Figure 7B:
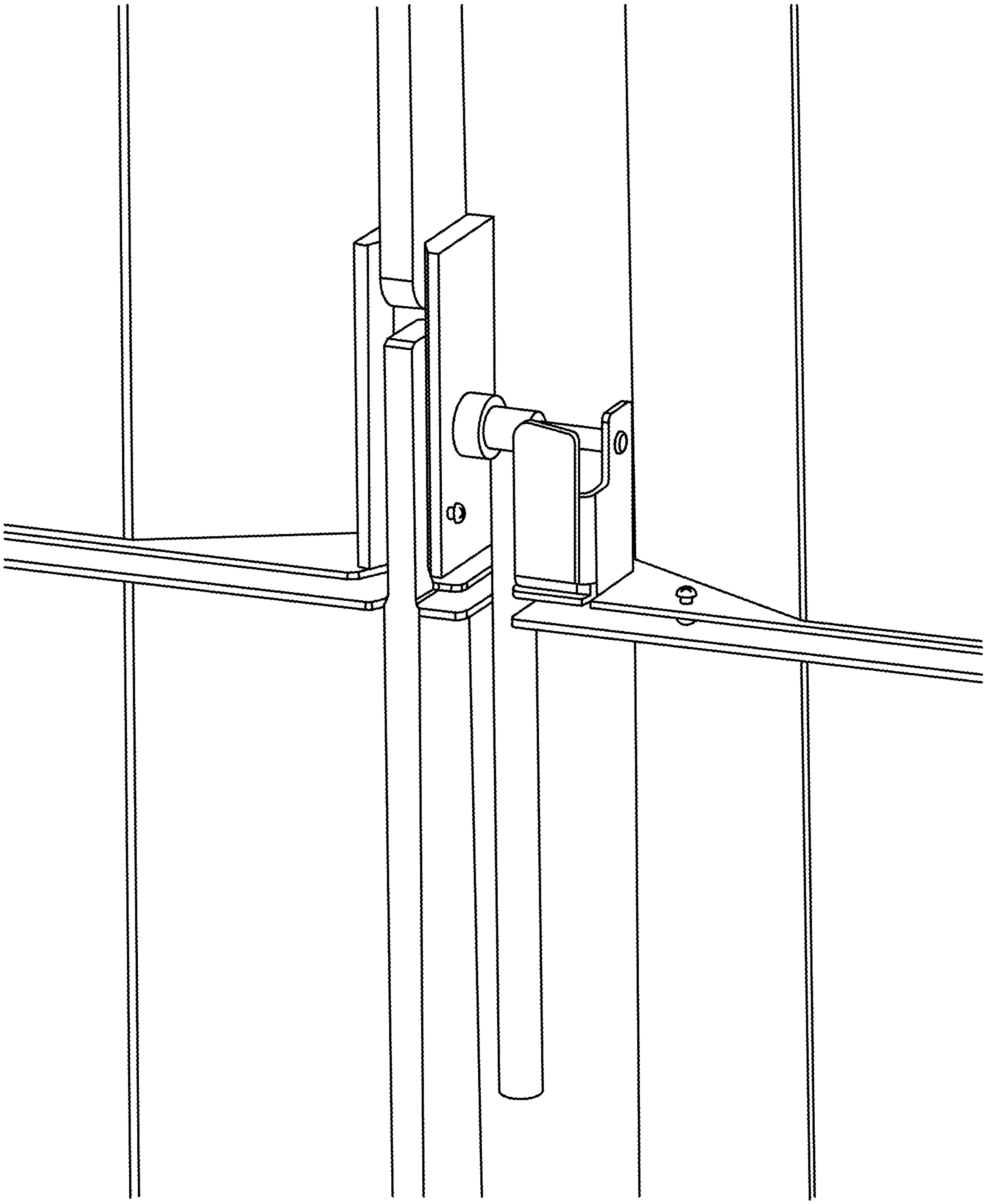
FIG. 7B is a view of an exemplary aspect of a column lock.
Figure 7C:
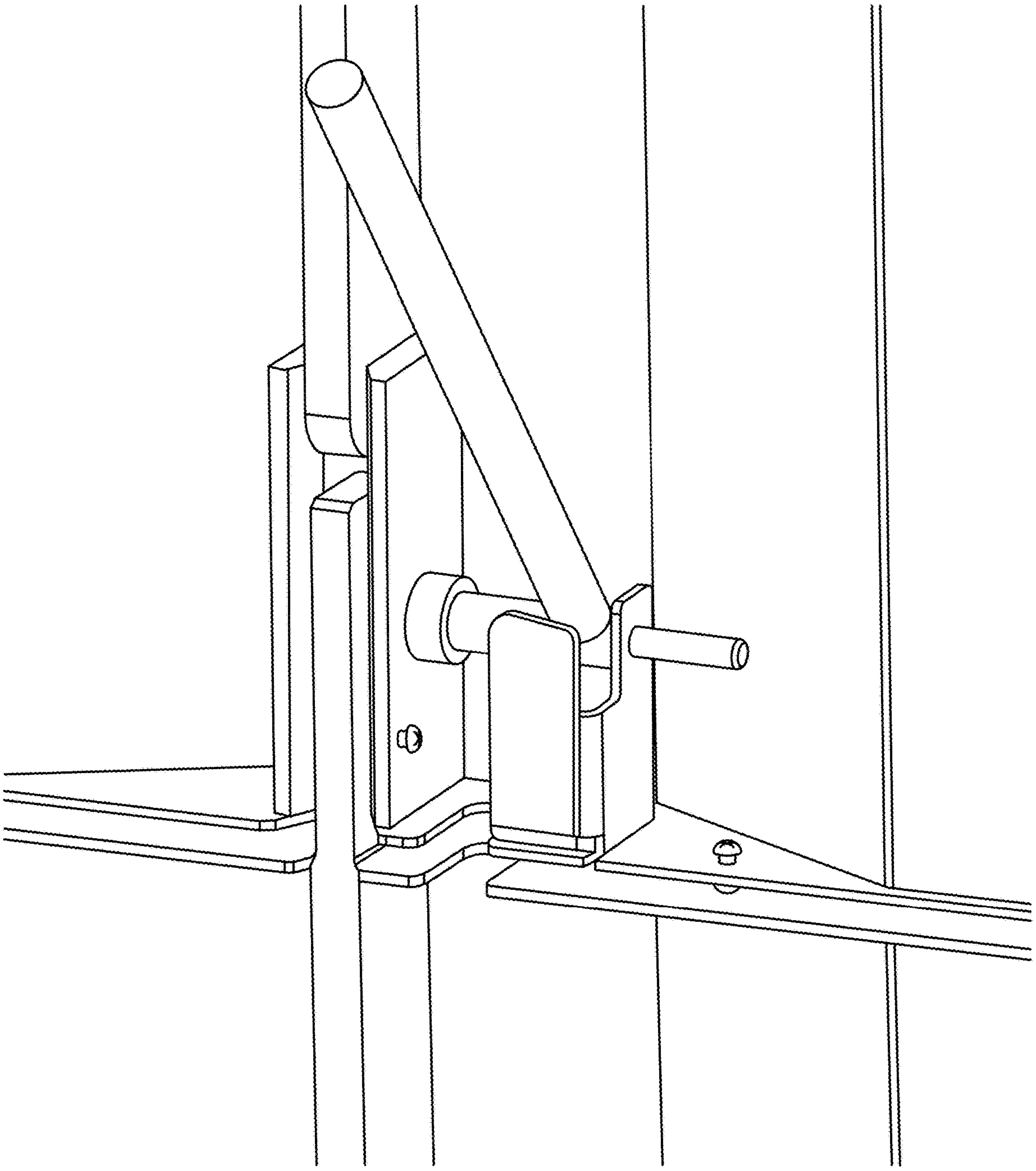
FIG. 7C is a view of an exemplary aspect of a column lock.
Figure 7D:
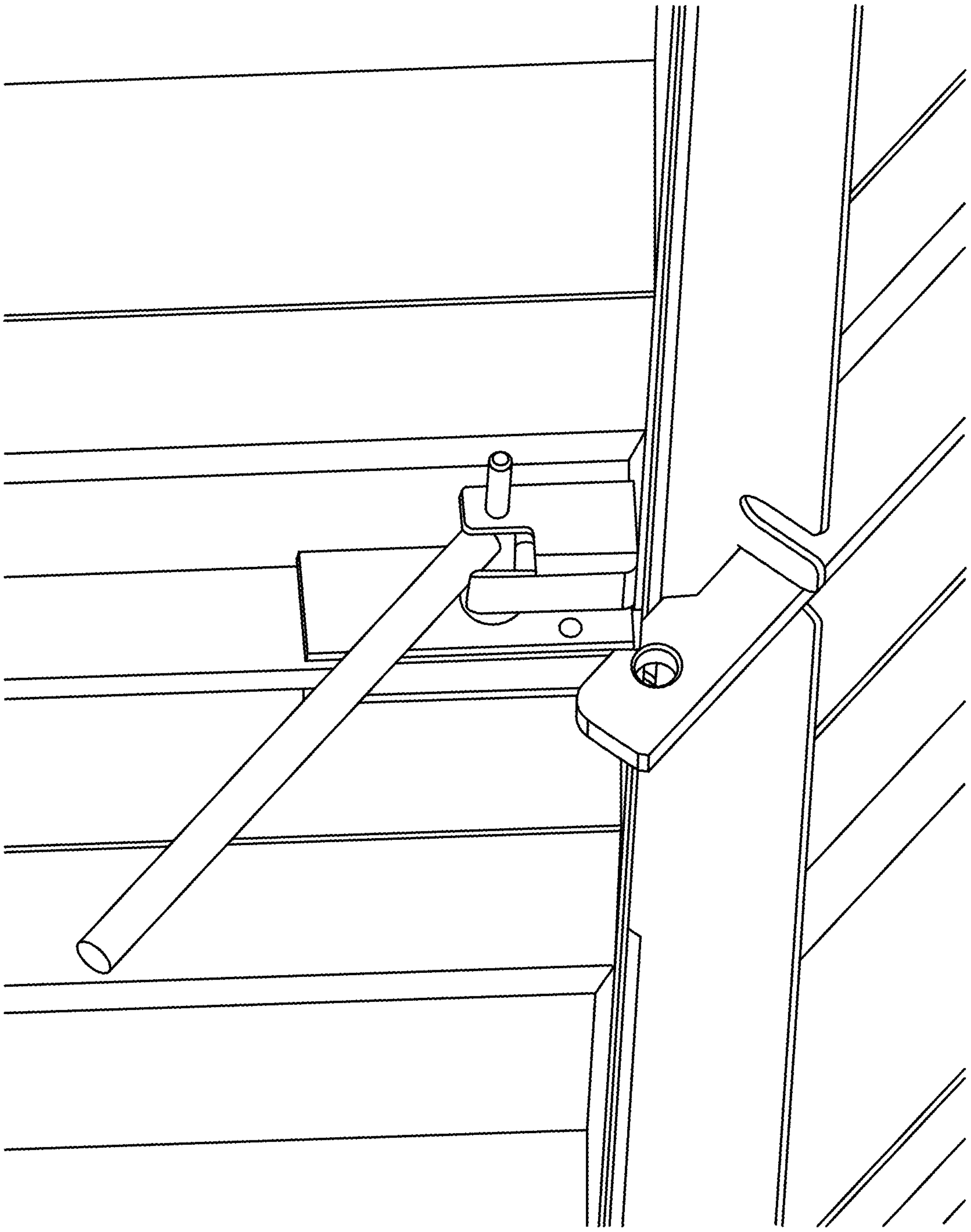
FIG. 7D is a view of an exemplary aspect of a column lock.
Figure 7E:
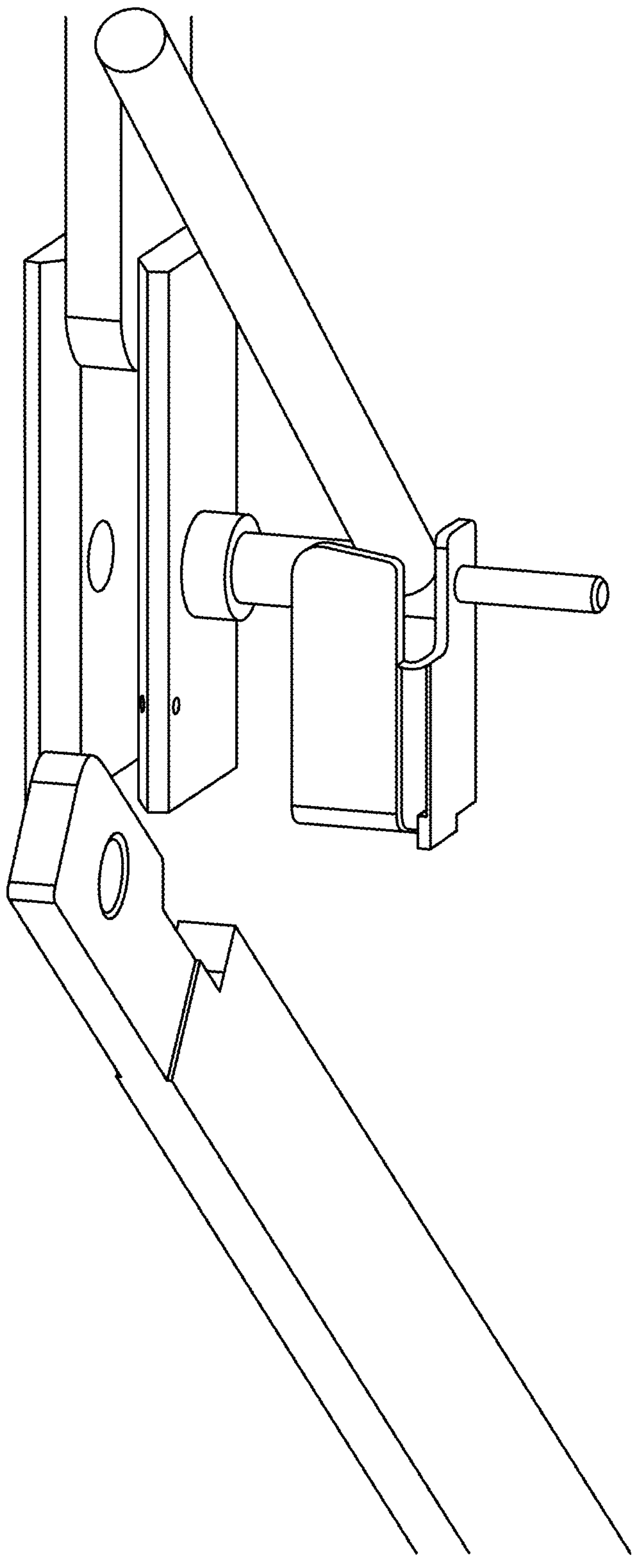
FIG. 7E is a view of an exemplary aspect of a column lock.
Figure 7F:
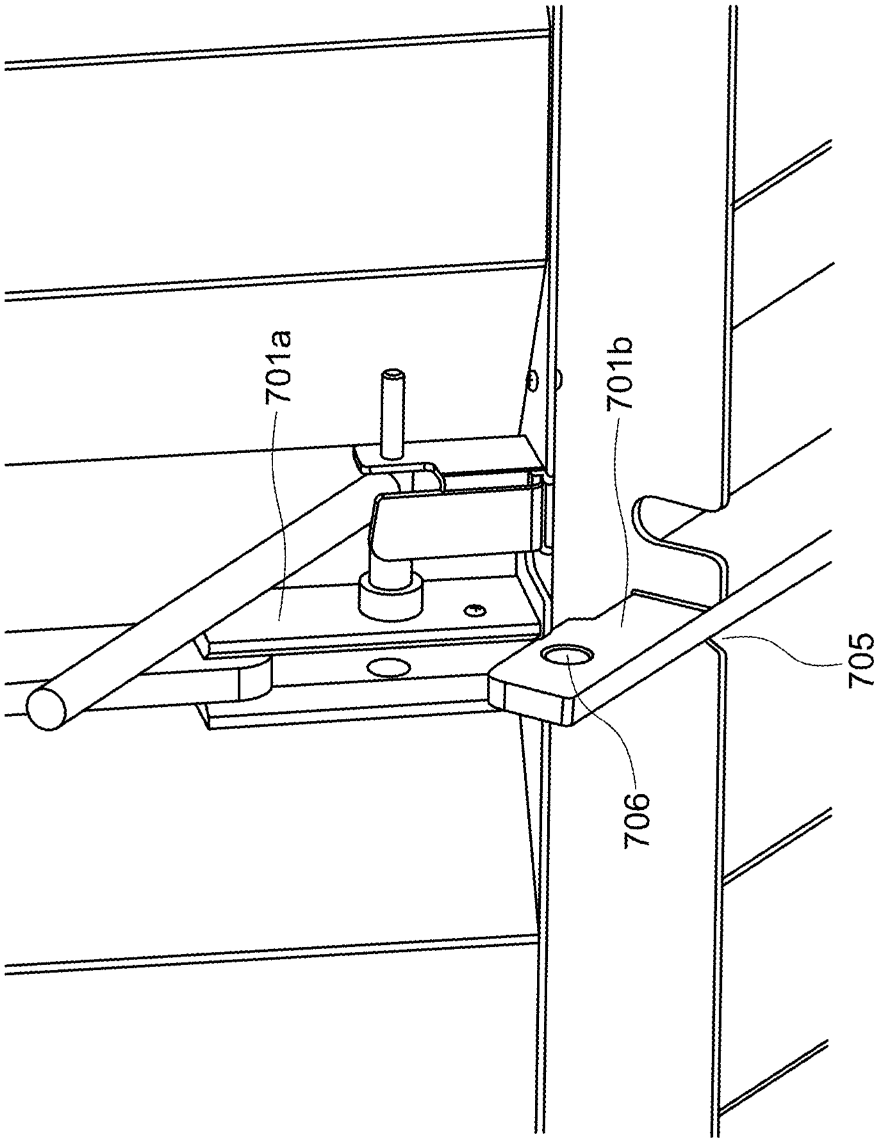
FIG. 7F is a view of an exemplary aspect of a column lock.
Figure 7G:
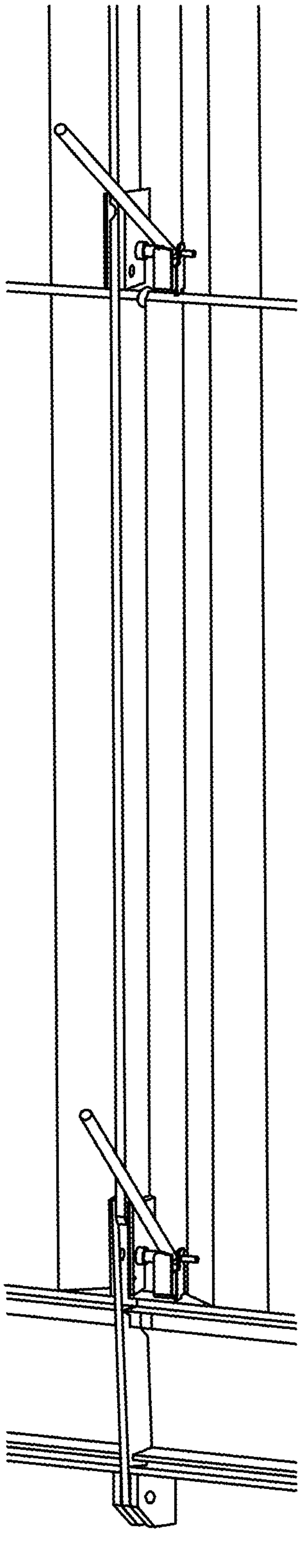
FIG. 7G is a view of an exemplary aspect of column locks.
Figure 7H:
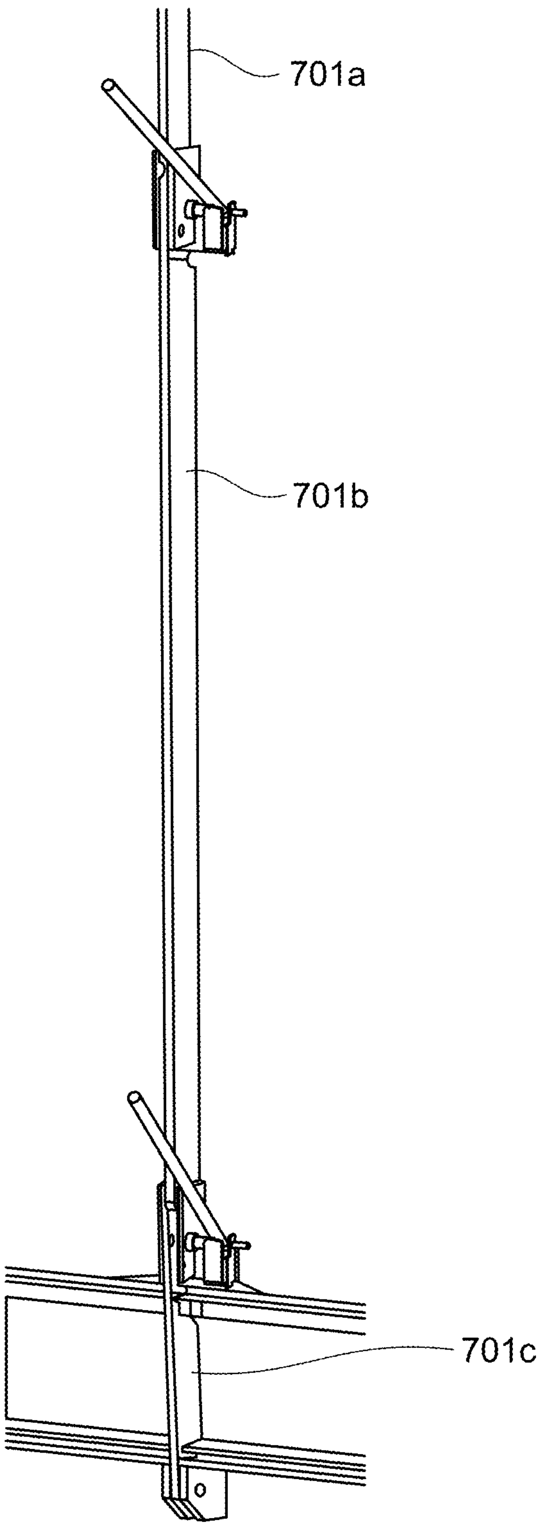
FIG. 7H is a view of an exemplary aspect of column locks.

FIG. 7B shows an enlarged view of first column lock 703 in a locked position; FIG. 7C, FIG. 7D, FIG. 7E, and FIG. 7F show enlarged views of first column lock 703 in an unlocked position; and FIG. 7G and FIG. 7H are views of first column lock 703 and second column lock 704 in an unlocked position. In FIG. 7E and FIG. 7H, side wall 102*a* has been removed from view. FIG. 7C shows first section 701*a* and second section 701*b* in a linear position with respect to one another but with first column lock 703 unlocked, as a pin is not extended into a hole in second section 701*b*. The bi-fold side can be folded, assuming that second column lock 704 is also unlocked. FIG. 7D, FIG. 7E, and FIG. 7F, shows the bi-fold side in a partial folded state, with first section 701*a* and second section 701*b* not in a linear position with respect to one another. A slot 705 can help align second section 701*b* and first section 701*a* and allow a pin to be extended into a hole 706 in second section 701*b* once first section 701*a* and second section 701*b* are put into a linear position with respect to one another.

First column lock 703 can interlock first section 701*a* and second section 701*b* with first section 701*a* and second section 701*b* being in a linear position and second column lock 704 can interlock second section 701*b* and third section 701*c* with second section 701*b* and third section 701*c* being in a linear position. First column lock 703 and second column lock 704 operate similarly. With reference to the description of first column lock 703 herein, a similar description can be made with respect to second column lock 704, with third section 701*c* (in a description of second column lock 704) corresponding to second section 701*b* (in a description of first column lock 703) and second section 701*b* (in a description of second column lock 704) corresponding to first section 701*a* (in a description of first column lock 703). To lock second column lock 704, third section 701*c* can be raised manual.

Figure 7I:
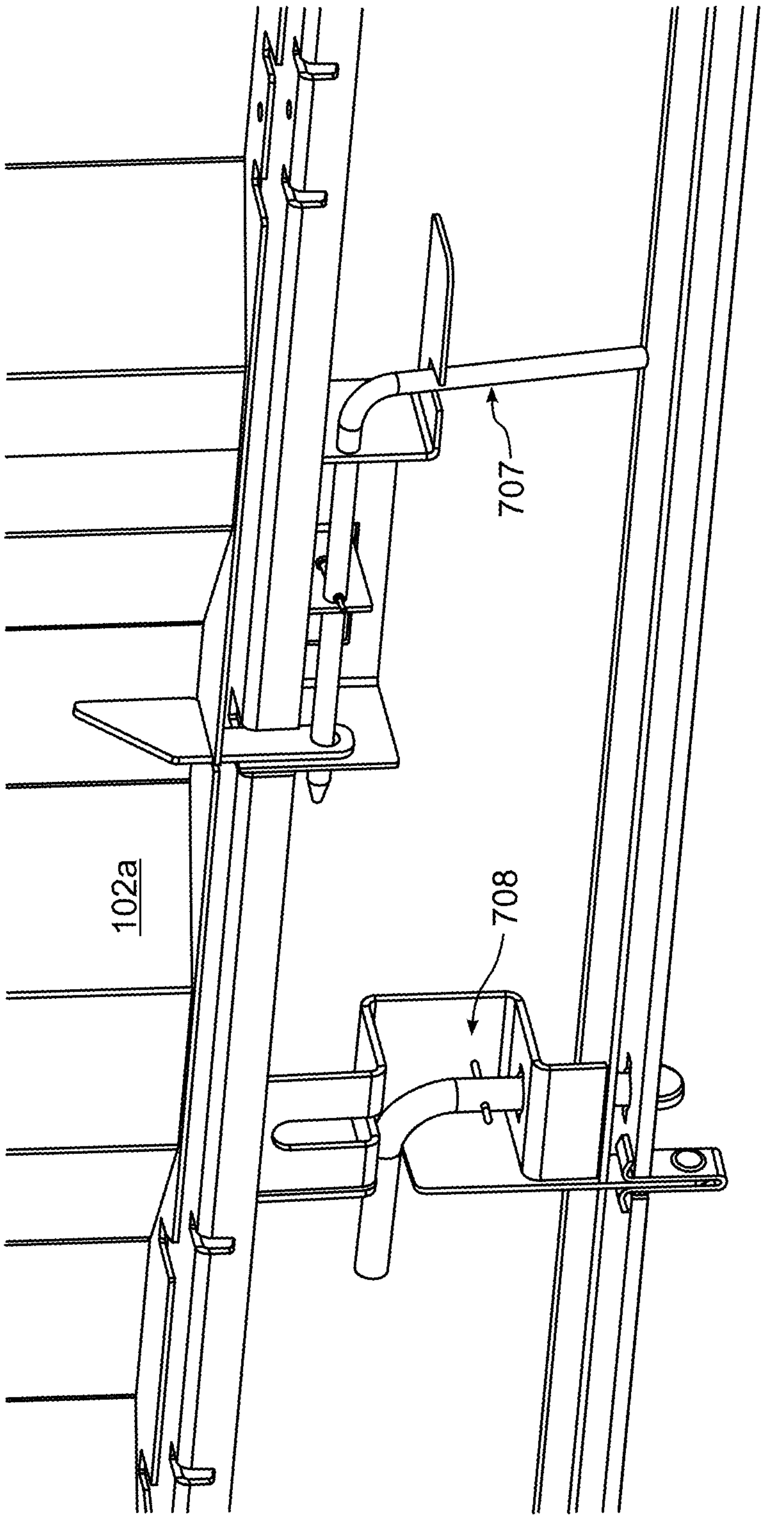
FIG. 7I is a view of an exemplary aspect of a side panel lock and a foldable extension panel lock.
Figure 7J:
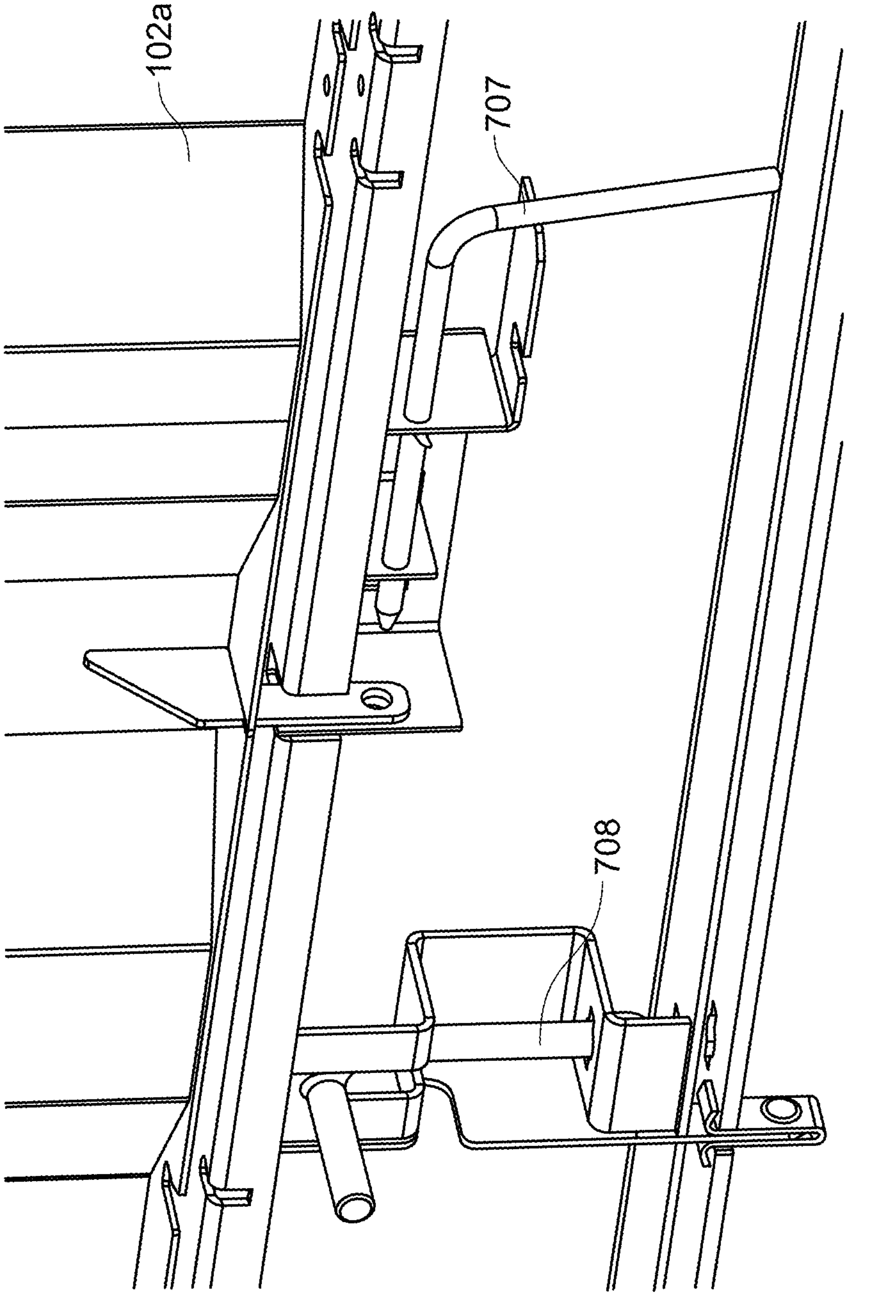
FIG. 7J is a view of an exemplary aspect of a side panel lock and a foldable extension panel lock.

FIG. 7I and FIG. 7J show enlarged views of a side panel lock 702 and a foldable extension panel lock. A foldable extension panel will be described further with reference to FIG. 8A and FIG. 9. FIG. 7I shows each of a side wall latch 707 and an extension panel latch 708 in a locked position and FIG. 7J shows each of side wall latch 707 and extension panel latch 708 in an unlocked. Side panel locks 702 and the foldable extension panel locks operate similar to a door latch in that a latch can be moved, e.g., pushed in, and rotated to lock and rotated in an opposite direction and moved in an opposite direction, e.g., pulled out, to unlock.

Figure 8A:
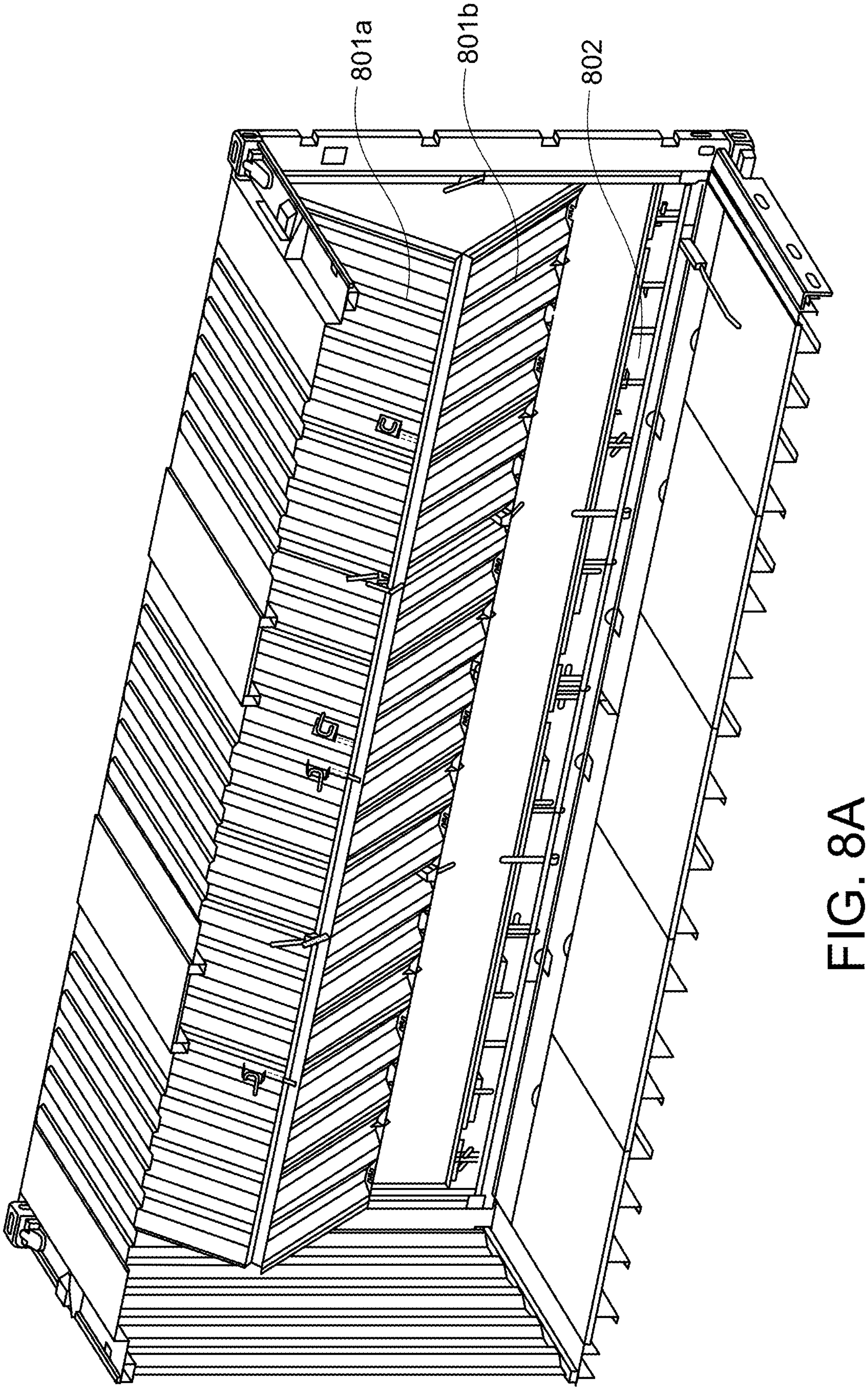
FIG. 8A is a perspective view of an exemplary aspect of a container.

FIG. 8A shows side panels 801*a*, 801*b* of side wall 102*a* in a partial bi-fold stage after disengagement of side panel locks 702. An operator can move (e.g., pull) side panels 801*a*, 801*b* inward, and side panels 801*a*, 801*b* are moved (e.g., pulled) up (e.g., towards roof 103) and folded by a constant-force device and secured against roof 101 by the constant-force device. The constant-force device may be, for example, a constant-force spring, e.g., a metal constant-force spring, a gas spring, a hydraulic device, an electric device providing constant force, or a combination thereof. The constant-force device acts as a counterweight, easing performance of a function such as lifting of side panels 801*a*, 801*b*, and allowing a single operator to perform the function. This process is repeated for the side panels of the opposite side wall. While bi-fold side panels are illustrated and described herein, this configuration is merely exemplary. In an aspect, side walls 102*a* can have three or more side panels 801. The foldable wall can be connected to the roof and inwardly foldable towards the roof. The foldable wall can include panels connected by a hinge.

The height of container 100 can be greater than the width of container 100. If the height of the side walls was to cover the entire side of container 100, when bi-folded, opposing side walls would collide each other in the interior of container 100. Accordingly, the height of the side walls can be less than the height of container 100 and base 103 can include a foldable extension panel 802 at each side of container 100 to cover a gap between base 103 and the end of the side wall 102*a*. Base lock 300 is between base 103 and foldable extension panel 802, and base lock 300 can operate when foldable extension panel 802 is raised or lowered. As shown, side wall 102*a* can fold inward, for example, for compact storage. In an aspect, side panels can fold outward.

Figure 8B:
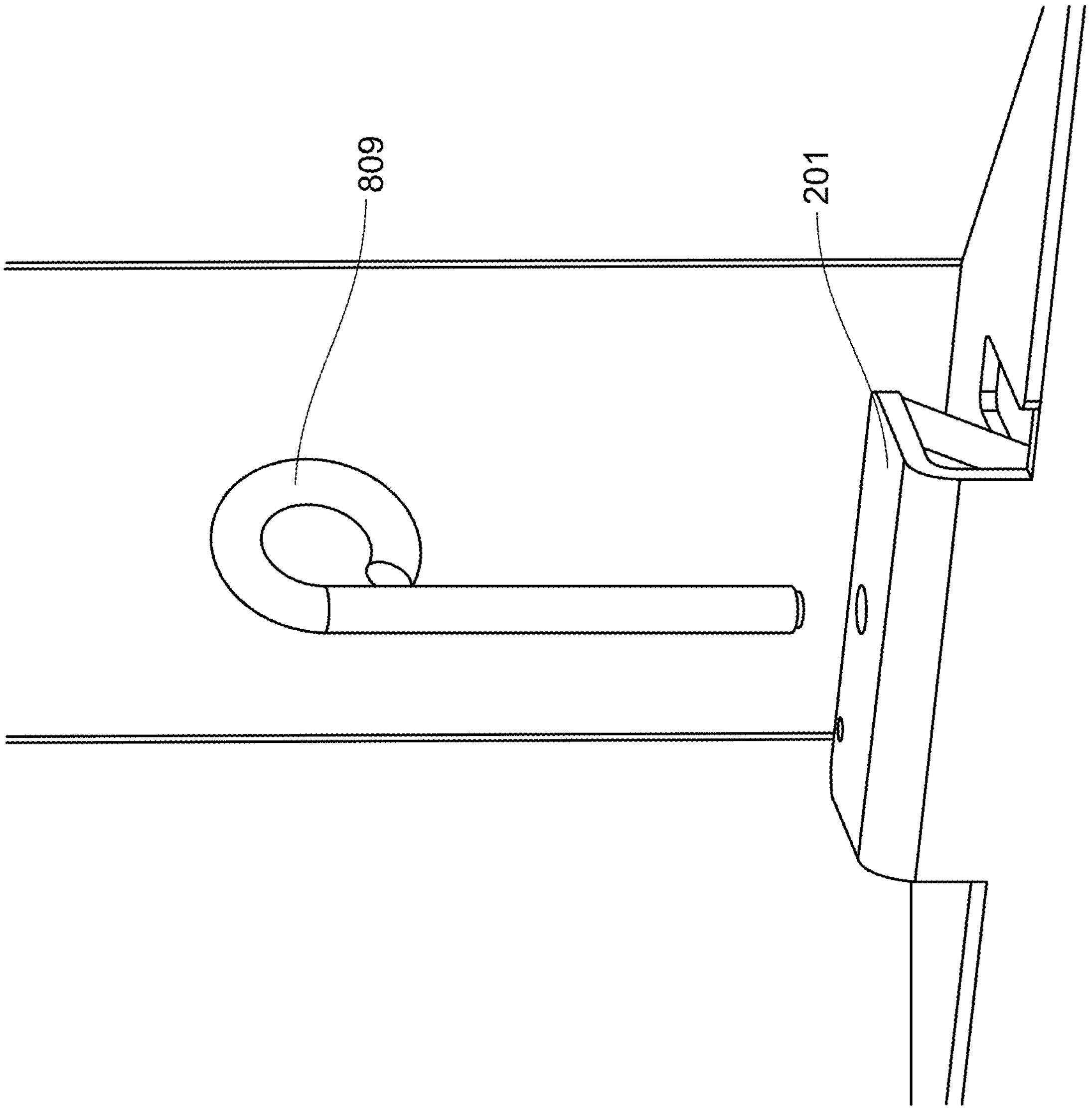
FIG. 8B is a view of an exemplary aspect of a lock for a base protection panel.

A lock for base protection panel 201 can be located between the side wall 102*a* and foldable extension panel 802. FIG. 8B shows an aspect of a lock for base protection panel 201, which includes a locking pin 809 that can be inserted into a hole in base protection panel 201. In an aspect, the lock for base protection panel 201 can include, for example, a slide bolt, a pin, a latch, a bungee cord, or a combination thereof.

Figure 8C:
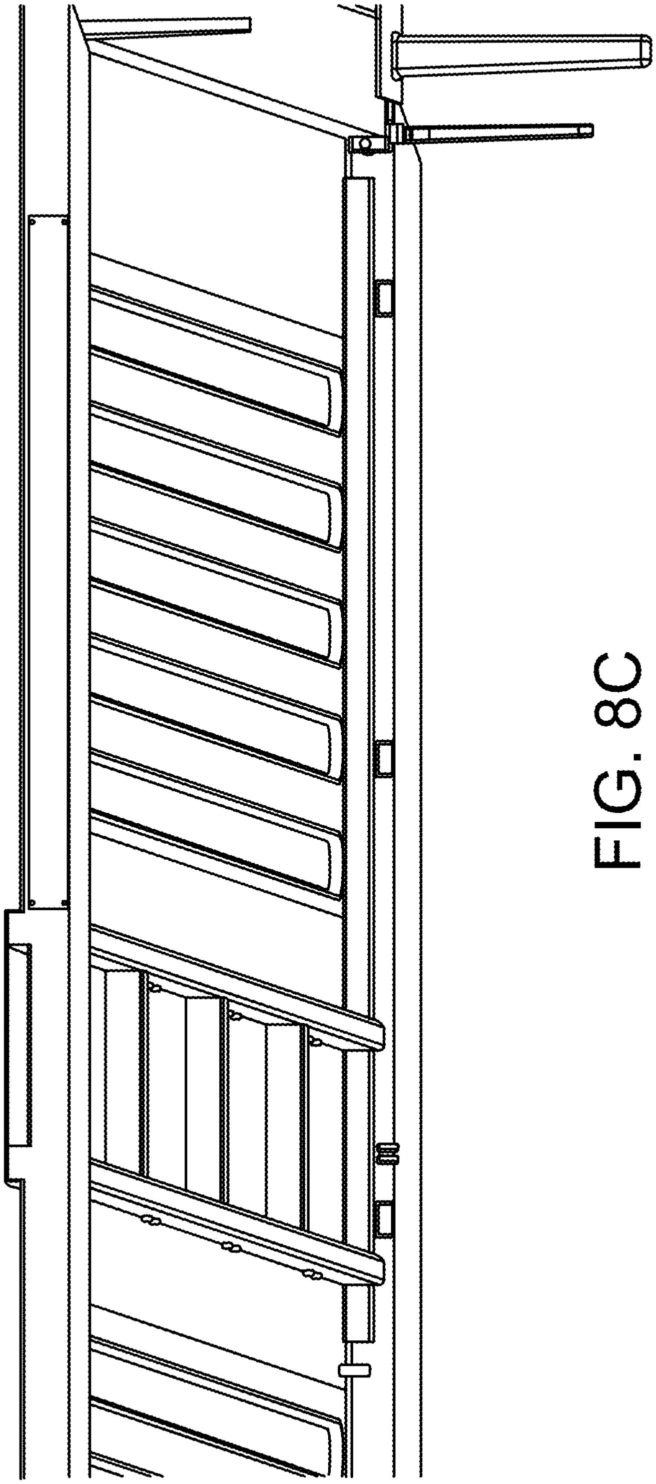
FIG. 8C is a view of an exemplary aspect of a location of a constant-force device.
Figure 8D:
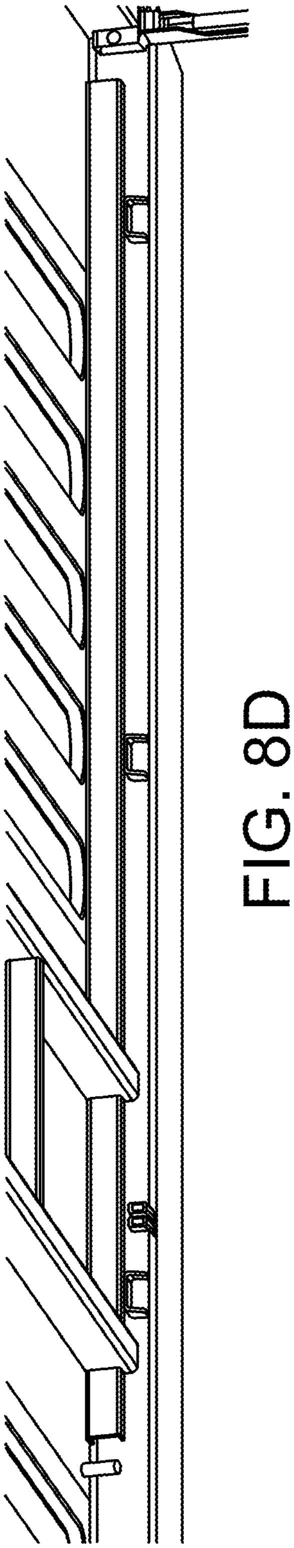
FIG. 8D is a view of an exemplary aspect of a location of a constant-force device.
Figure 8E:
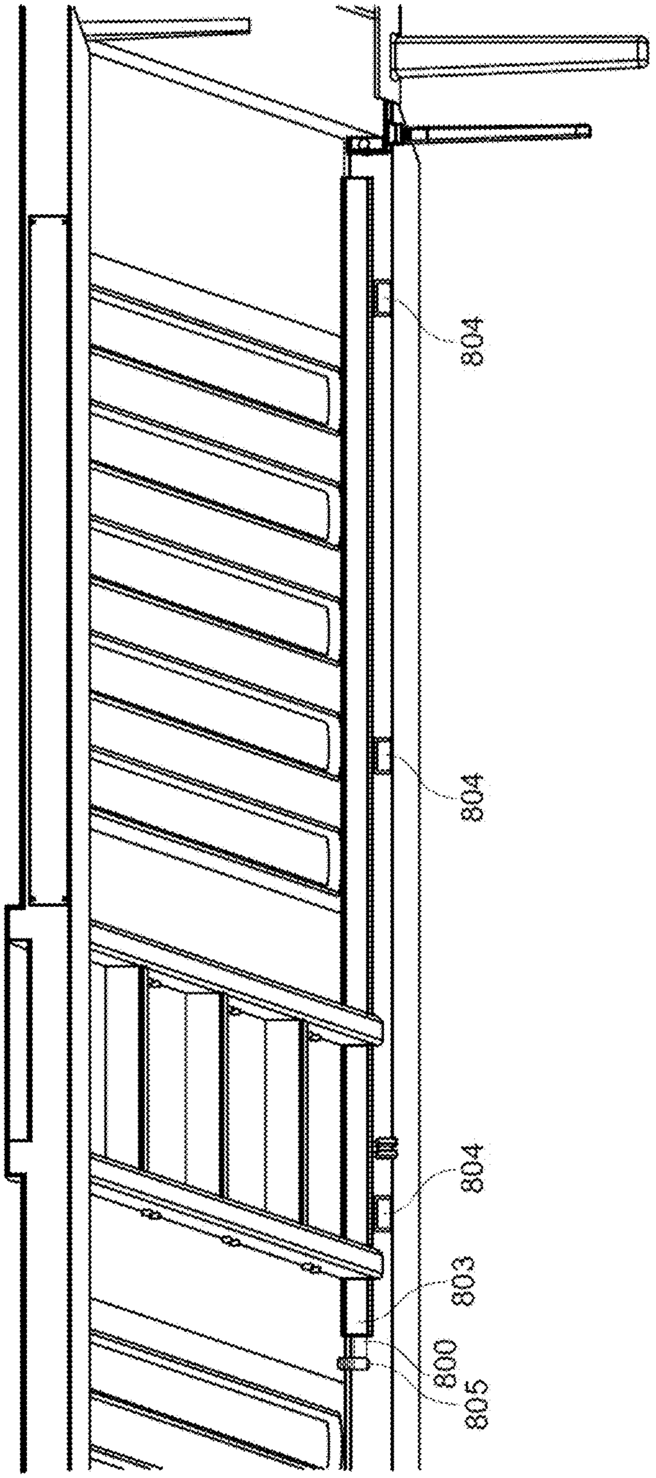
FIG. 8E is a view of an exemplary aspect of a location of a constant-force device.

FIG. 8C, FIG. 8D, and FIG. 8E show a location of a constant-force device 800 for raising the side panels. A channel 803 for a constant-force spring 800 can be located under roof 101 and above hinges 804 of the side panels. The constant-force spring 800 can include a drum 805, around which the spring is wound. Having the constant-force spring 800 in channel 803 can help prevent an end of the constant-force spring 800 that is not wound around drum 805 from curling out of shape after the constant-force spring 800 extents a certain distance. A hinge can connect the foldable wall to the roof.

Figure 9:
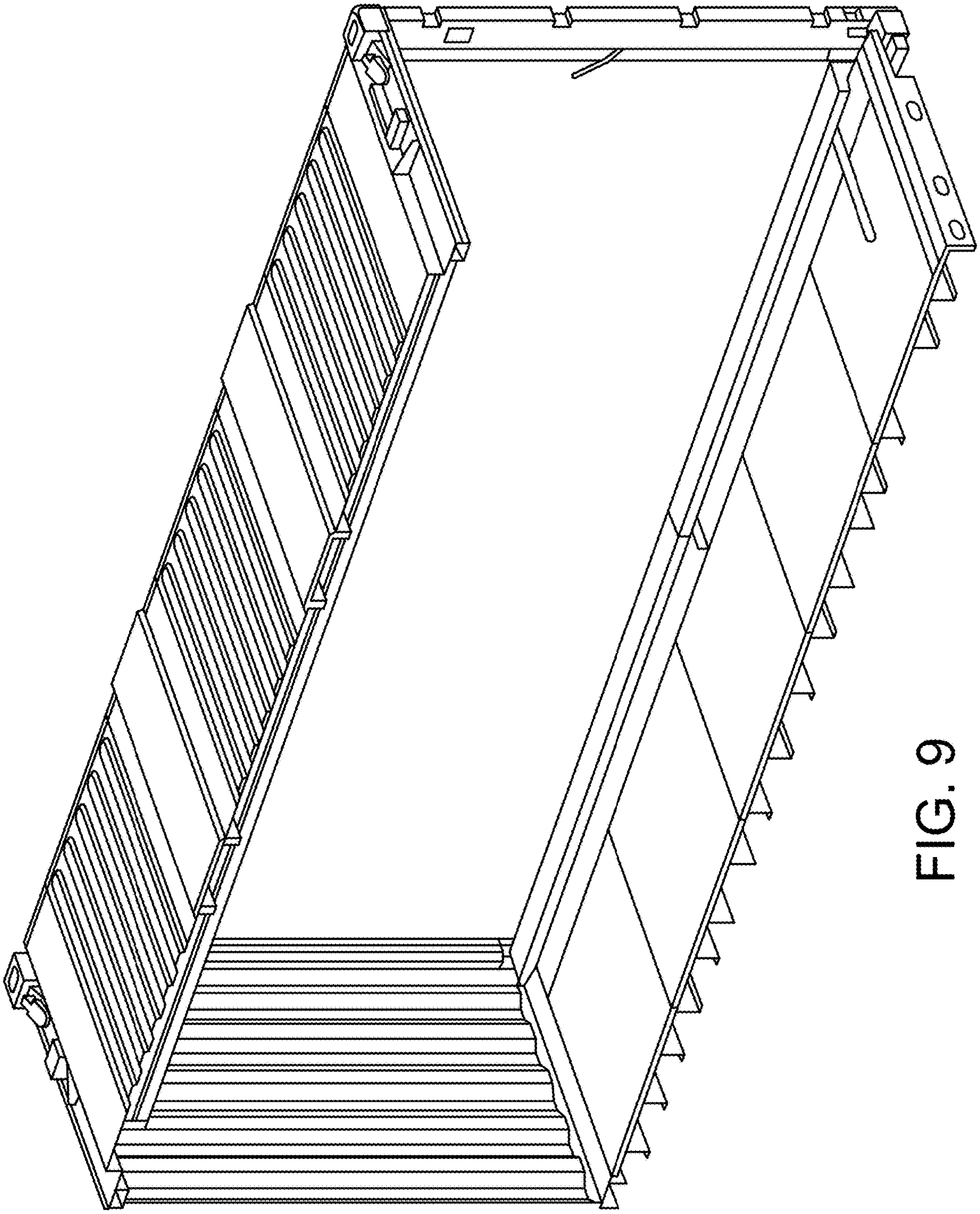
FIG. 9 is a perspective view of an exemplary aspect of a container.

In FIG. 9, foldable extension panels 802 are lowered. Locks (as shown in FIG. 7I and FIG. 7J) at and along base 103 can secure foldable extension panel 802 in an upright, e.g., erect, position before being lowered. After completing the unlocking steps, doors of container 100, which, for example, can be present in one or both of the end walls 104, 104*b*, can be closed and all locking mechanisms are disconnected and disengaged allowing roof 101 to be raised.

Collapsing, Erecting, Stacking, and Related Processes

Figure 10:
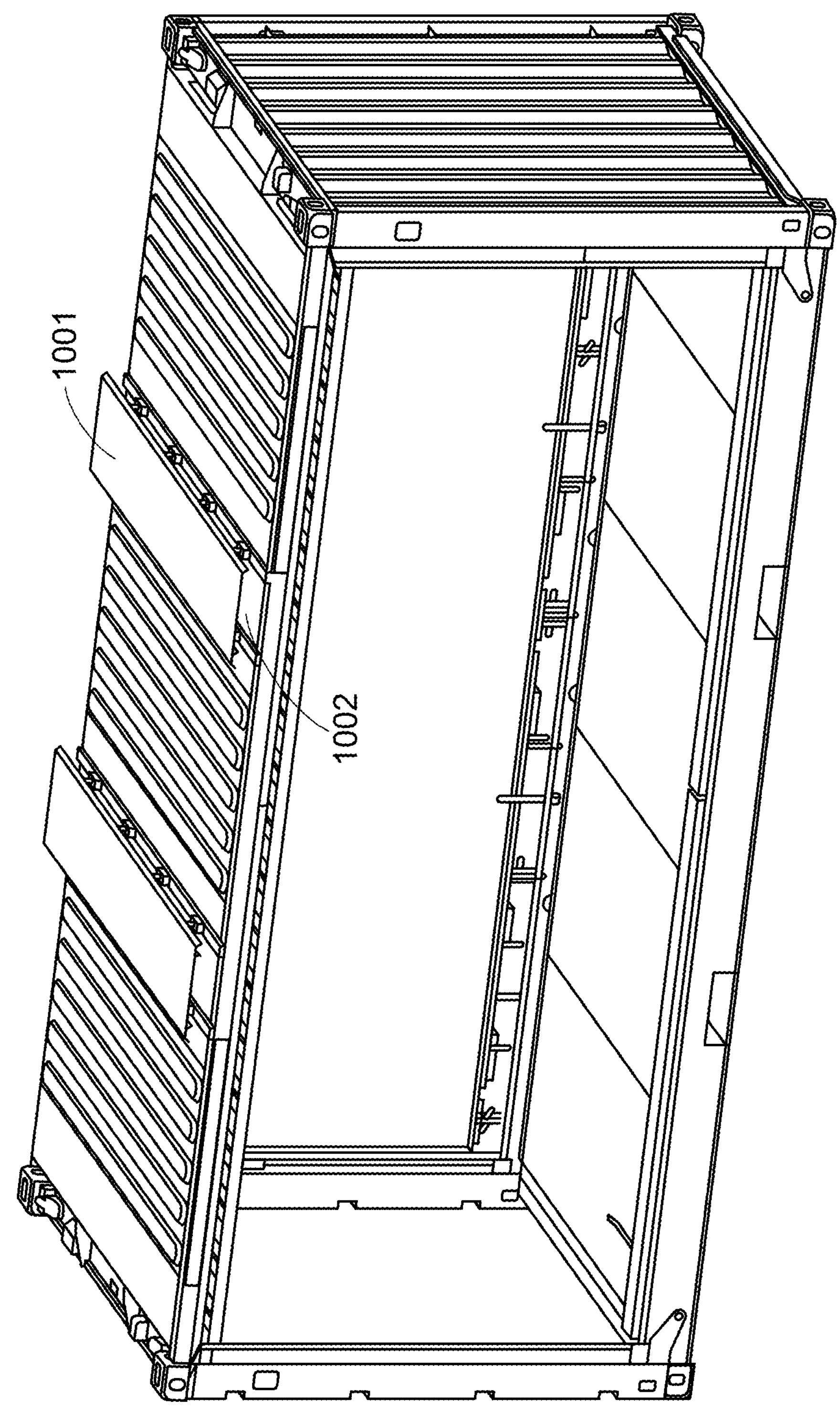
FIG. 10 is a perspective view of an exemplary aspect of a container.

As shown in FIG. 10, to initiate collapsing of container 100, roof 101 can be lifted. In an aspect, roof 101 can be lifted using a forklift. In an aspect, a spring-loaded forklift tunnel 1001 can be used to raise roof 101. Forklift prongs can be inserted, e.g., slid, into spring-loaded forklift tunnel 1001 by way of an opening 1002. A forklift operator can the raise the forklift prongs, which would lifting spring-loaded forklift tunnel 1001 and roof 101. In an aspect, roof 101 can be lifted by using a twist lock on a roof corner casting (see FIG. 17A, FIG. 17B, and FIG. 17C), which can be performed by an industry standard crane or other port equipment such as, for example, a reach stacker. In an aspect, a forklift shackle on roof 101 can be moved, e.g., raised, to an open position allowing the forklift prongs to be inserted into the shackle thereby allowing roof 101 to be lifted.

Figure 11A:
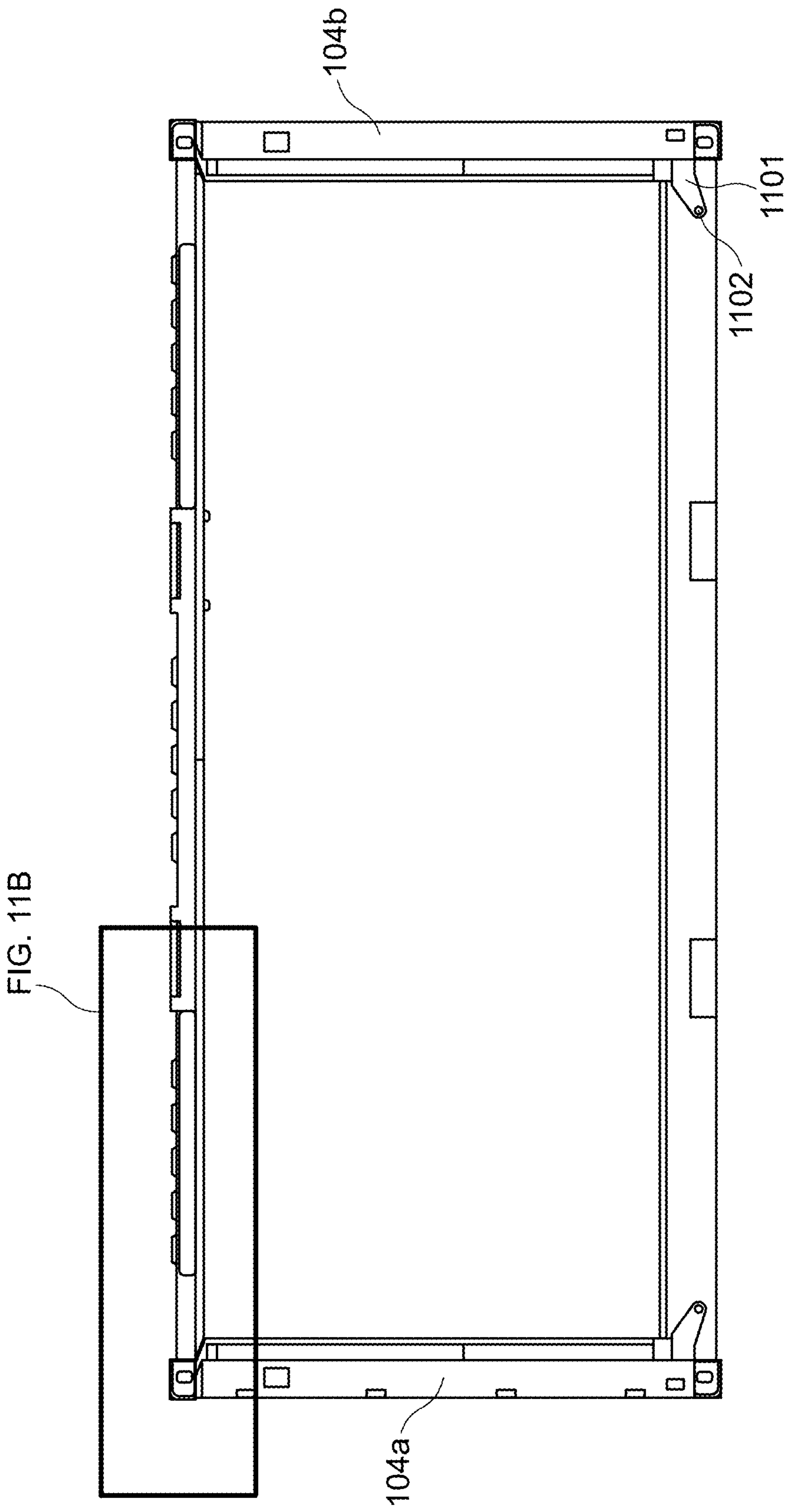
FIG. 11A is a side view of an exemplary aspect of a container.

FIG. 11A is a side view of an exemplary aspect of container 100 in an erect configuration. End walls 104*a*, 104*b* can be connected to base 103 by hinges 1101 such that end walls 104*a*, 104*b* can rotate about, e.g., around, a pivot pin 1102 and be lowered onto base 103. The hinges define axes of rotation for end walls 104*a*, 104*b*. Accordingly, end walls 104*a*, 104*b*, and corner posts 105 thereof, are pivotally connected to corner members of base 103 by hinges 1101. When container 100 is in an erect configuration, corner posts 105 can be supported only by the corner members of base 103. A hinge can connect the collapsible wall to the base to inwardly collapse the collapsible wall towards the base, and to raise the collapsible wall from the base to an erect position.

Figure 11B:
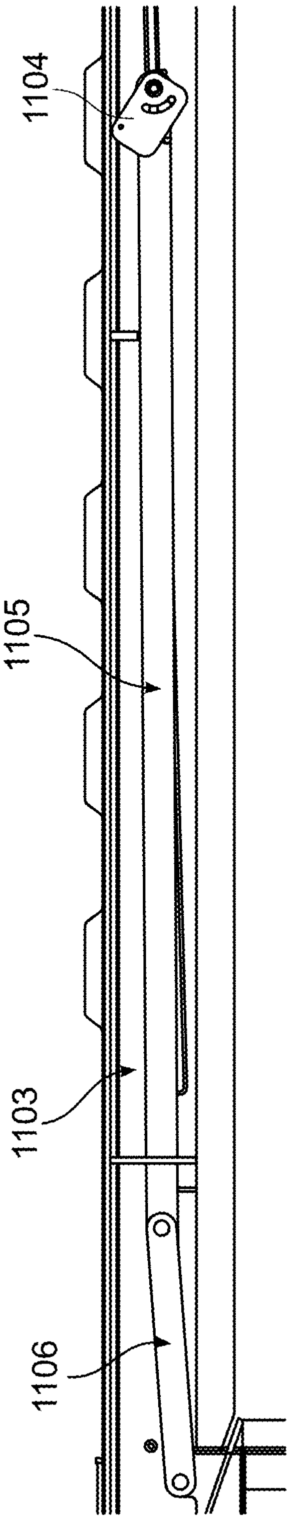
FIG. 11B is a side view of an exemplary aspect of a linkage.

As shown in FIG. 11A and FIG. 11B, roof 101 can be connected to end walls 104*a*, 104*b* by linkages 1103, including an automatic choke 1104, a primary linkage 1105, and a secondary linkage 1106. FIG. 11B is an enlarged view of a portion A of FIG. 11A. Linkages 1103 allow end walls 104*a*, 104*b* to be lowered thereby collapsing container 100. There can be four linkages fitted across container 100, each linkage being connected to one of corner posts 105. In FIG. 11, linkage 1103 is resting in a groove at a side of the roof 101, hidden from view.

Figure 12A:
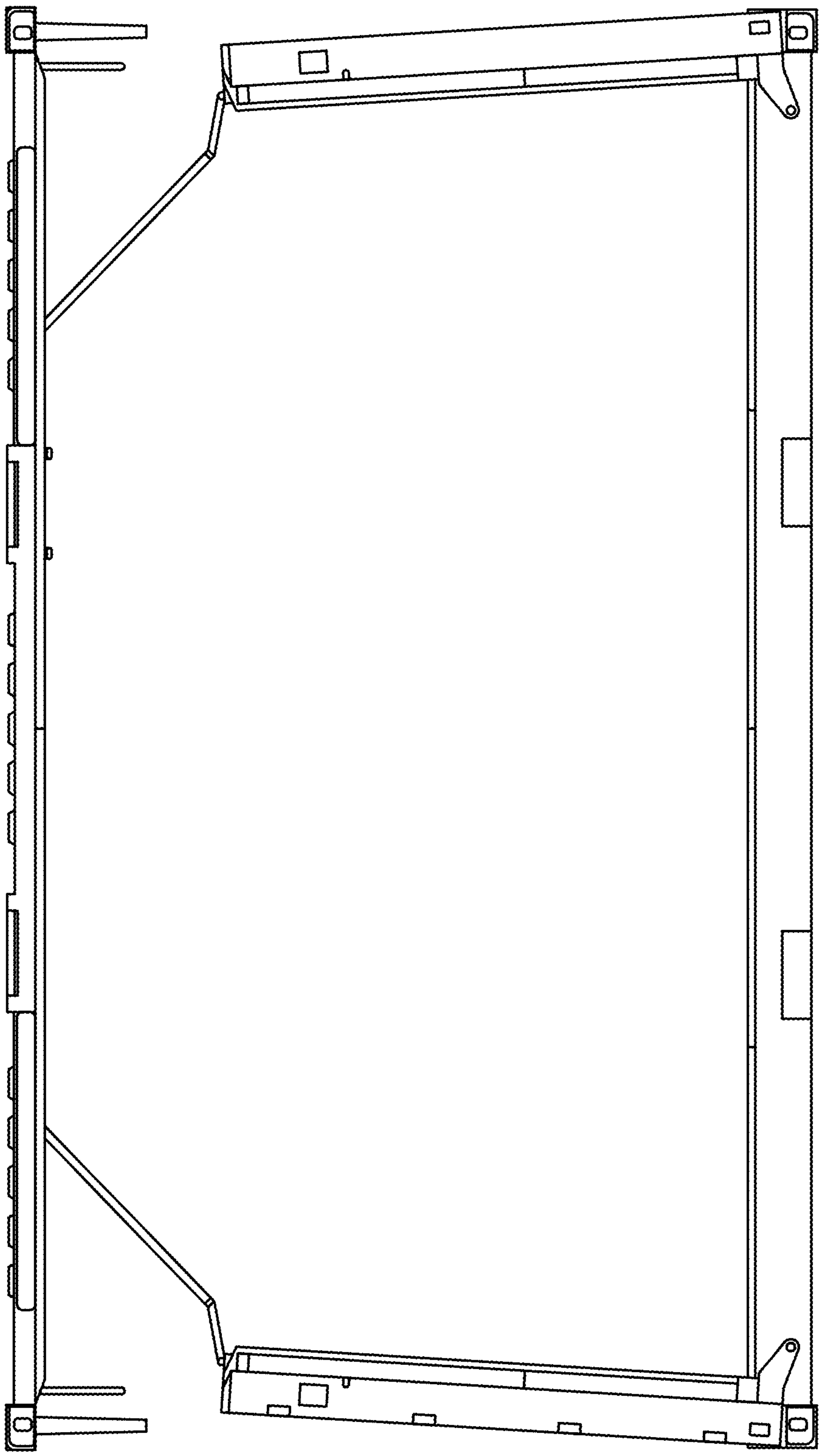
FIG. 12A is a side view of an exemplary aspect of a container.
Figure 12B:
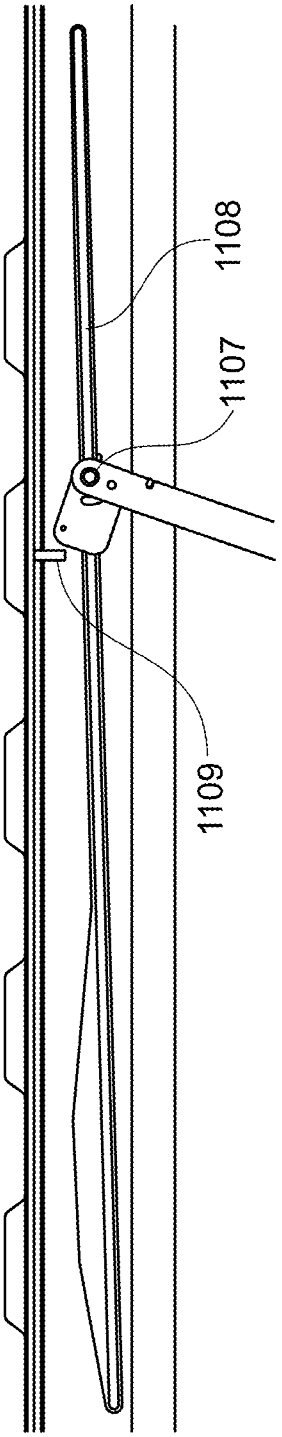
FIG. 12B is a side view of an exemplary aspect of a linkage.
Figure 12C:
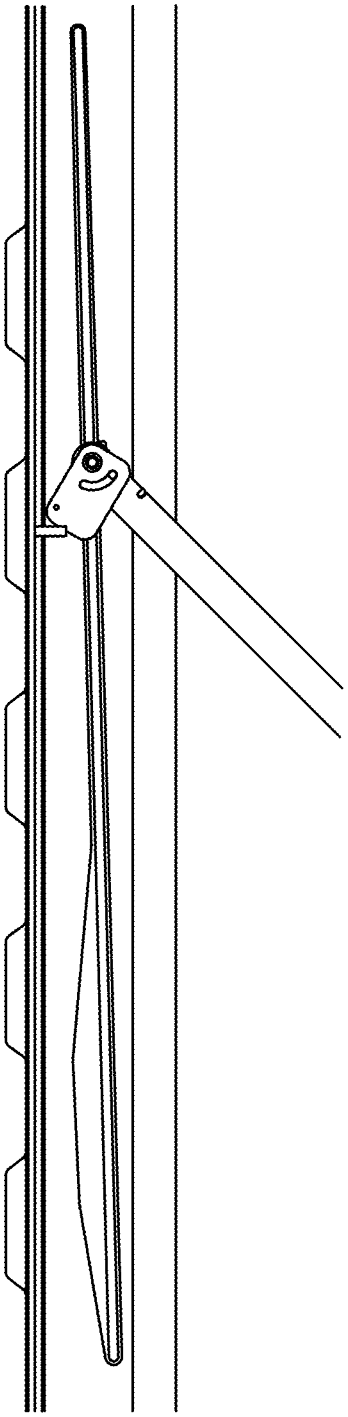
FIG. 12C is a side view of an exemplary aspect of a linkage.

As shown in FIG. 12A and FIG. 12B, as roof 101 roof 101 is lifted off of end walls 104*a*, 104*b*, for example, using a forklift, as described herein, automatic choke 1104 moves in a direction towards end wall 104*a* to which linkage 1103 in connected. FIG. 12B and FIG. 12C are enlarged views of a portion A of FIG. 11A in accordance with the configuration of container 100 shown in FIG. 12A. Automatic choke 1104 can be connected to an end of primary linkage 1105 by a pin 1107 that sits within a slot 1108. As shown in FIG. 12C, when automatic choke 1104 contacts stopper 1109 that is welded to roof 101, the pin 1107 cannot move, e.g., slide, further in slot 1108. Automatic choke 1104 has a spring, which is constantly trying to move, e.g., pull, the choke into a "pitched up" position. See FIG. 22A.

Figure 13A:
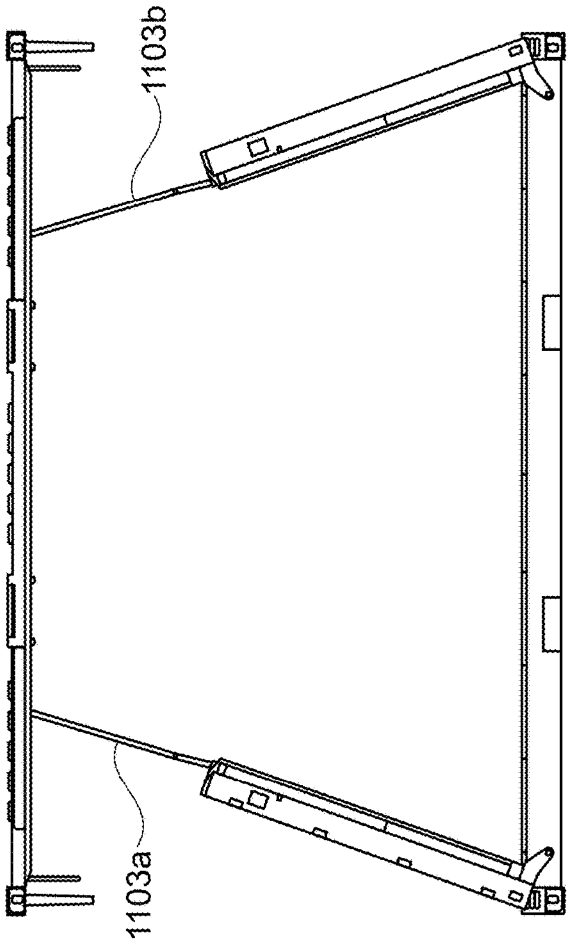
FIG. 13A is a side view of an exemplary aspect of a container.
Figure 13B:
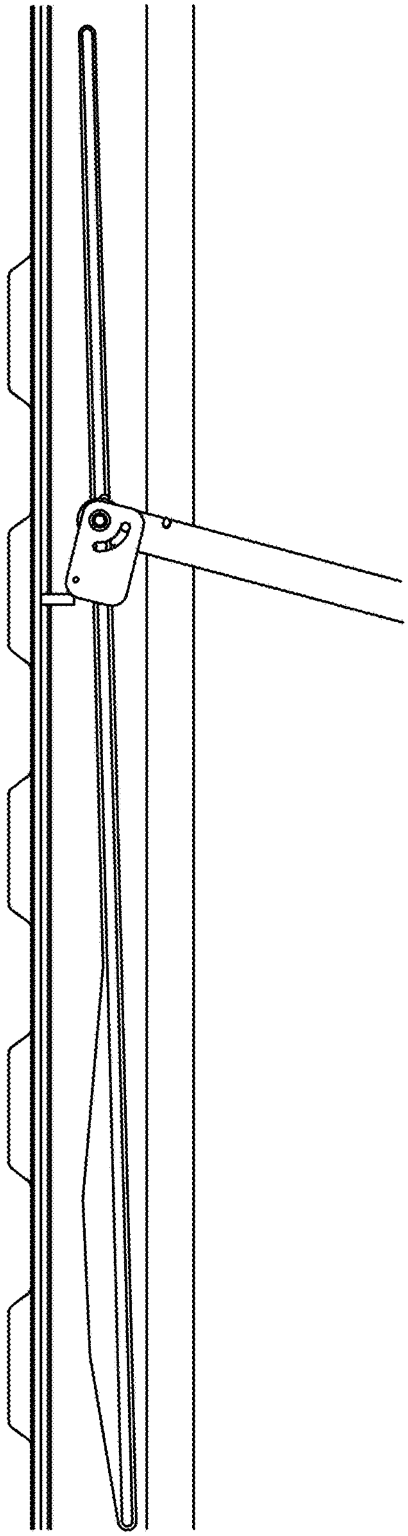
FIG. 13B is a side view of an exemplary aspect of a linkage.

As shown in FIG. 13A and FIG. 13B, constant force is applied to end walls 104*a*, 104*b* by lifting of roof 101 connected to the end walls 104*a*, 104*b* by linkages 1103*a*, 1103*b*, respectively. FIG. 13B is an enlarged view of a portion A of FIG. 11A in accordance with the configuration of container 100 shown in FIG. 13A. Because automatic choke 1104 cannot move further due to being wedged against stopper 1109, linkages 1103*a*, 1103*b* moves, e.g., pulls, end walls 104*a*, 104*b*, respectively, inwards towards base 103. When end walls 104*a*, 104*b*, and corner posts thereof, start to move inwards towards base 103, roof 101 can be lowered. The configuration of the container when automatic choke 1104 cannot move further due to being wedged against stopper 1109 and linkages 1103*a*, 1103*b* moves, e.g., pulls, end walls 104*a*, 104*b*, respectively, inwards towards base 103 is referred to herein as an extended configuration.

Figure 14A:
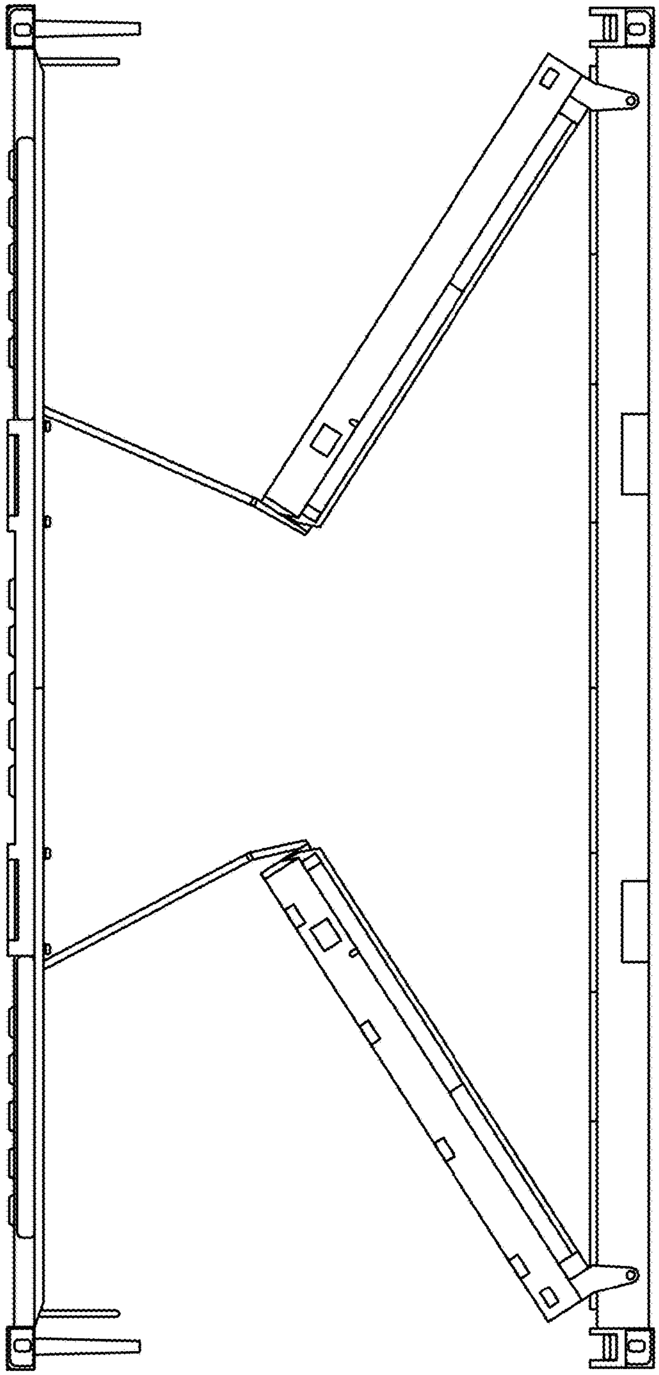
FIG. 14A is a side view of an exemplary aspect of a container.
Figure 14B:
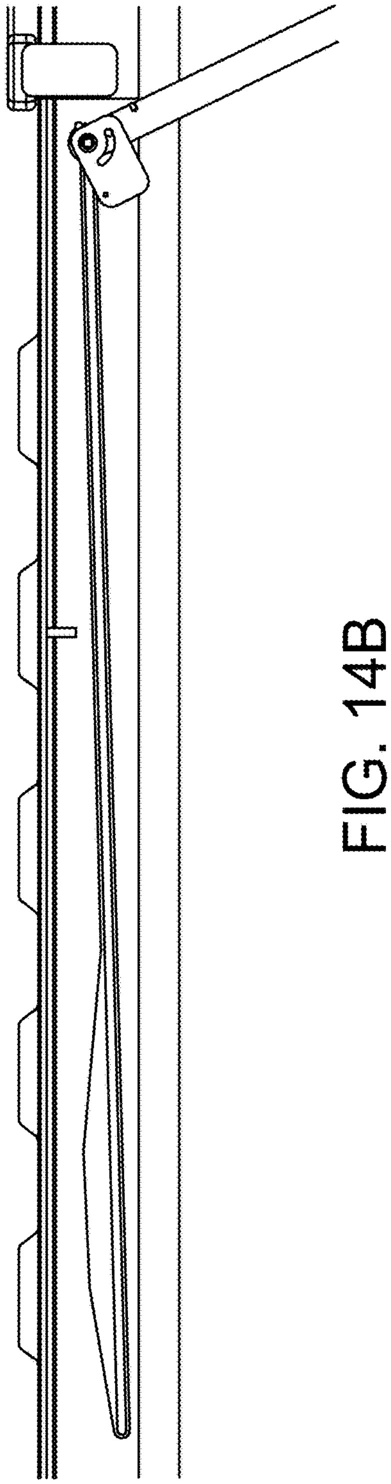
FIG. 14B is a side view of an exemplary aspect of a linkage.

As shown in FIG. 14A and FIG. 14B, during lowering of roof 101, end walls 104*a*, 104*b* will eventually lower towards base 103 on their own, due to positioning of the centers of mass of end walls 104*a*, 104*b*. FIG. 14B is an enlarged view of a portion A of FIG. 11A in accordance with the configuration of container 100 shown in FIG. 14A. Automatic choke 1104 will move, e.g., slide, back along slot 1108 in a direction away from end wall 104*a* to which linkage 1103*a* is connected. Linkages 1103 can prevent end walls 104*a*, 104*b* from slamming onto base 103. Roof 101 continues to be lowered the descent of end walls 104*a*, 104*b* continues.

The linkage can include an automatic choke. Movement of the automatic choke can be impeded when the container is in an extended configuration. The roof can include a stopper that impedes movement of the automatic choke. In an aspect, movement of the automatic choke is not impeded when the container is in an opening configuration. The roof can include a slot to which the linkage can be coupled; and the slot can include a widening at an end of the slot. The roof can include a stopper that impedes movement of the automatic choke, and a slot to which the linkage can be coupled, the slot including a widening at an end of the slot; and movement of the automatic choke can be impeded when the container is in an extended configuration. In an aspect, movement of the automatic choke is not impeded when the container is in an opening configuration.

Figure 15A:
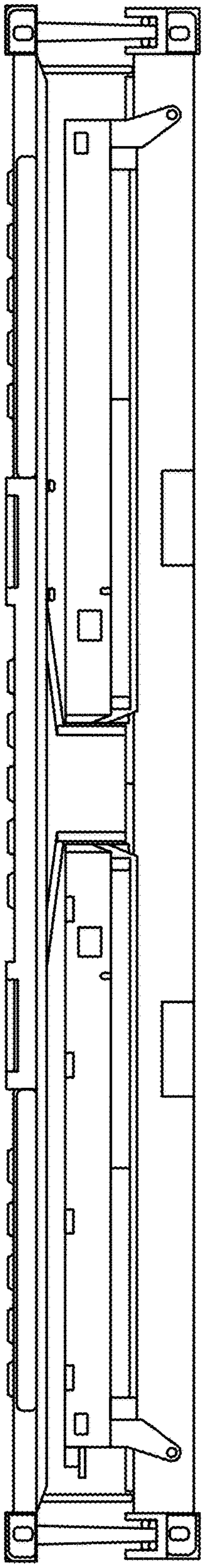
FIG. 15A is a side view of an exemplary aspect of a container.
Figure 15B:
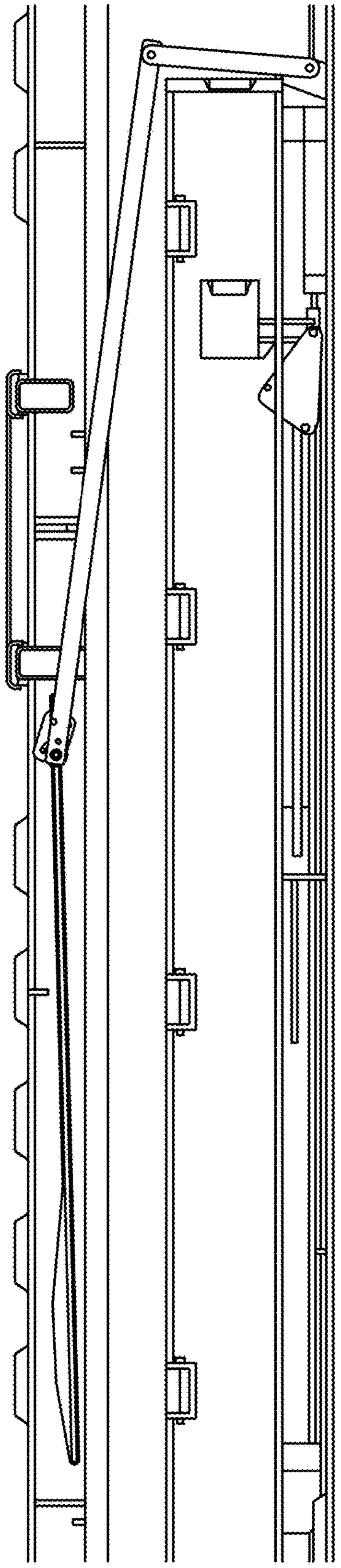
FIG. 15B is a side view of an exemplary aspect of a linkage.
Figure 15C:
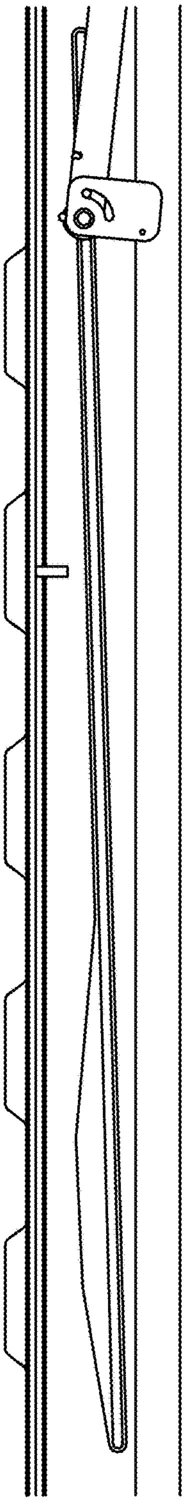
FIG. 15C is a side view of an exemplary aspect of a linkage.
Figure 15D:
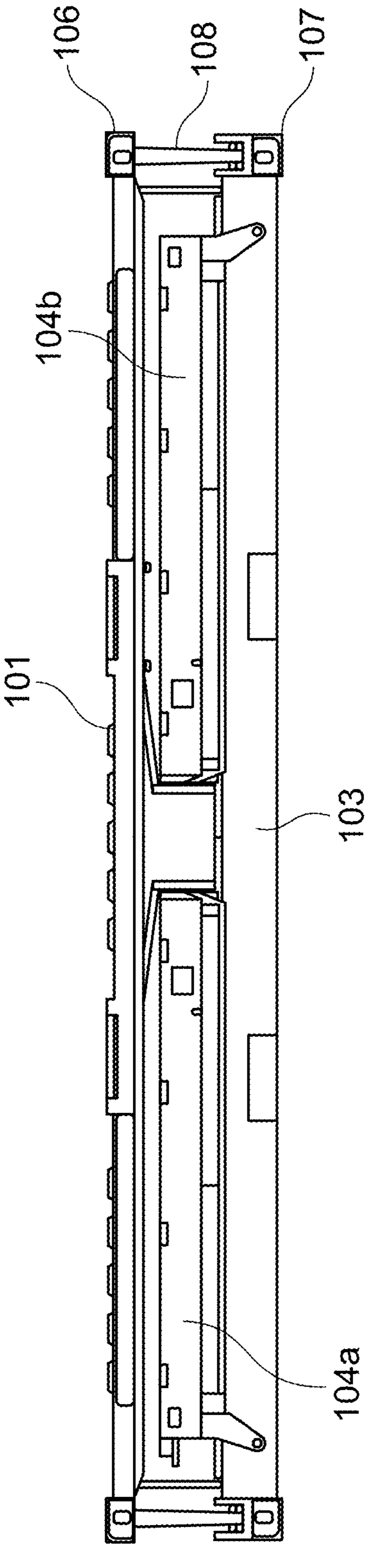
FIG. 15D is a side view of an exemplary aspect of a container.
Figure 15E:
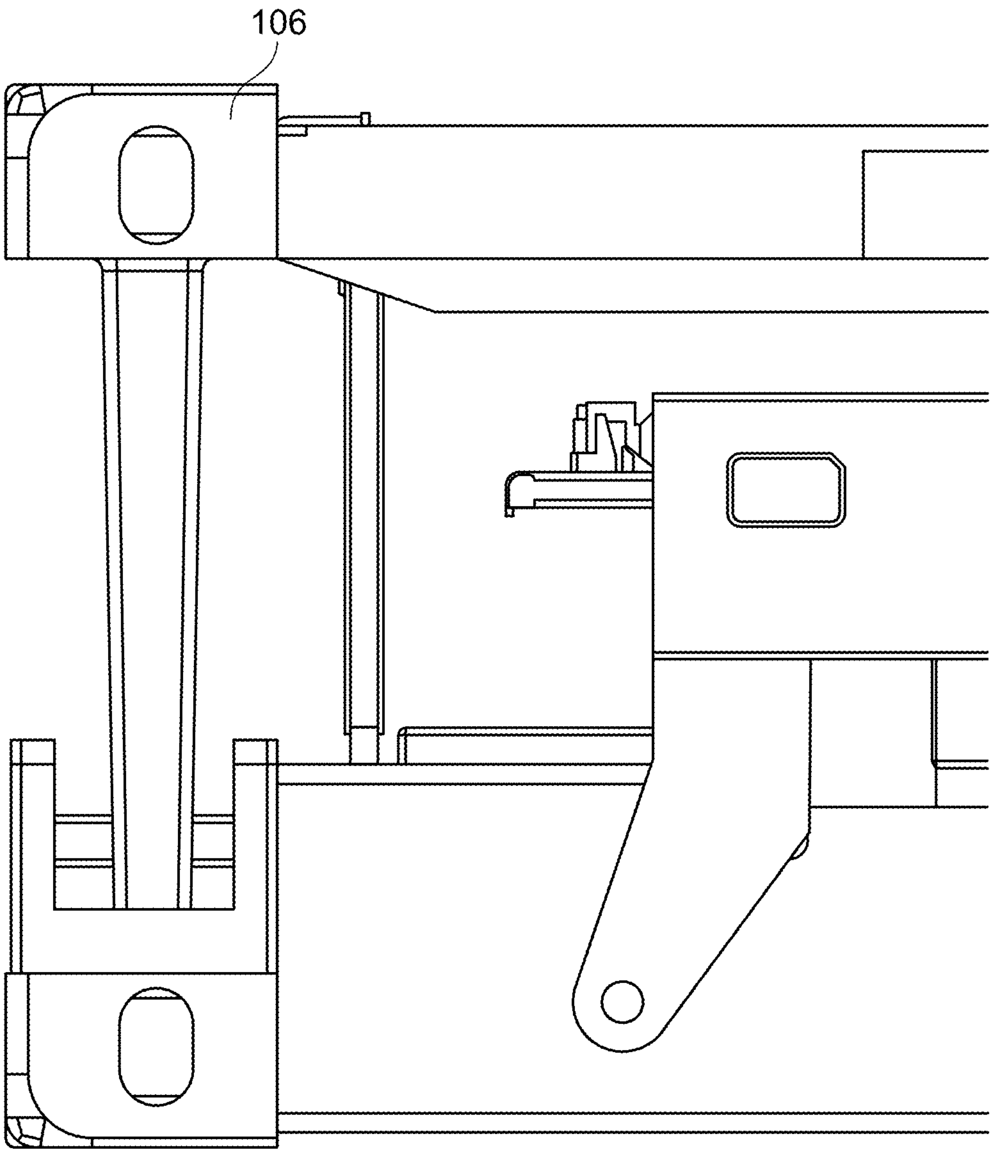
FIG. 15E is an enlarged side view of an exemplary aspect of a container.
Figure 15F:
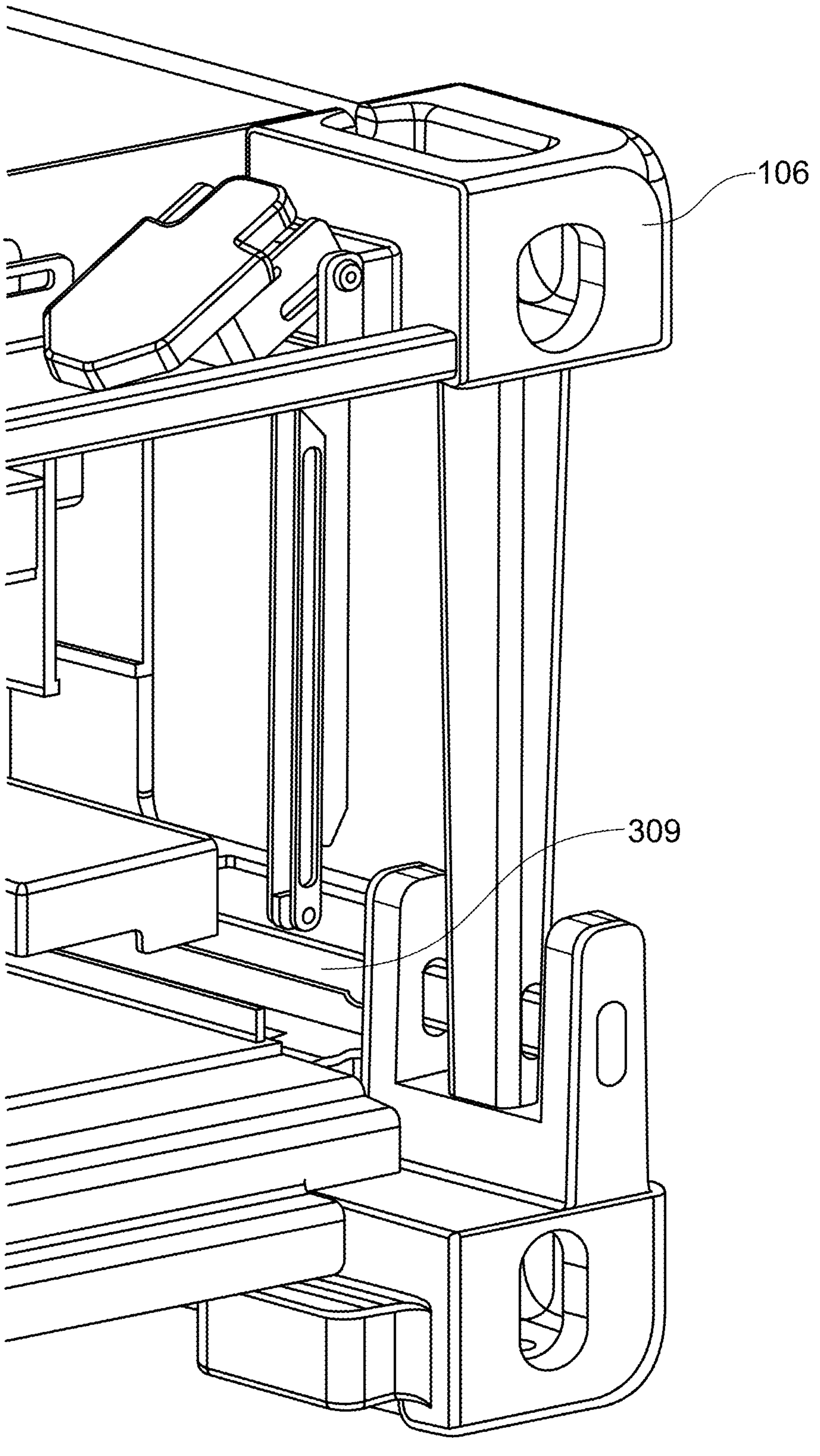
FIG. 15F is an enlarged perspective view of an exemplary aspect of a container.

As shown in FIG. 15A, FIG. 15B, FIG. 15C, FIG. 15D, FIG. 15E, and FIG. 15F, roof 101 roof 101 is lowered toward, e.g., onto, the collapsed end walls 104*a*, 104*b*, and container 100 is fully collapsed. FIG. 15B and FIG. 15C are enlarged views of a portion A of FIG. 11A in accordance with the configuration of container 100 shown in FIG. 15A. Side panels can be further folded in by being moved, e.g., pushed, by the folded side walls further decreasing the overall height of container 100. The lifting device used to raise roof 101 can release container 100. If the forklift was used, the forklift shackles or spring loaded forklift tunnel can be lowered. Base locks 300 can be engaged to lock roof 101, by way of roof corner castings 106 connected to roof 101 and base corner castings 107 connected to base 103. Roof corner casting 106 can include a protrusion 108 with an opening therein, into which base latch 309 can be inserted to secure roof 103 to base 101 in a collapsed configuration, top latch 409 can be inserted to secure roof 103 to corner post 105 in an erect configuration, or a combination thereof. A protrusion connected to the roof can be insertable into the collapsible wall when the container is in an erect configuration, and the base when the container is in a collapsed configuration.

When container 100 is in a collapsed configuration, base protection panels 201 contact base 103 and foldable extension panels 802 cover at least a portion of base protection panels 201 (at a side of base protection panels 201 opposite base 103). Side walls 104*a*, 104*b*, which are pivotally connected to base 103 by hinges 1101, cover foldable extension panels 802 (at a side of foldable extension panels 802 opposite base protection panels 201) and portions of base 103 between the lowered foldable extension panels 802. Roof 101, which can be locked to base 103, covers side walls 104*a*, 104*b* and portions of base 103 between the lowered side walls 104*a*, 104*b*.

FIG. 16 is a perspective view of an exemplary aspect of container 100 in a stackable configuration. FIG. 16 shows various numbers of container 100 in a stackable configuration. FIG. 16A shows one container 100*a* in a base receiving position of a stackable configuration. FIG. 16B shows two containers 100*a*, 100*b*, each in a stackable configuration as well as the two containers 100*a*, 100*b* in a stacked configuration. FIG. 16C shows three containers 100*a*, 100*b*, 100*c*, each in a stackable configuration as well as the three containers 100*a*, 100*b*, 100*c* in a stacked configuration. FIG. 16D shows four containers 100*a*, 100*b*, 100*c*, 100*d*, each in in a stackable configuration as well as the four containers 100*a*, 100*b*, 100*c*, 100*d* in a stacked configuration. There can be any suitable number of multiple containers 100, each in a stackable configuration as well as in a stacked configuration. To aid with stacking, fork pockets 1601 can be located at a bottom, e.g., base, of base 103.

Figure 16A:
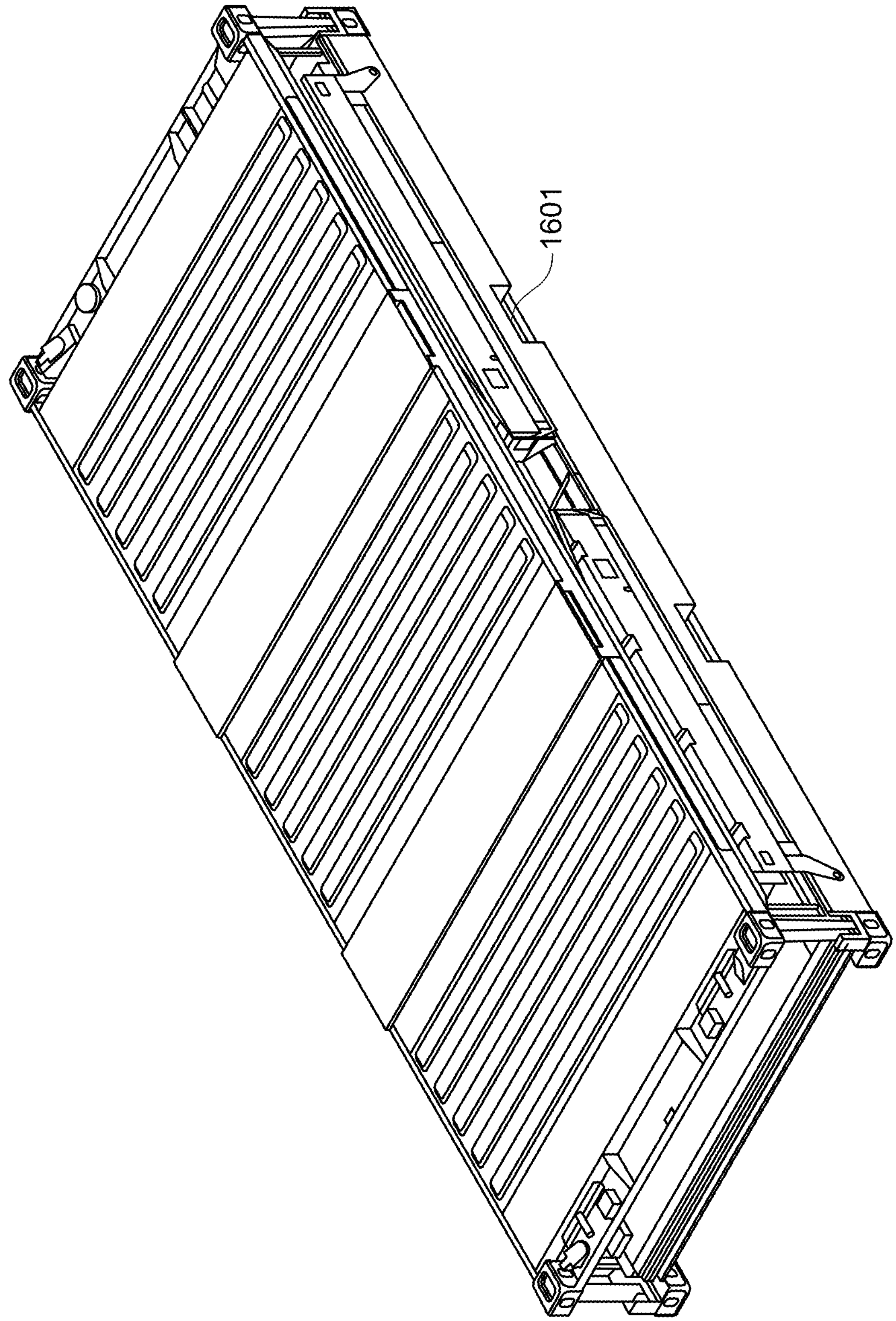
FIG. 16A is a perspective view of an exemplary aspect of a container.
Figure 16B:
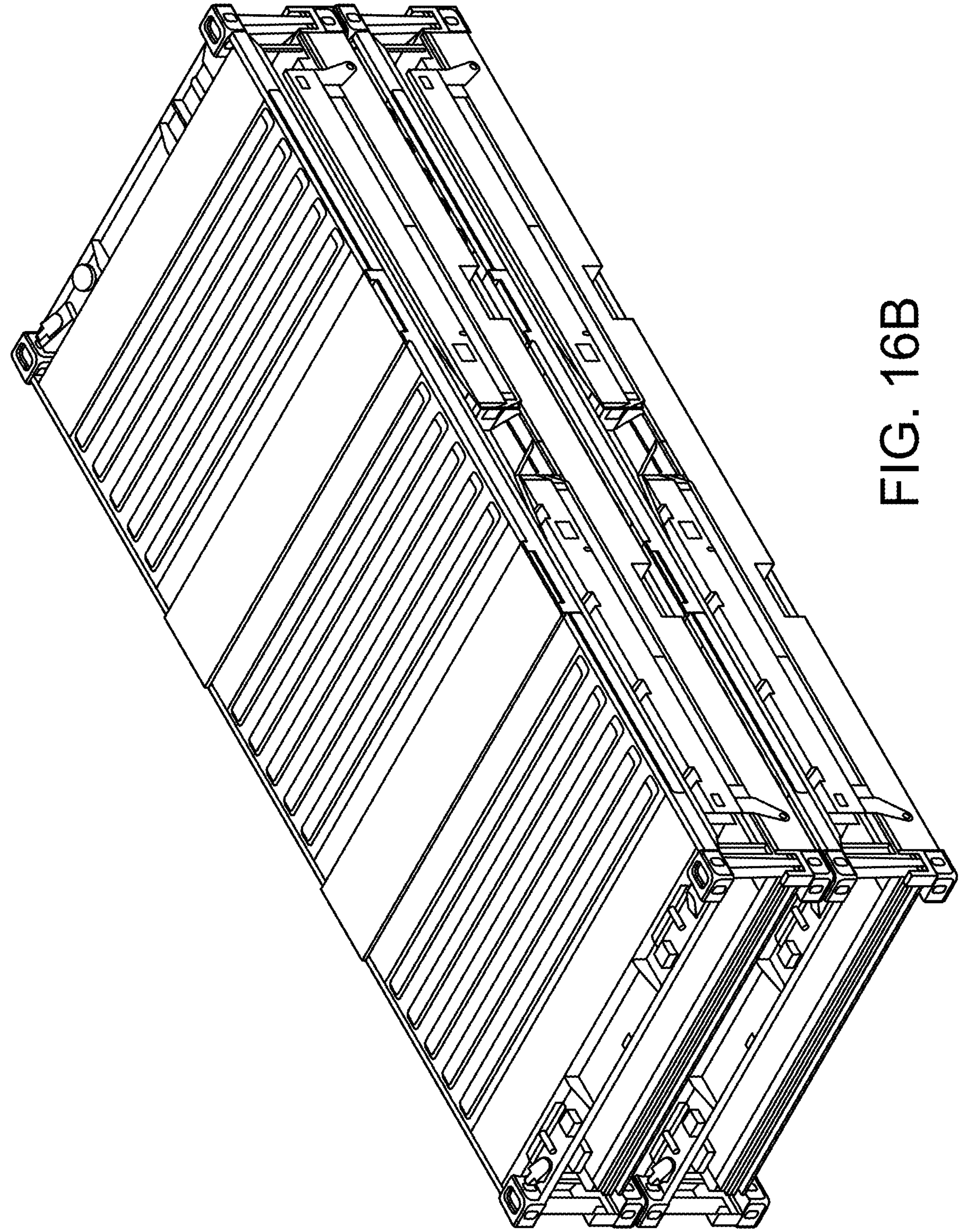
FIG. 16B is a perspective view of an exemplary aspect of a container.
Figure 16C:
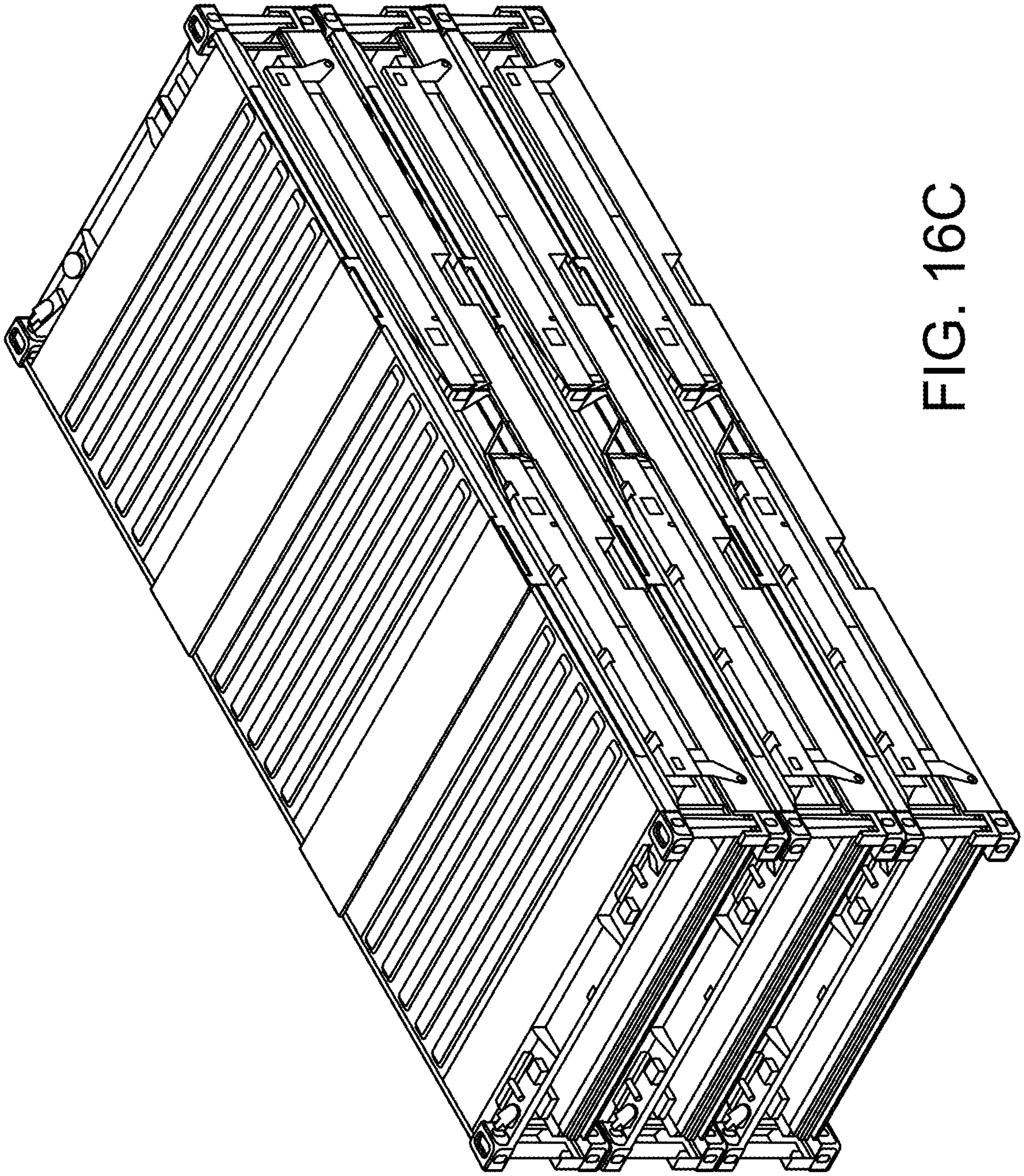
FIG. 16C is a perspective view of an exemplary aspect of a container.
Figure 16D:
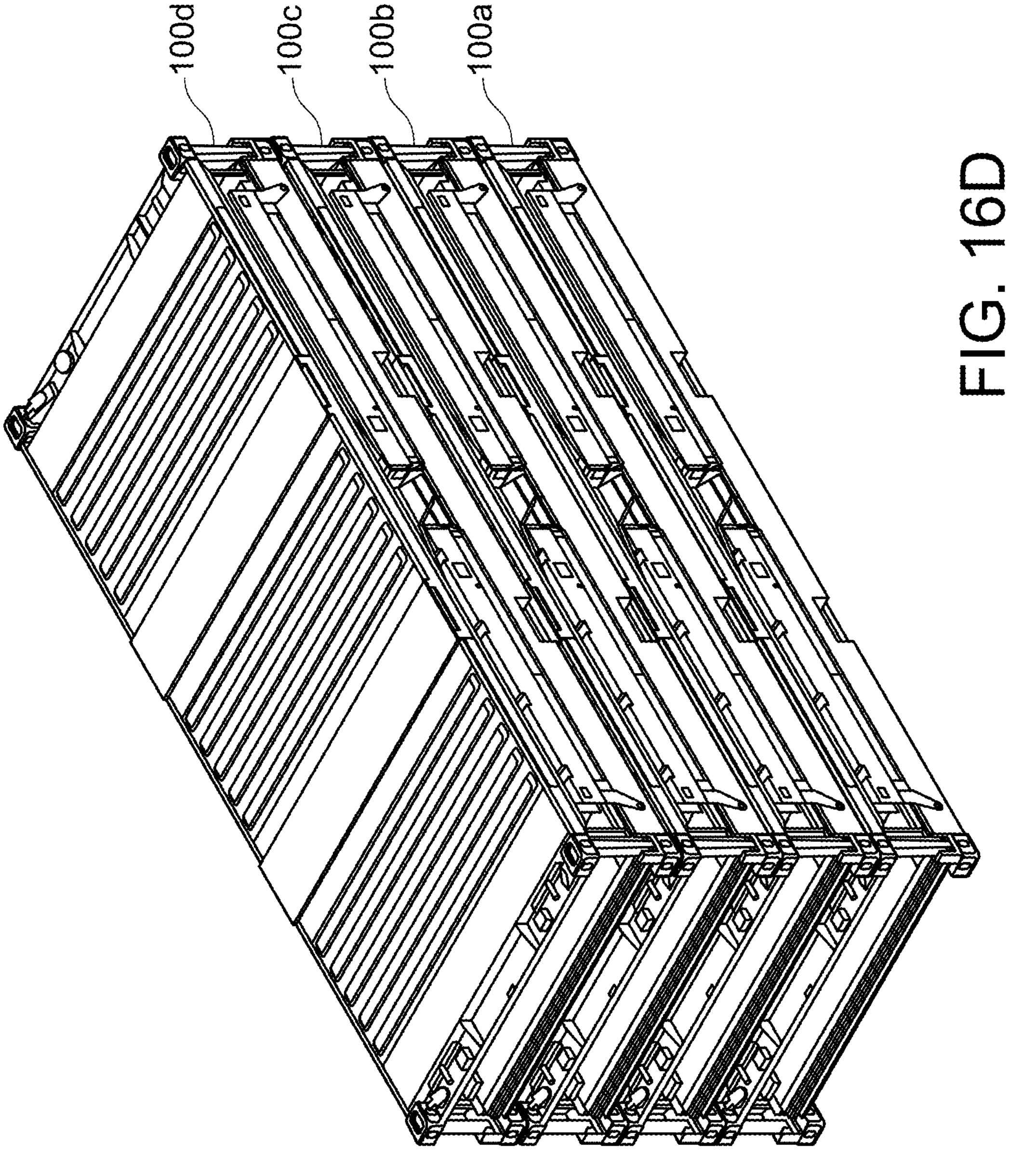
FIG. 16D is a perspective view of an exemplary aspect of a container.

Containers 100 are configured to automatically interlock with container 100 on top of it. Therefore, as shown in FIG. 16D, four folded and stacked containers 100 in a stackable configuration can occupy the space of one container 100 in an erect configuration. This greatly reduces the overall operating cost per container.

Figure 17A:
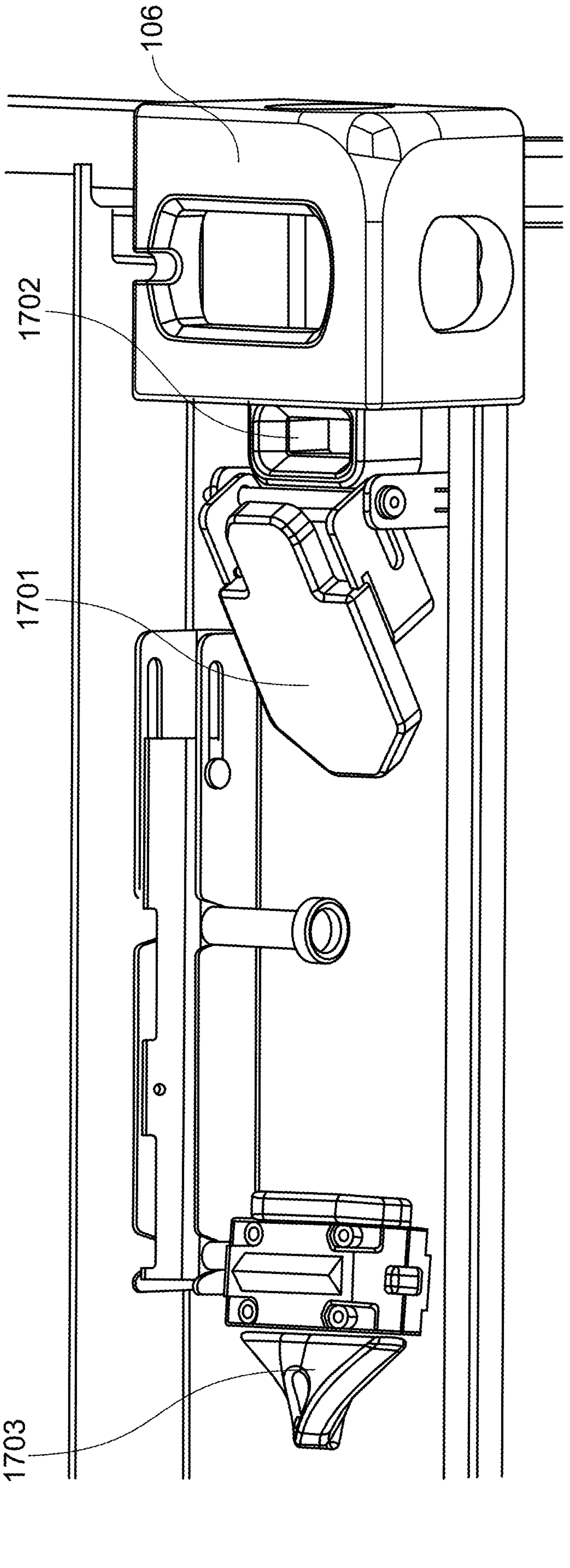
FIG. 17A is a view of an exemplary aspect of a container.
Figure 17B:
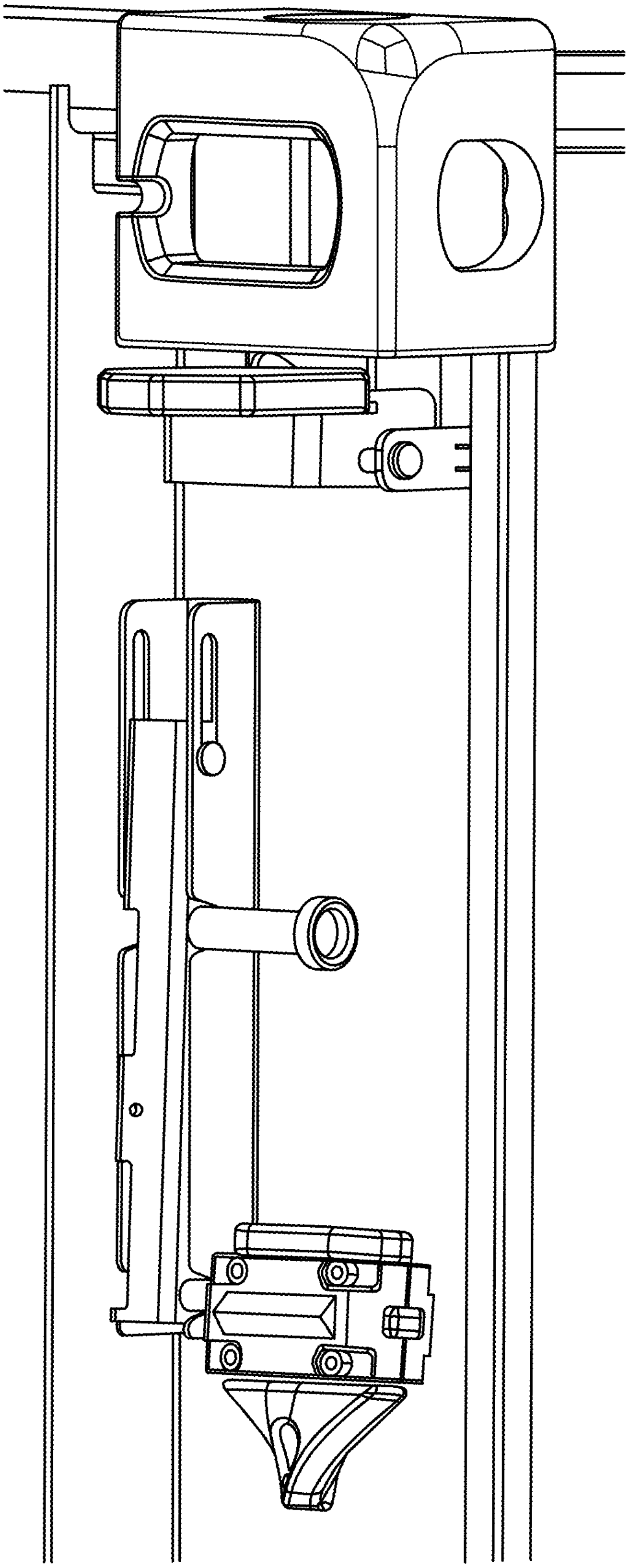
FIG. 17B is a view of an exemplary aspect of a container.
Figure 17C:
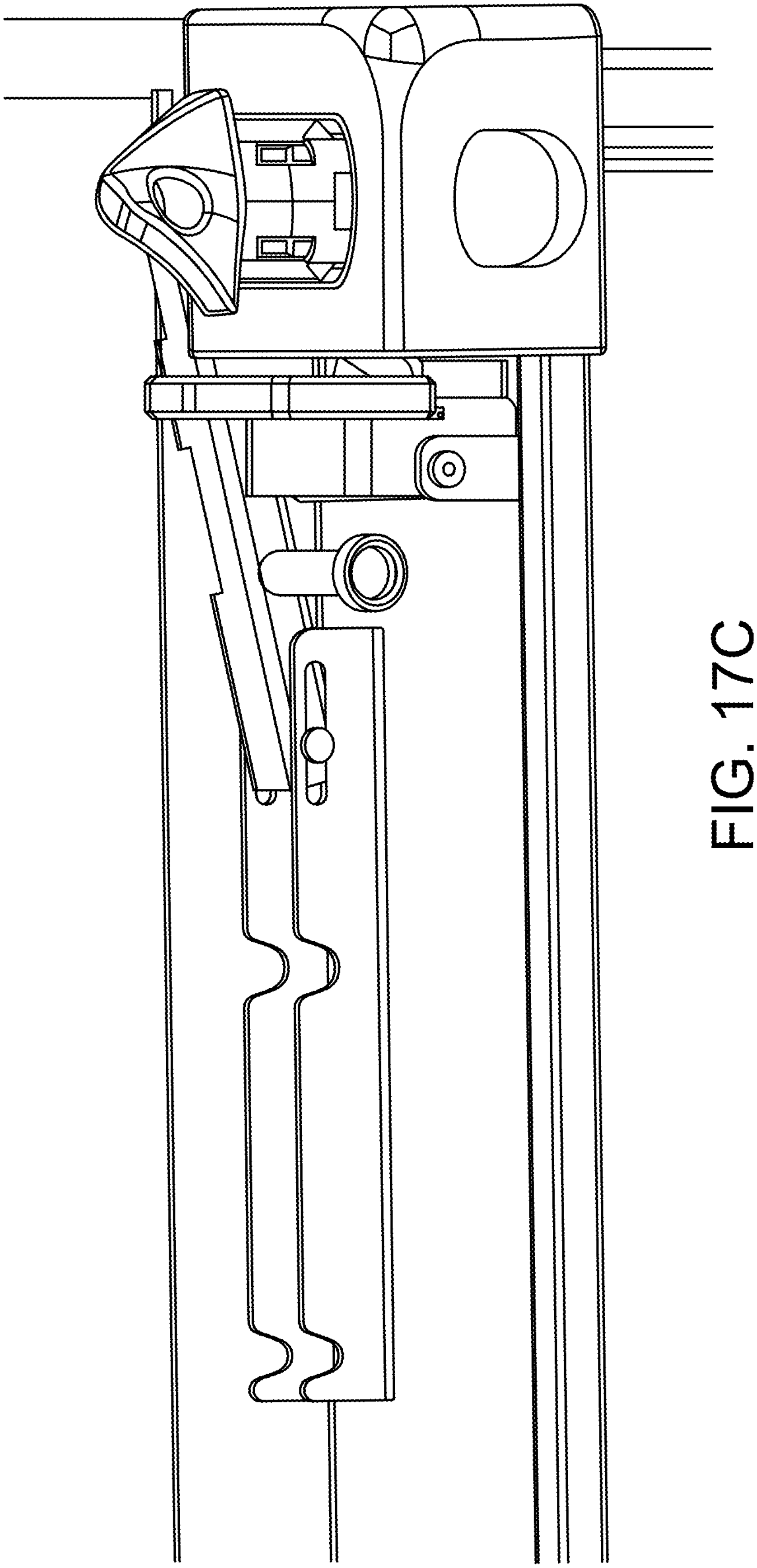
FIG. 17C is a view of an exemplary aspect of a container.

As shown in FIG. 17A, FIG. 17B, and FIG. 17C, to interlock adjacent containers 100, e.g., a container 100 on top of another container 100, an interlock alignment plate 1701 can be rotated and inserted into a holder 1702 to lock interlock alignment plate 1701 in place adjacent to a roof corner casting 106. A twist lock 1703 (also referring to herein as a gripping member) on roof 101 is placed into (an opening of) roof corner casting 106 (also referring to herein as a gripping member receiver) of container 100 and when stacked twist lock 1703 is inserted into an aperture at a bottom, e.g., base, of a base corner casting of an adjacent, e.g., top, container. The base corner casting of an adjacent, e.g., top, container also has an indent to match interlock alignment plate 1701 to keep the containers from sliding, for example, removing play between the twist lock 1703 and the aperture at a bottom, e.g., base, of a base corner casting of an adjacent, e.g., top, container. The indent also helps alignment of containers when stacking.

Figure 18A:
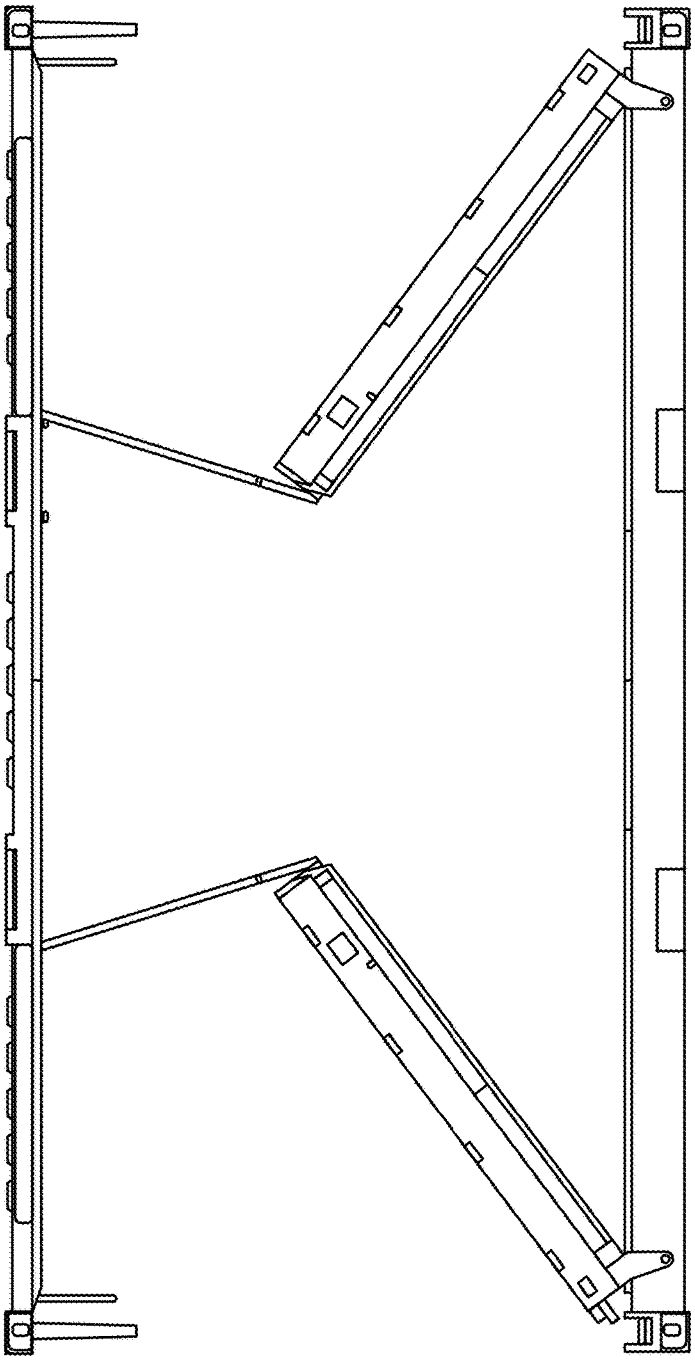
FIG. 18A is a side view of an exemplary aspect of a container.
Figure 18B:
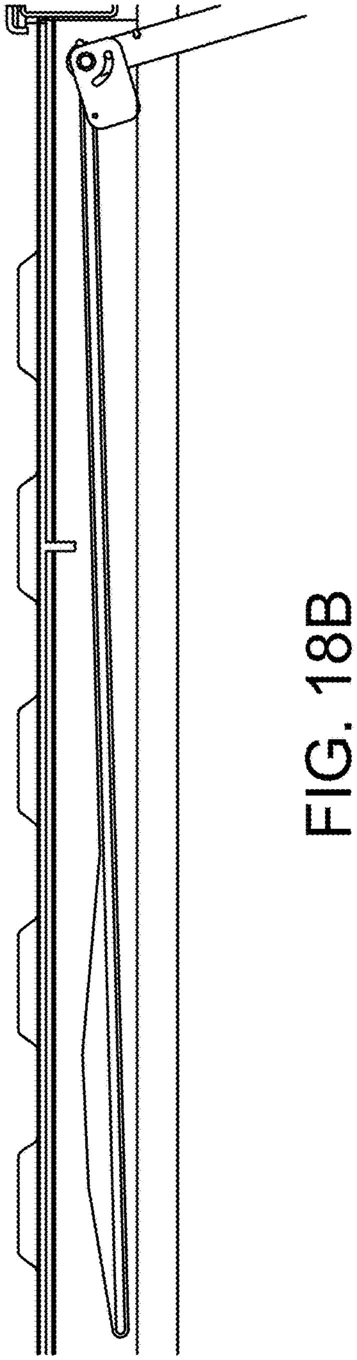
FIG. 18B is a side view of an exemplary aspect of a linkage.

To erect container 100, the disclosed processes are repeated in reverse order. Roof 101 is unattached from base 103 using base lock levers 301 of base locks 300. As shown in FIG. 18A and FIG. 18B, roof 101 is lifted after disengaging base locks 300 to release roof 101 from base 103. FIG. 18B is an enlarged view of a portion A of FIG. 11A in accordance with the configuration of container 100 shown in FIG. 18A. As roof 101 is lifted, the primary linkages 1105 and secondary linkages 1106 move, e.g., pull, end walls 104*a*, 104*b* up, e.g., into an erect position.

Figure 19A:
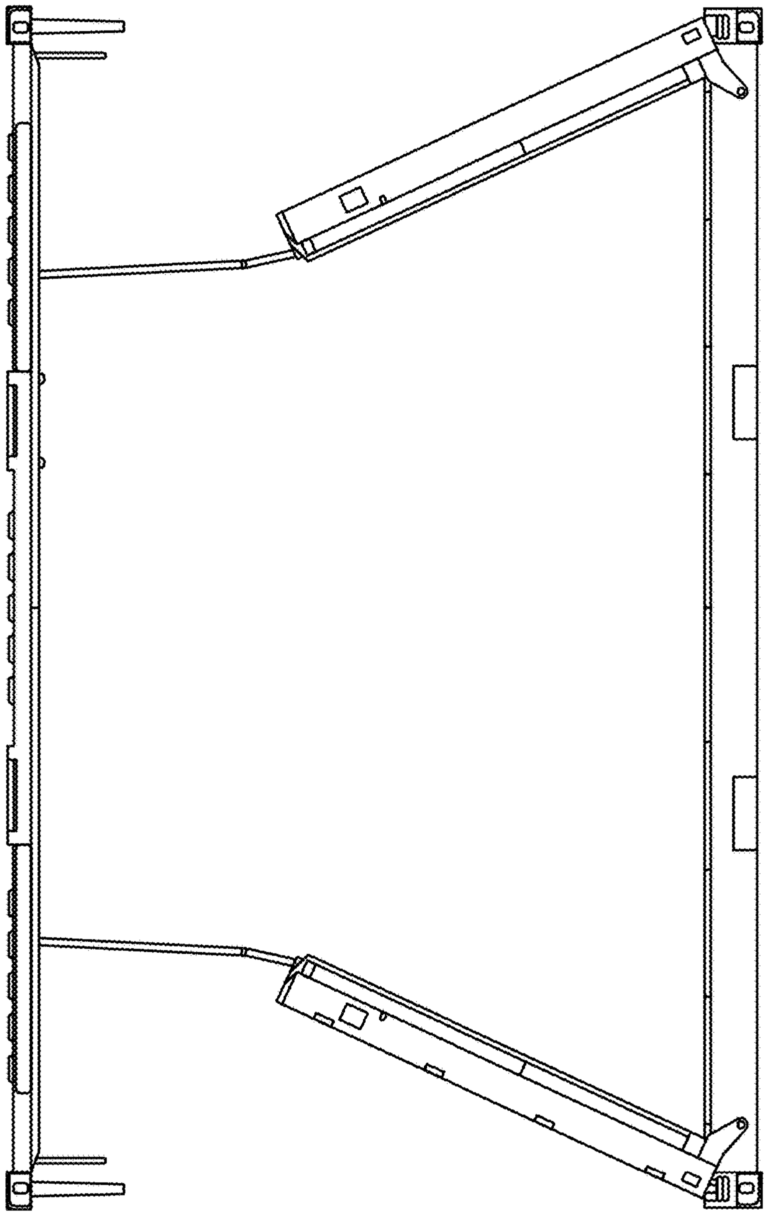
FIG. 19A is a side view of an exemplary aspect of a container.
Figure 19B:
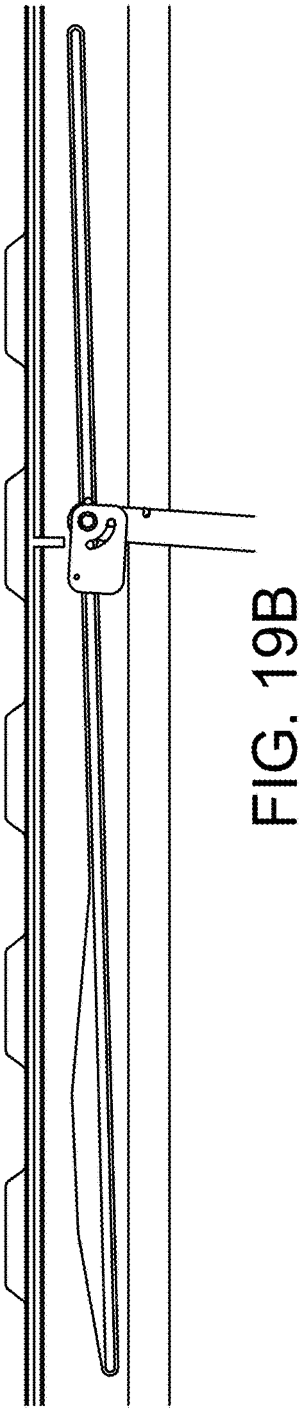
FIG. 19B is a side view of an exemplary aspect of a linkage.

As shown in FIG. 19A and FIG. 19B, roof 101 continues to be lifted. Slot 1108 is angled, e.g., towards end wall 104*a*, such that automatic choke 1104 moves, e.g., slides, down slot 1108 during lifting of roof 101 during erection of container 100 towards an end of slot 1108 closest to an end of roof 101. FIG. 19B is an enlarged view of a portion A of FIG. 11A in accordance with the configuration of container 100 shown in FIG. 19A. Automatic choke 1104 is in a "pitched up" position due to springs, clears stopper 1109, and continues moving, e.g., sliding, down slot 1108, in turn moving, e.g., pulling, end walls 104*a*, 104*b* up, e.g., into an erect position. The configuration of the container when automatic choke is in a "pitched up" position, clears stopper 1109, and continues moving down slot 1108 is referred to herein as an opening configuration.

Figure 20A:
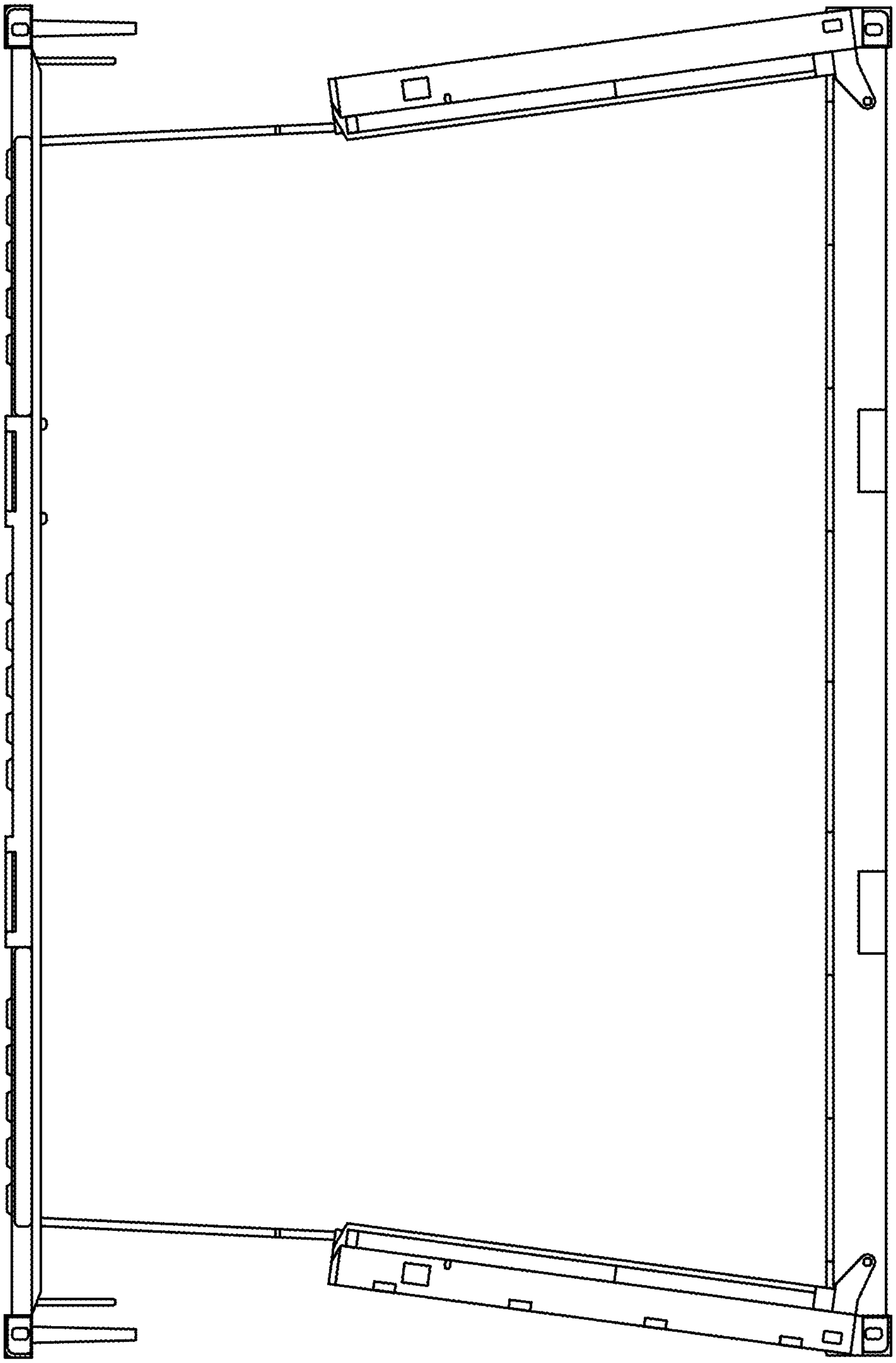
FIG. 20A is a side view of an exemplary aspect of a container.
Figure 20B:
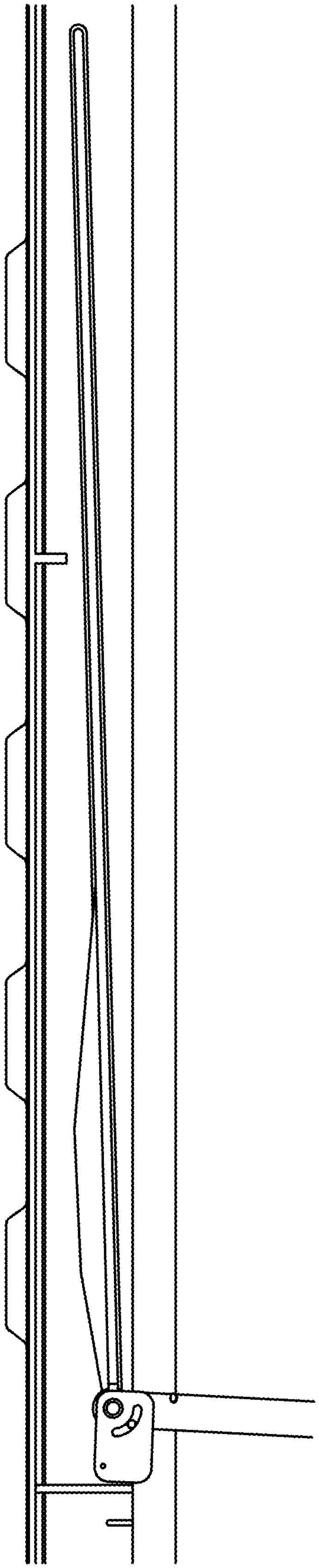
FIG. 20B is a side view of an exemplary aspect of a linkage.

As shown in FIG. 20A and FIG. 20B, as roof 101 is being lifted, linkage 1103 reaches an end of slot 1108 closest to an end of roof 101. FIG. 20B is an enlarged view of a portion A of FIG. 11A in accordance with the configuration of container 100 shown in FIG. 20A. In such position, a center of mass of end walls 104*a*, 104*b* allows end walls 104*a*, 104*b* to stand upright, e.g., erect. At this stage roof 101 can be lowered.

Figure 21A:
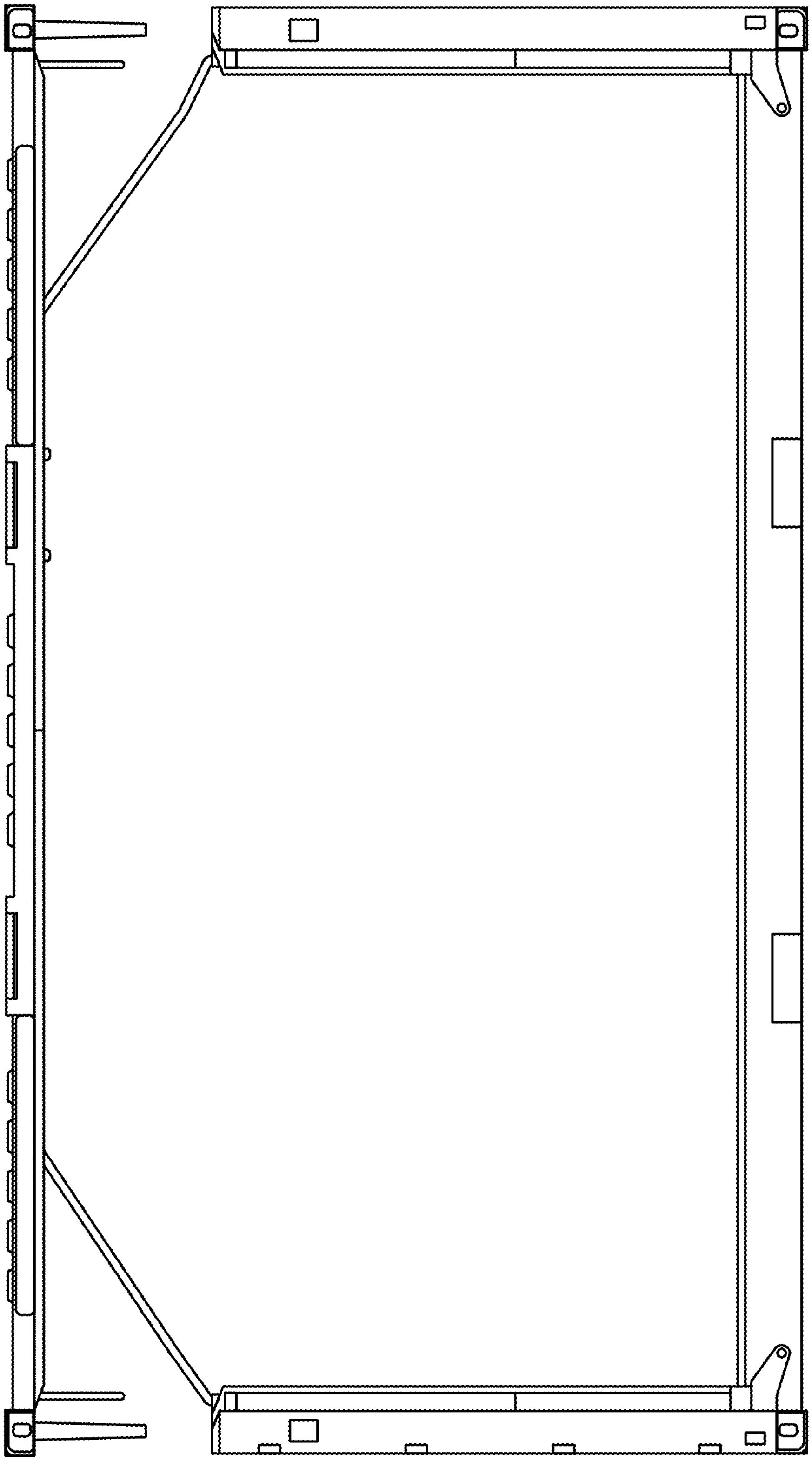
FIG. 21A is a side view of an exemplary aspect of a container.
Figure 21B:
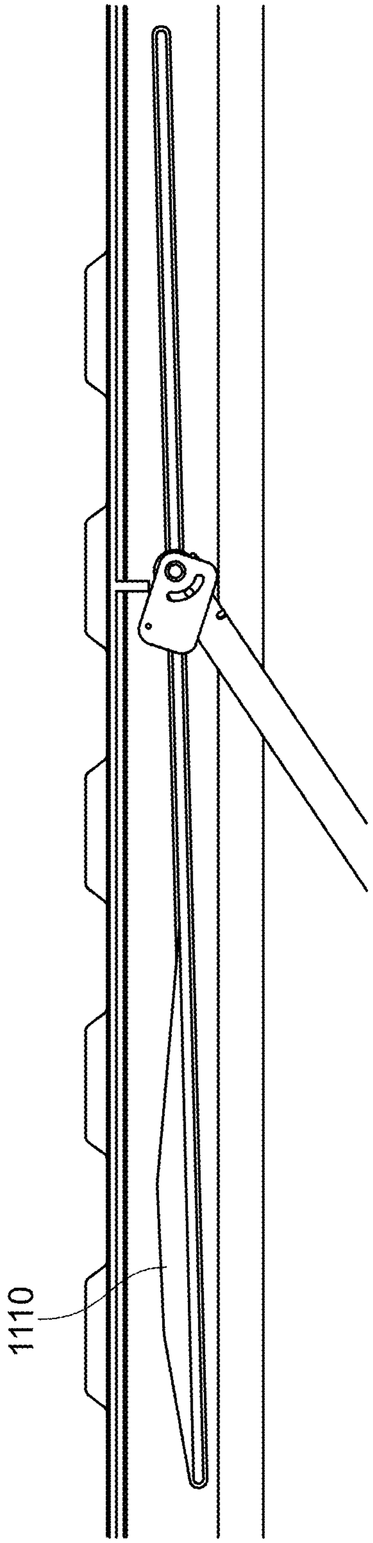
FIG. 21B is a side view of an exemplary aspect of a linkage.

As shown in FIG. 21A and FIG. 21B, as roof 101 is being lowered, linkages 1103 slide up slot 1108, e.g., away from end wall 104*a*. FIG. 21B is an enlarged view of a portion A of FIG. 11A in accordance with the configuration of container 100 shown in FIG. 21A. A widening 1110 of slot 1108 at the front of slot 1108 helps prevent automatic choke 1104 from getting stuck in a lowest position and helps with guiding linkage 1103 back up the slot 1108, e.g., away from end wall 104*a*. Automatic choke 1104 encounters stopper 1109, but is moved, e.g., pushed, into "pitched down" position (see FIG. 22B) until automatic choke 1104 clears stopper 1109.

Features of the disclosed design, including, for example, automatic choke 1104, widening 1110, or a combination thereof allows for collapsing of end walls 104*a*, 104*b*, raising of side walls 104*a*, 104*b*, or a combination thereof without intervention (e.g., direct touching) by an operator to secure or adjust any of hinge 1101, pivot pin 1102, linkage 1103 (including primary linkage 1105 and secondary linkage 1106), pin 1107, slot 1108, stopper 1109. According to the disclosed design, collapsing of end walls 104*a*, 104*b*, raising of side walls 104*a*, 104*b*, or a combination thereof can be performed a single operator through use of a forklift, without leaving the forklift.

Figure 22A:
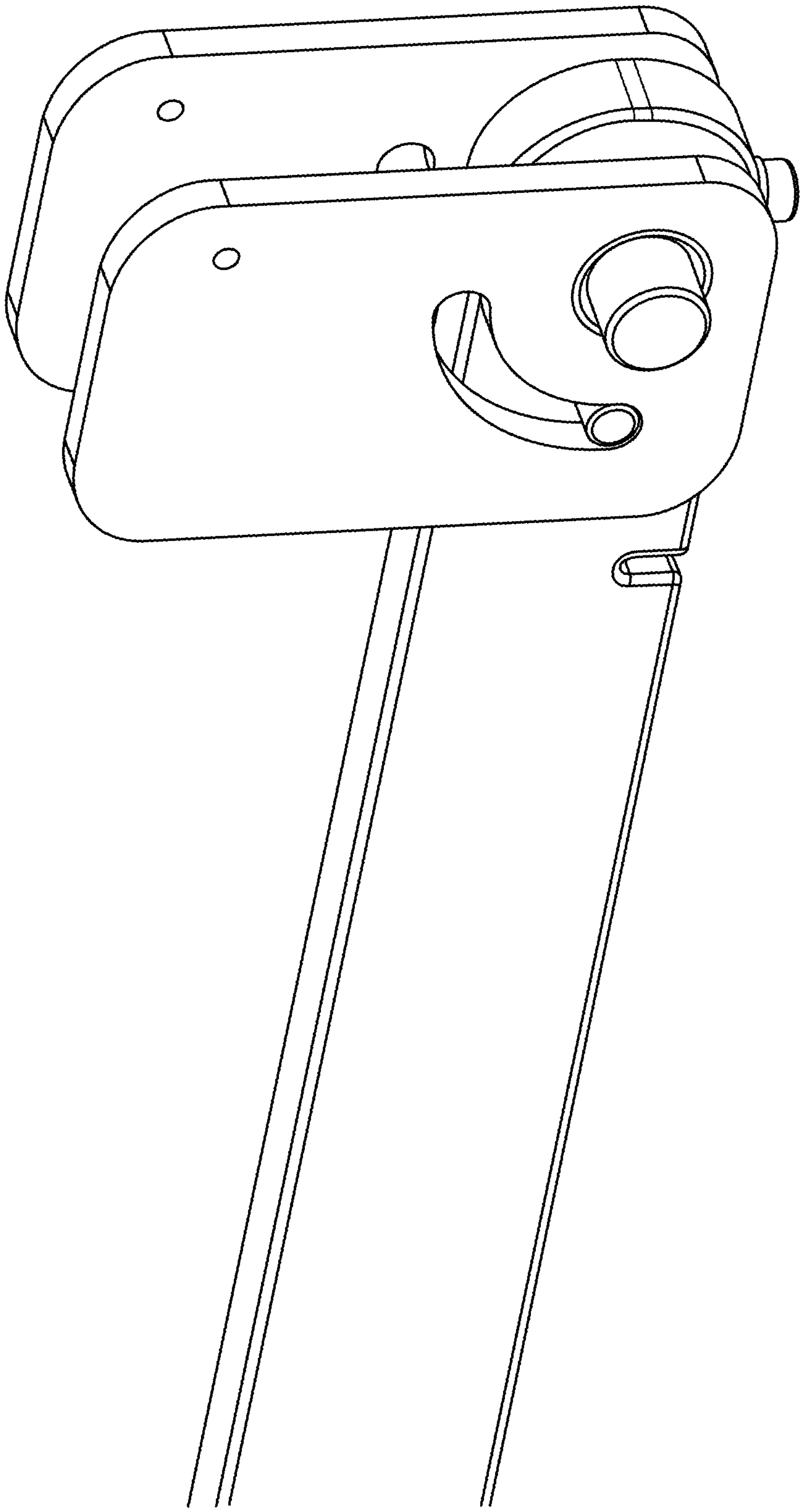
FIG. 22A is a view of an exemplary aspect of a linkage.
Figure 22B:
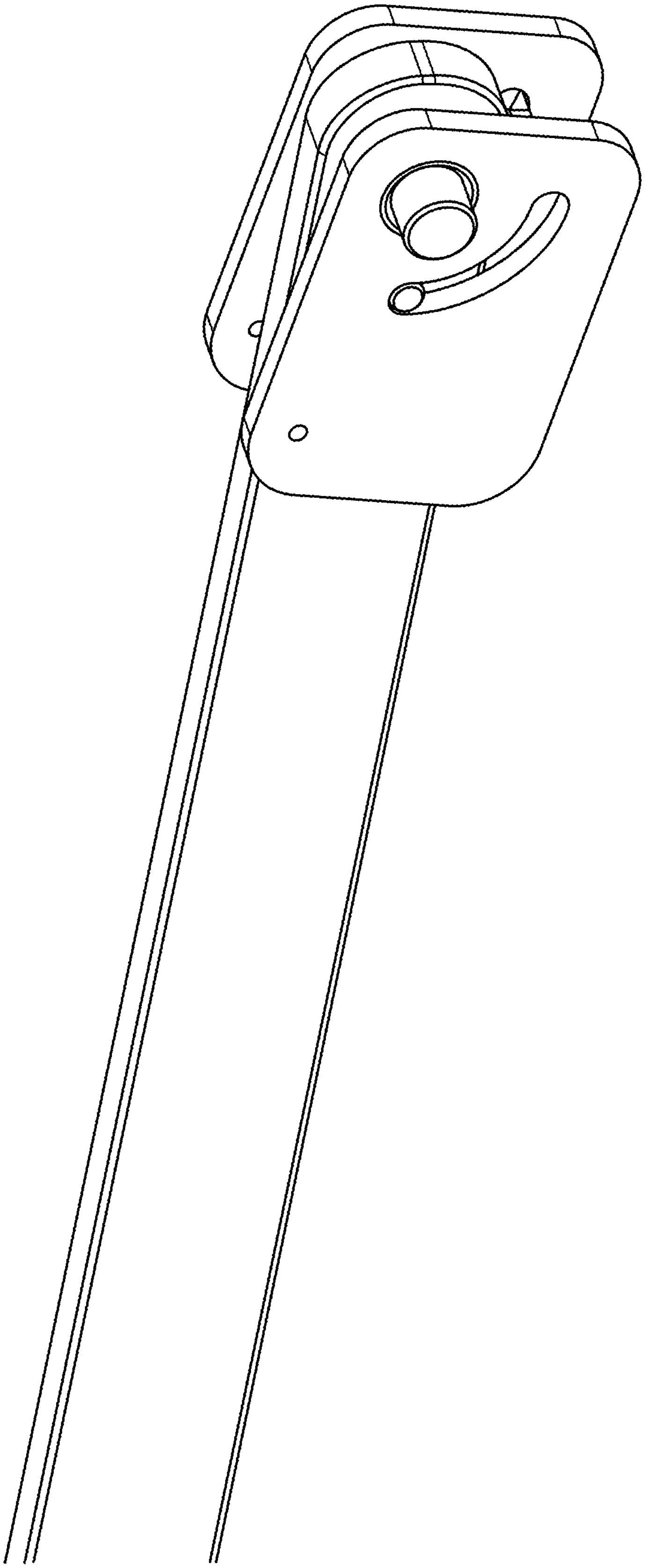
FIG. 22B is a view of an exemplary aspect of a linkage.

FIG. 22A is a view of automatic choke 1104 in "pitched up" position on an end of primary linkage 1105. FIG. 22B is a view of automatic choke 1104 in "pitched down" position on the end of primary linkage 1105. The spring of automatic choke 1104 can cause automatic choke 1104 to automatically shift into a "pitched in" or "pitched down" position when engaged with stopper 1109. When container 100 is an erect configuration, automatic choke 1104 is located at a position In slot 1108 closest to a center of container 100 in a length direction. Configuration of linkages 1103 disclosed herein, including automatic choke 1104, allows a single operator to transform container 100 from an erect configuration to a collapsed configuration, or vice versa, for example, using a forklift.

Roof 101 is lowered to rest on side walls 102*a*, 102*b* and can be locked into corner posts 105 of side walls 102*a*, 102*b*. To lock erected container 100, an operator performs the unlocking processes in reverse including but not limited to lifting foldable extension panels 802, moving side panels 801 towards base 103 (e.g., pulling down or lowering side panels 801, 801*b*), locking side panels 801, 801*b*, and engaging all locks. Thereafter, the operator can raise and secure base protection panel 201.

Once all of the locking steps are completed, container 100 is ready to be used as intended. Container 100 is also ready to receive and carry goods and be shipped as needed. The whole operation of folding, unfolding, locking, and unlocking of container 100 is configured to be performed by a single, e.g., one-person, operator and one lifting device (for example, a forklift, reach stacker, crane, or a combination thereof) utilized by either the same one person or another individual in a period ranging from between 2 to 5 minutes, for example. In an aspect, the mechanical movements can be performed by drones, bots, machines, or other tools operated by an operator or autonomously. Container 100 can be configured to meet all specifications for an ISO (International Organization for Standardization) shipping container.

A method of collapsing the container can include applying a force between the roof and the foldable wall with the constant-force device to inwardly fold the foldable wall; and lifting the roof, causing an end of the linkage connected to the roof to move and inwardly collapse the collapsible wall to collapse the container, wherein the method can further optionally include, before inwardly folding the foldable wall removing a lever of a roof lock from a stowed position, disengaging the roof lock to unlock the roof from the collapsible wall, lowering a base protection panel to expose a base lock, removing a lever of the base lock from a stowed position, disengaging the base lock to unlock the 20ollapseble wall from the base, or a combination thereof, after collapsing the container locking the roof to the base, or a combination thereof.

A method of erecting the container can include lifting the roof, causing an end of the linkage connected to the roof to move and raise the collapsible wall; and unfolding the foldable wall using the constant-force device to erect the container, wherein the method can further optionally include, before lifting the roof locking the roof to the base, after unfolding the foldable wall engaging a roof lock to lock the roof to the collapsible wall, stowing a lever of the roof lock, engaging a base lock to lock the collapsible wall to the base, stowing a lever of the base lock, raising a base protection panel to hide the base lock, or a combination thereof, or a combination thereof.

In an aspect, a collapsible container can include a roof; a base; a collapsible wall between the roof and the base; a linkage connecting the roof to the collapsible wall to collapse the collapsible wall and raise the collapsible wall to an erect position; a foldable wall; a base lock for locking the collapsible wall to the base, wherein the base lock can include a lever to lock the collapsible wall to the base or unlock the collapsible wall from the base, and wherein the lever can be storable within the base; a roof lock for locking the roof to the collapsible wall, wherein the roof lock can include a lever to lock the roof to the collapsible wall or unlock the roof from the collapsible wall, and wherein the roof lock can be storable within the collapsible wall; a protrusion connected to the roof and insertable into the collapsible wall when the container is in an erect configuration, and the base when the container is in a collapsed configuration; a first hinge connecting the collapsible wall to the base to inwardly collapse the collapsible wall towards the base, and to raise the collapsible wall from the base to an erect position, and a second hinge connecting the foldable wall to the roof, wherein the roof can include a constant-force device to act on the foldable wall, a slot to which the linkage can be coupled, and a widening at an end the slot, the foldable wall can be connected to the roof and inwardly foldable towards the roof, can be a bi-fold wall, can include panels connected by a third hinge, can include a disengageable support column, and can be longer than the collapsible wall, the linkage can include an automatic choke, movement of the automatic choke can be impeded when the container is in an extended configuration, the roof can include a stopper that impedes movement of the automatic choke, and movement of the automatic choke can be not impeded when the container is in an opening configuration.

While the description herein has provided that the side walls can be foldable and the end walls can be collapsible, in an aspect, the end walls can be foldable and the side walls can be collapsible. The foldable walls and the collapsible walls can be arranged according to desired uses, standards, or a combination thereof.

In an aspect, a collapsible container comprises a roof; a base; a collapsible wall between the roof and the base; a linkage connecting the roof to the collapsible wall to collapse the collapsible wall and raise the collapsible wall to an erect position; and a foldable wall, wherein the roof comprises a constant-force device to act on the foldable wall.

The foldable wall can be connected to the roof and inwardly foldable towards the roof; and/or the container can further comprise a base lock for locking the collapsible wall to the base, wherein the base lock comprises a lever to lock the collapsible wall to the base or unlock the collapsible wall from the base, and wherein the lever is storable within the base; and/or the container can further comprise a roof lock for locking the roof to the collapsible wall, wherein the roof lock comprises a lever to lock the roof to the collapsible wall or unlock the roof from the collapsible wall, and wherein the roof lock is storable within the collapsible wall; and/or the linkage can comprise an automatic choke; and/or movement of the automatic choke can be impeded when the container is in an extended configuration; and/or the roof can comprise a stopper that impedes movement of the automatic choke; and/or in an aspect, movement of the automatic choke is not impeded when the container is In an opening configuration; and/or the roof can comprise a slot to which the linkage is coupled; and the slot can comprise a widening at an end of the slot; and/or the container can further comprise a protrusion connected to the roof and insertable into the collapsible wall when the container is in an erect configuration, and the base when the container is in a collapsed configuration; and/or the container can further comprise a hinge connecting the collapsible wall to the base to inwardly collapse the collapsible wall towards the base, and to raise the collapsible wall from the base to an erect position; and/or the container can further comprise a hinge connecting the foldable wall to the roof; and/or the foldable wall can be a bi-fold wall; and/or the foldable wall can comprise panels connected by a hinge; and/or the foldable wall can comprise a disengageable support column; and/or the foldable wall can be longer than the collapsible wall.

In an aspect, a method of collapsing the container can comprise applying a force between the roof and the foldable wall with the constant-force device to inwardly fold the foldable wall; and lifting the roof, causing an end of the linkage connected to the roof to move and inwardly collapse the collapsible wall to collapse the container, wherein the method further optionally comprises, before inwardly folding the foldable wall removing a lever of a roof lock from a stowed position, disengaging the roof lock to unlock the roof from the collapsible wall, lowering a base protection panel to expose a base lock, removing a lever of the base lock from a stowed position, disengaging the base lock to unlock the collapsible wall from the base, or a combination thereof, after collapsing the container locking the roof to the base, or a combination thereof.

In an aspect, a method of erecting the container can comprise lifting the roof, causing an end of the linkage connected to the roof to move and raise the collapsible wall; and unfolding the foldable wall using the constant-force device to erect the container, wherein the method further optionally comprises, before lifting the roof locking the roof to the base, after unfolding the foldable wall engaging a roof lock to lock the roof to the collapsible wall, stowing a lever of the roof lock, engaging a base lock to lock the collapsible wall to the base, stowing a lever of the base lock, raising a base protection panel to hide the base lock, or a combination thereof, or a combination thereof.

In an aspect, a collapsible container comprises a roof; a base; a collapsible wall between the roof and the base; a linkage connecting the roof to the collapsible wall to collapse the collapsible wall and raise the collapsible wall to an erect position; and a foldable wall, wherein the linkage comprises an automatic choke.

The roof can comprise a stopper that impedes movement of the automatic choke, and a slot to which the linkage is coupled, the slot comprising a widening at an end of the slot; and movement of the automatic choke can be impeded when the container is in an extended configuration. In an aspect, movement of the automatic choke is not impeded when the container is in an opening configuration.

In an aspect, a collapsible container comprises a roof; a base; a collapsible wall between the roof and the base; a linkage connecting the roof to the collapsible wall to collapse the collapsible wall and raise the collapsible wall to an erect position; a foldable wall; a base lock for locking the collapsible wall to the base, wherein the base lock comprises a lever to lock the collapsible wall to the base or unlock the collapsible wall from the base, and wherein the lever is storable within the base; a roof lock for locking the roof to the collapsible wall, wherein the roof lock comprises a lever to lock the roof to the collapsible wall or unlock the roof from the collapsible wall, and wherein the roof lock is storable within the collapsible wall; a protrusion connected to the roof and insertable into the collapsible wall when the container is in an erect configuration, and the base when the container is in a collapsed configuration; a first hinge connecting the collapsible wall to the base to inwardly collapse the collapsible wall towards the base, and to raise the collapsible wall from the base to an erect position, and a second hinge connecting the foldable wall to the roof, wherein the roof comprises a constant-force device to act on the foldable wall, a slot to which the linkage is coupled, and a widening at an end the slot, the foldable wall is connected to the roof and inwardly foldable towards the roof, is a bi-fold wall, comprises panels connected by a third hinge, comprises a disengageable support column, and is longer than the collapsible wall, the linkage comprises an automatic choke, movement of the automatic choke is impeded when the container is in an extended configuration, the roof comprises a stopper that impedes movement of the automatic choke, and movement of the automatic choke is not impeded when the container is in an opening configuration.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications can be referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present disclosure is not entitled to antedate such publication by virtue of prior present disclosure. Further, the dates of publication provided herein can be different from the actual publication dates, which can require independent confirmation.

The patentable scope of the present disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Insofar as the description above and the accompanying drawing disclose any additional subject matter that is not within the scope of the claims below, the disclosures are not dedicated to the public and the right to file one or more applications to claims such additional disclosures is reserved.

The foregoing descriptions of specific aspects of the present invention have been presented for purposes of illustration and description. They are not intended to be exhaustive or to limit the present invention to the precise forms disclosed, and modifications and variations are possible in view of the above teaching. The exemplary aspect was chosen and described to best explain the principles of the present invention and its practical application, to thereby enable others skilled in the art to best utilize the present invention and its aspects with modifications as suited to the use contemplated.

It is therefore submitted that the present invention has been shown and described in the most practical and exemplary aspects. It should be recognized that departures may be made which fall within the scope of the invention. With respect to the description provided herein, it is submitted that the optimal features of the invention include variations in size, materials, shape, form, function and manner of operation, assembly, and use. All structures, functions, and relationships equivalent or essentially equivalent to those disclosed are intended to be encompassed by the present invention.

What is claimed is:

1. A collapsible container, comprising:

a roof;

a base;

a collapsible wall between the roof and the base;

a linkage connecting the roof to the collapsible wall to collapse the collapsible wall and raise the collapsible wall to an erect position; and a foldable wall, wherein the roof comprises a constant-force device to act on the foldable wall, and wherein the container further comprises a base lock for locking the collapsible wall to the base, wherein the base lock comprises a lever to lock the collapsible wall to the base or unlock the collapsible wall from the base, and wherein the lever is storable within the base, or the container further comprises a roof lock for locking the roof to the collapsible wall, wherein the roof lock comprises a lever to lock the roof to the collapsible wall or unlock the roof from the collapsible wall, and wherein the roof lock is storable within the collapsible wall, or the roof comprises a slot to which the linkage is coupled, and the slot comprises a widening at an end the slot, or the container further comprises a protrusion connected to the roof and insertable into the collapsible wall when the container is in an erect configuration, and the base when the container is in a collapsed configuration, or the container further comprises a hinge connecting the collapsible wall to the base to inwardly collapse the collapsible wall towards the base, and to raise the collapsible wall from the base to an erect position, or the container further comprises a hinge connecting the foldable wall to the roof, or the foldable wall is a bi-fold wall, or the foldable wall comprises panels connected by a hinge, or the foldable wall comprises a disengageable support column, or the foldable wall is longer than the collapsible wall, or a combination thereof.

2. The container of claim 1, wherein the foldable wall is connected to the roof and inwardly foldable towards the roof.

3. The container of claim 1, further comprising the base lock for locking the collapsible wall to the base, wherein the base lock comprises the lever to lock the collapsible wall to the base or unlock the collapsible wall from the base, and wherein the lever is storable within the base.

4. The container of claim 1, further comprising the roof lock for locking the roof to the collapsible wall, wherein the roof lock comprises the lever to lock the roof to the collapsible wall or unlock the roof from the collapsible wall, and wherein the roof lock is storable within the collapsible wall.

5. The container of claim 1, wherein the linkage comprises an automatic choke.

6. A collapsible container, comprising:

a roof;

a base;

a collapsible wall between the roof and the base;

a linkage connecting the roof to the collapsible wall to collapse the collapsible wall and raise the collapsible wall to an erect position; and a foldable wall, wherein the linkage comprises an automatic choke, and wherein the roof comprises a constant-force device to act on the foldable wall.

7. The container of claim 6, wherein movement of the automatic choke is not impeded when the container is in an opening configuration.

8. The container of claim 1, wherein:

the roof comprises the slot to which the linkage is coupled, and the slot comprises the widening at the end the slot.

9. The container of claim 1, further comprising the protrusion connected to the roof and insertable into the collapsible wall when the container is in the erect configuration, and the base when the container is in the collapsed configuration.

10. The container of claim 1, further comprising the hinge connecting the collapsible wall to the base to inwardly collapse the collapsible wall towards the base, and to raise the collapsible wall from the base to the erect position.

11. The container of claim 1, further comprising the hinge connecting the foldable wall to the roof.

12. The container of claim 1, wherein the foldable wall is the bi-fold wall.

13. The container of claim 1, wherein the foldable wall comprises panels connected by the hinge.

14. The container of claim 1, wherein the foldable wall comprises the disengageable support column.

15. The container of claim 1, wherein the foldable wall is longer than the collapsible wall.

16. A method of collapsing the container of claim 1, the method comprising:

applying a force between the roof and the foldable wall with the constant-force device to inwardly fold the foldable wall; and lifting the roof, causing an end of the linkage connected to the roof to move and inwardly collapse the collapsible wall to collapse the container, wherein the method further optionally comprises, before inwardly folding the foldable wall removing a lever of a roof lock from a stowed position, disengaging the roof lock to unlock the roof from the collapsible wall, lowering a base protection panel to expose a base lock, removing a lever of the base lock from a stowed position, disengaging the base lock to unlock the collapsible wall from the base, or a combination thereof, after collapsing the container, locking the roof to the base, or a combination thereof.

17. A method of erecting container of claim 1, the method comprising:

lifting the roof, causing an end of the linkage connected to the roof to move and raise the collapsible wall; and unfolding the foldable wall using the constant-force device to erect the container, wherein the method further optionally comprises, before lifting the roof locking the roof to the base, after unfolding the foldable wall engaging a roof lock to lock the roof to the collapsible wall, stowing a lever of the roof lock, engaging a base lock to lock the collapsible wall to the base, stowing a lever of the base lock, raising a base protection panel to hide the base lock, or a combination thereof, or a combination thereof.

18. The container of claim 6, wherein movement of the automatic choke is impeded when the container is in an extended configuration, and wherein the roof comprises a stopper that impedes movement of the automatic choke.

19. The container of claim 6, wherein;

the roof comprises a stopper that impedes movement of the automatic choke, and a slot to which the linkage is coupled, the slot comprising a widening at an end of the slot;

movement of the automatic choke is impeded when the container is in an extended configuration;

wherein movement of the automatic choke is not impeded when the container is in an opening configuration.

20. A collapsible container, comprising:

a roof;

a base;

a collapsible wall between the roof and the base;

a linkage connecting the roof to the collapsible wall to collapse the collapsible wall and raise the collapsible wall to an erect position;

a foldable wall;

a base lock for locking the collapsible wall to the base, wherein the base lock comprises a lever to lock the collapsible wall to the base or unlock the collapsible wall from the base, and wherein the lever is storable within the base;

a roof lock for locking the roof to the collapsible wall, wherein the roof lock comprises a lever to lock the roof to the collapsible wall or unlock the roof from the collapsible wall, and wherein the roof lock is storable within the collapsible wall;

a protrusion connected to the roof and insertable into the collapsible wall when the container is in an erect configuration, and the base when the container is in a collapsed configuration;

a first hinge connecting the collapsible wall to the base to inwardly collapse the collapsible wall towards the base, and to raise the collapsible wall from the base to an erect position; and a second hinge connecting the foldable wall to the roof, wherein the roof comprises a constant-force device to act on the foldable wall, a slot to which the linkage is coupled, and a widening at an end the slot, the foldable wall is connected to the roof and inwardly foldable towards the roof, is a bi-fold wall, comprises panels connected by a third hinge, comprises a disengageable support column, and is longer than the collapsible wall, the linkage comprises an automatic choke, movement of the automatic choke is impeded when the container is in an extended configuration, the roof comprises a stopper that impedes movement of the automatic choke, and movement of the automatic choke is not impeded when the container is in an opening configuration.

* * * * *